May 19, 1936. A. HOFMANN 2,041,547
METHOD AND MACHINE FOR MAKING KNITTING NEEDLES
Filed June 20, 1934 36 Sheets-Sheet 1
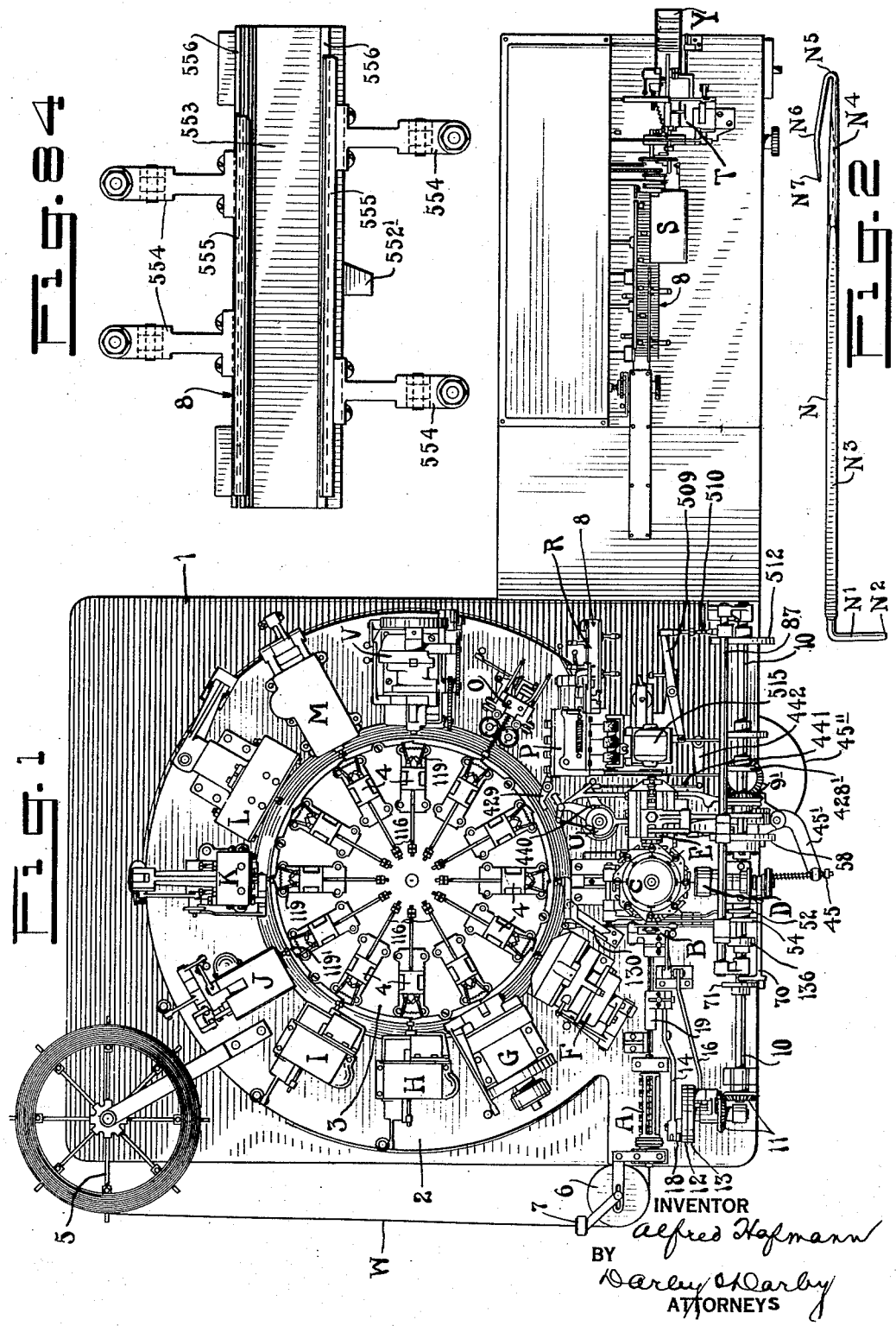
INVENTOR
Alfred Hofmann
BY
Darby & Darby
ATTORNEYS May 19, 1936. A. HOFMANN 2,041,547
METHOD AND MACHINE FOR MAKING KNITTING NEEDLES
Filed June 20, 1934 36 Sheets-Sheet 2
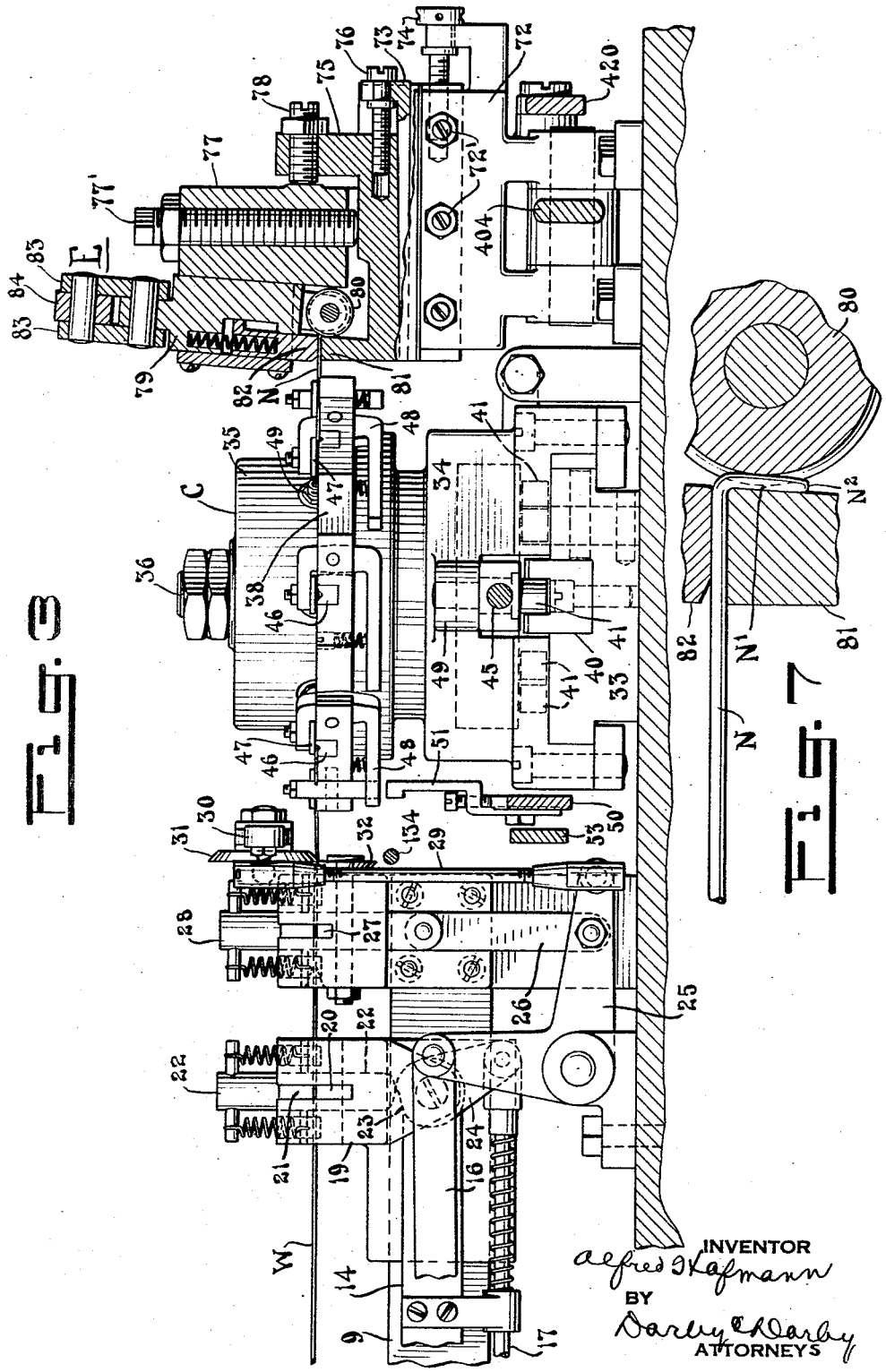

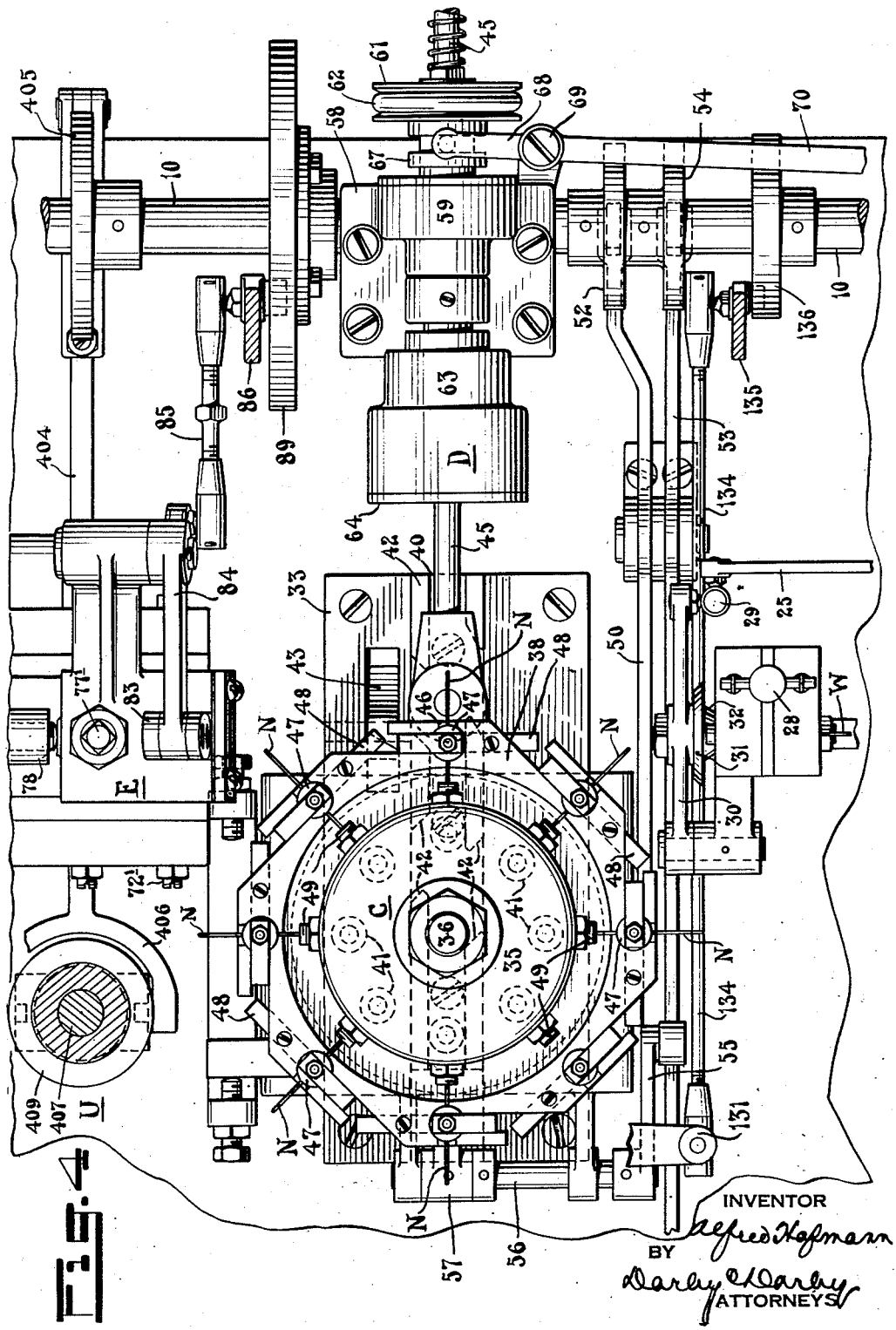

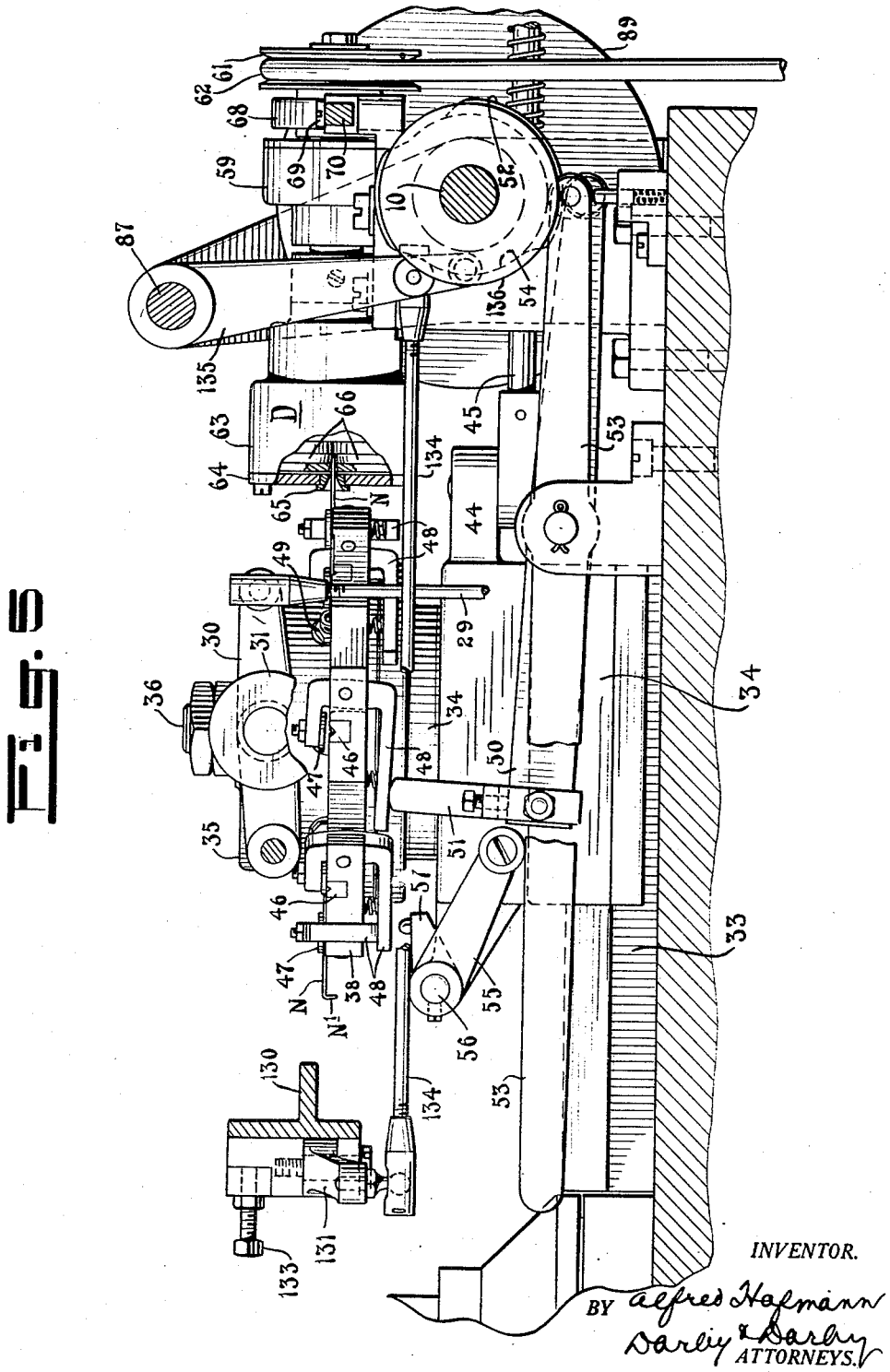

May 19, 1936.  A. HOFMANN  2,041,547
METHOD AND MACHINE FOR MAKING KNITTING NEEDLES
Filed June 20, 1934   36 Sheets-Sheet 5
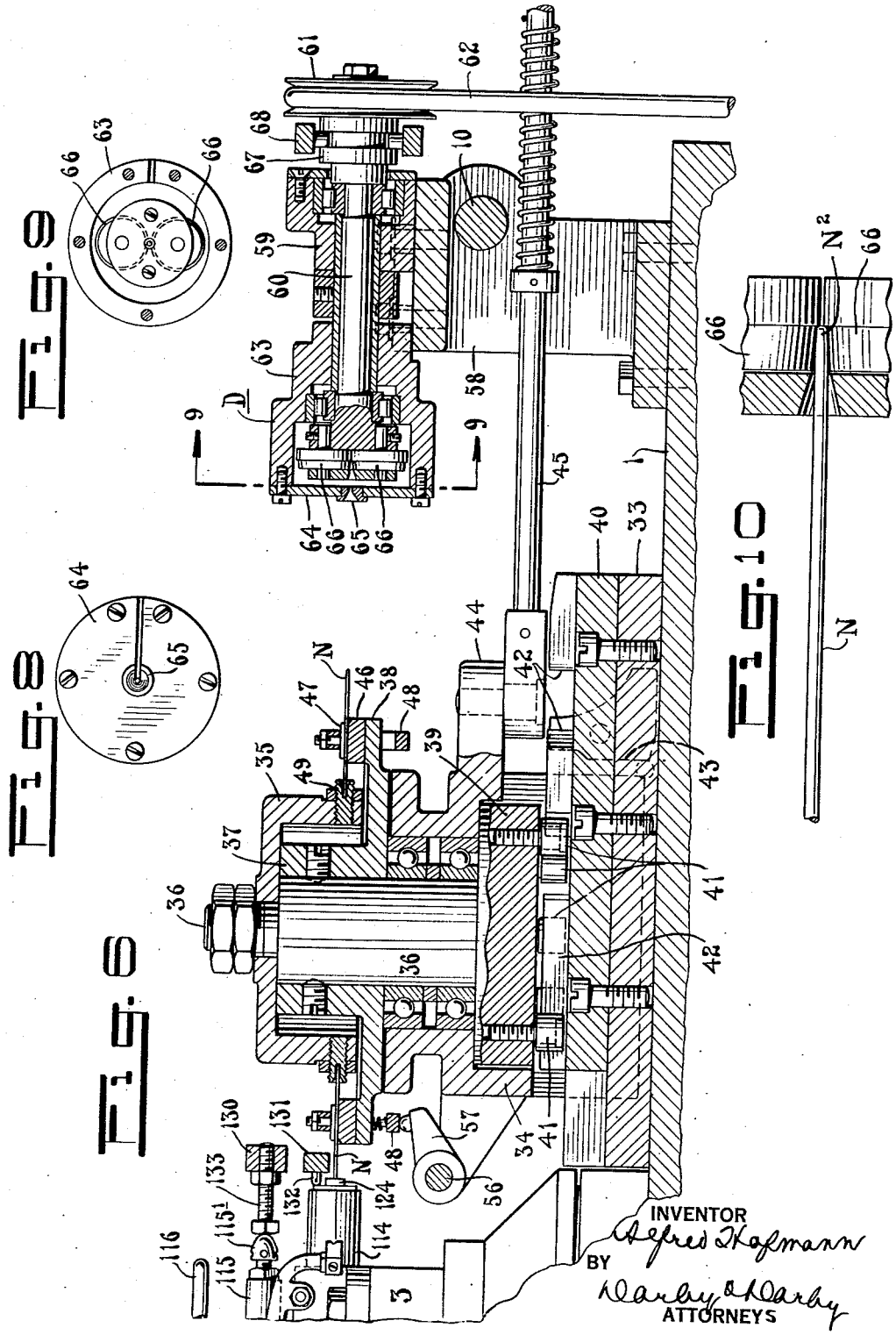

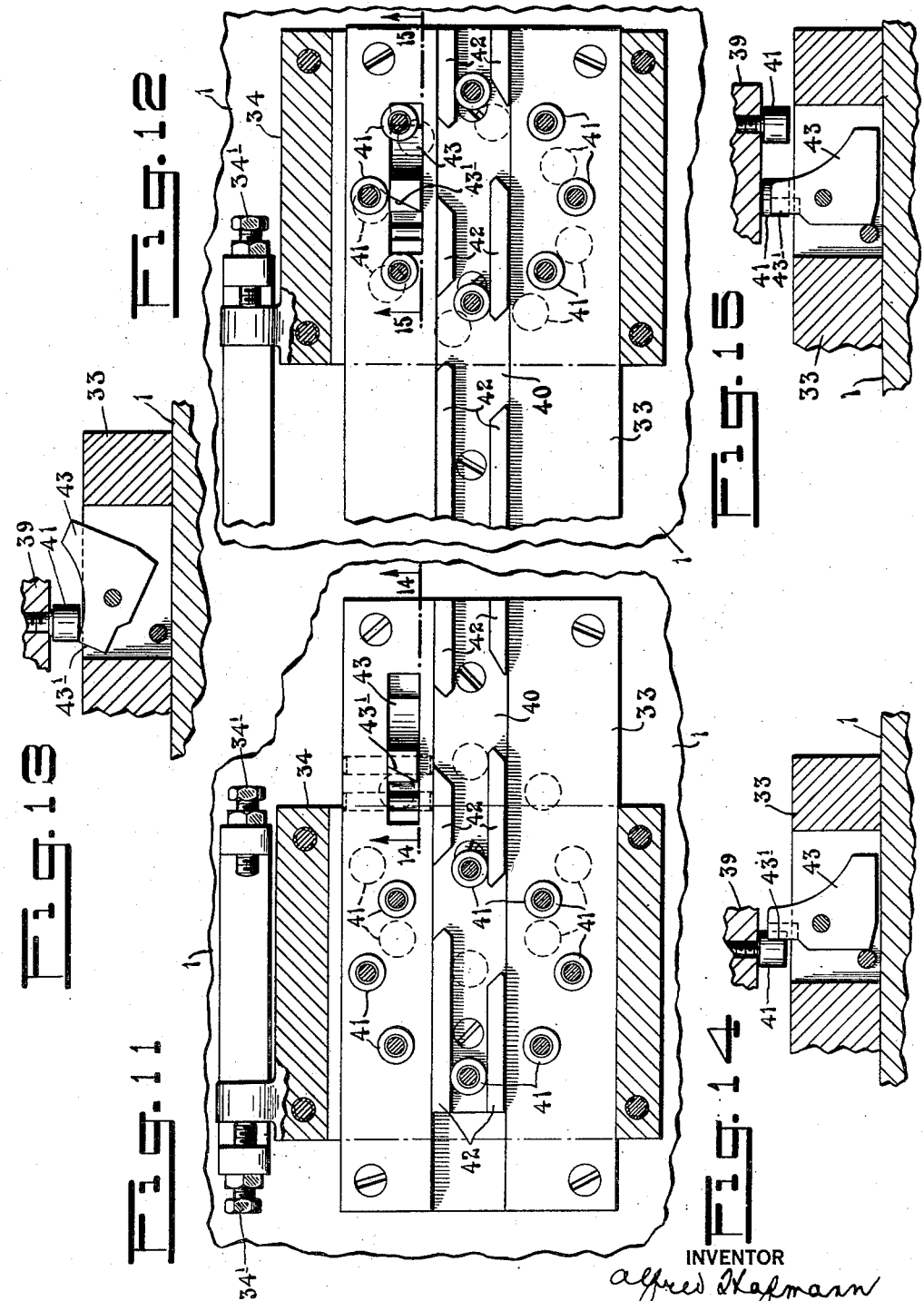

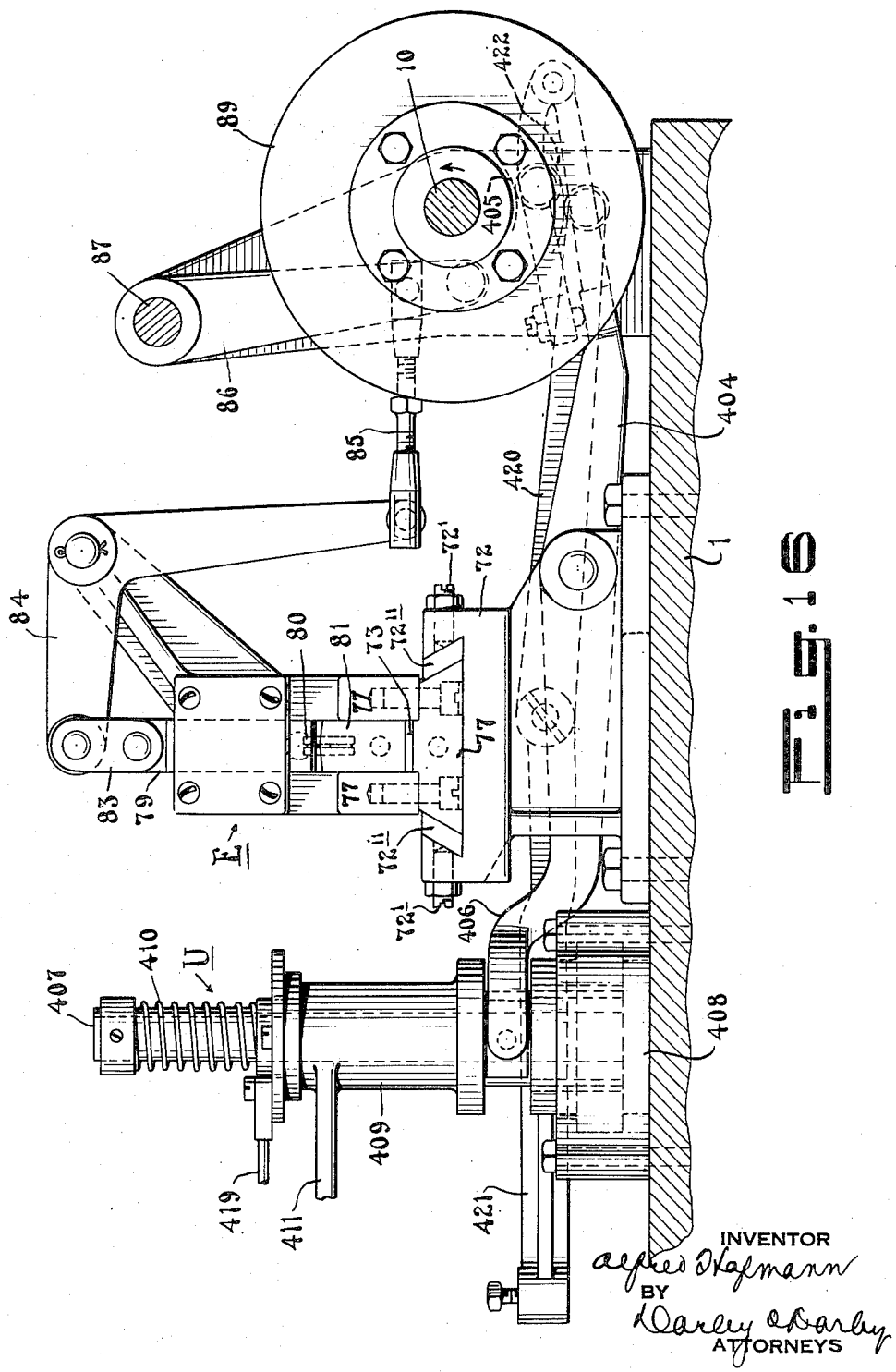

May 19, 1936.  A. HOFMANN  2,041,547
METHOD AND MACHINE FOR MAKING KNITTING NEEDLES
Filed June 20, 1934  36 Sheets-Sheet 8
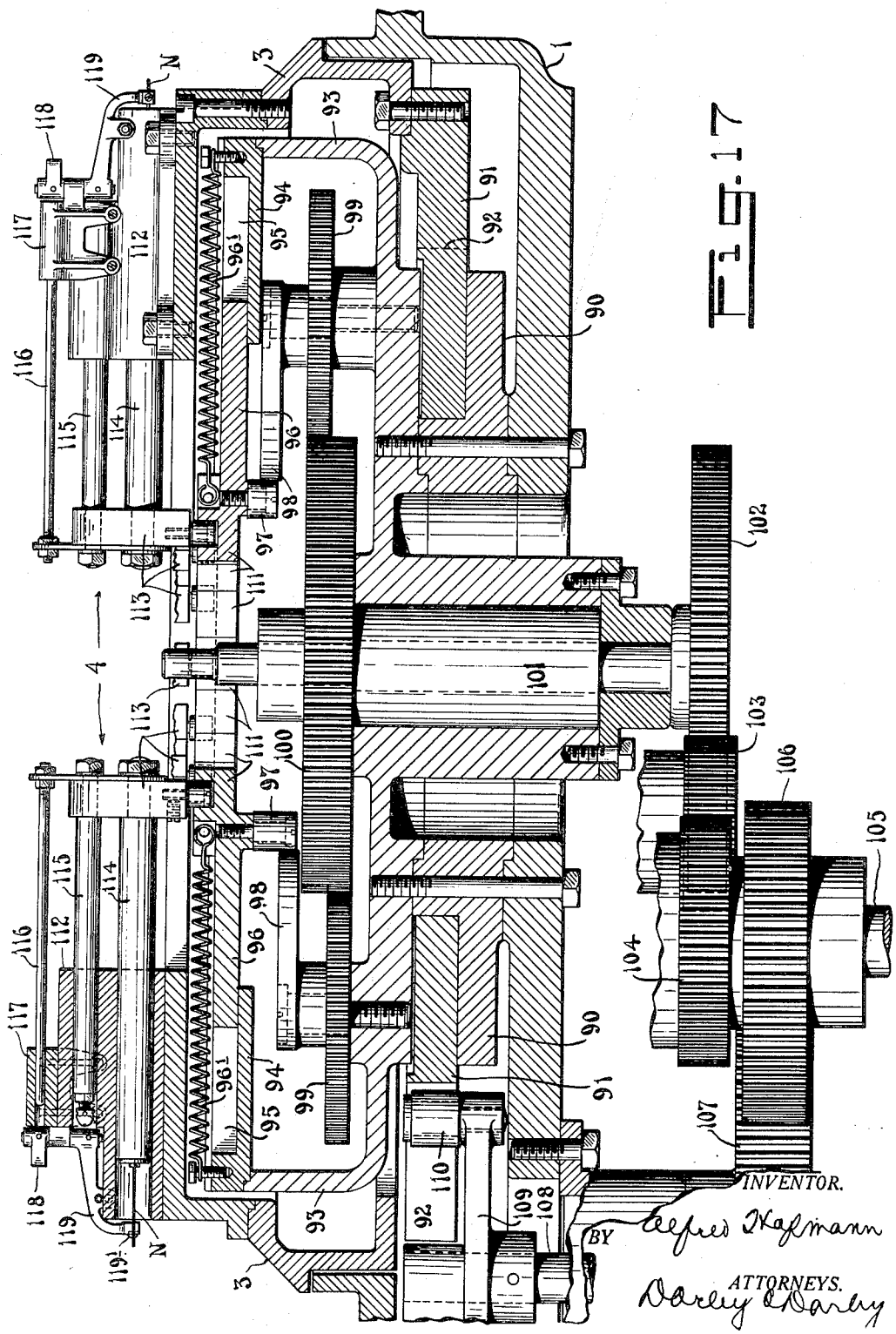

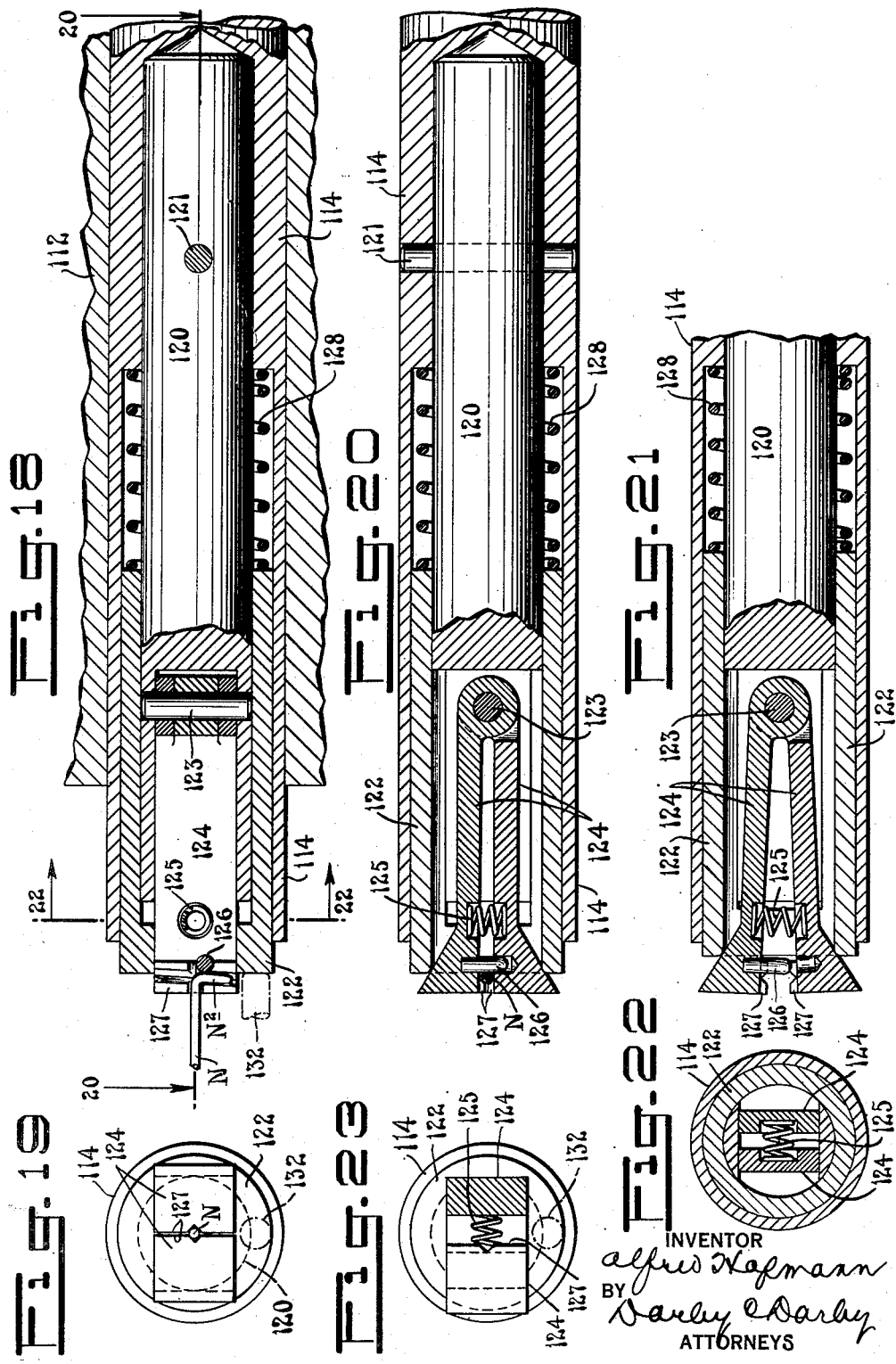

May 19, 1936. A. HOFMANN 2,041,547
METHOD AND MACHINE FOR MAKING KNITTING NEEDLES
Filed June 20, 1934 36 Sheets-Sheet 10

INVENTOR
Alfred Hofmann
BY
Darby & Darby
ATTORNEYS

May 19, 1936.     A. HOFMANN     2,041,547
METHOD AND MACHINE FOR MAKING KNITTING NEEDLES
Filed June 20, 1934     36 Sheets-Sheet 11
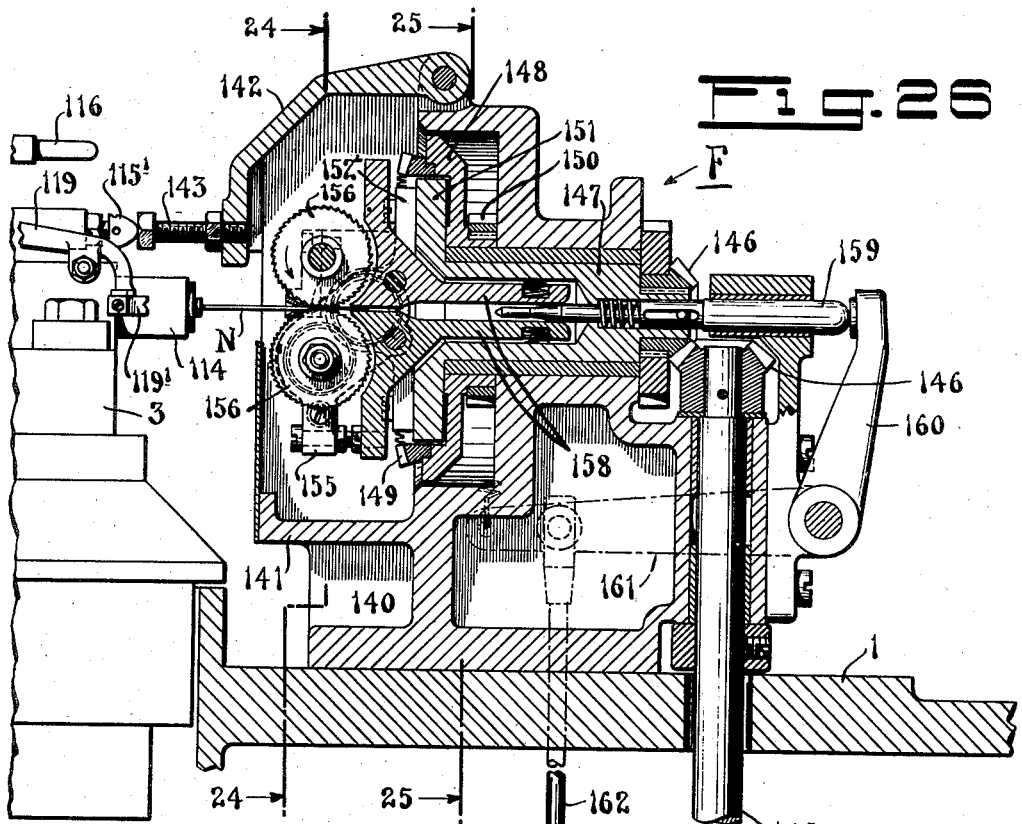
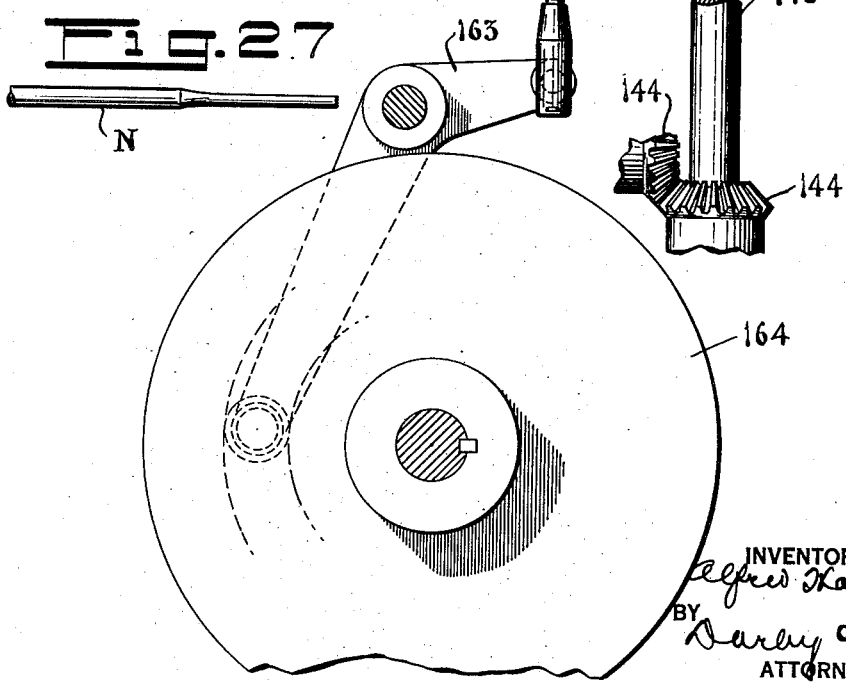
INVENTOR
Alfred Hofmann
BY Darby & Darby
ATTORNEYS

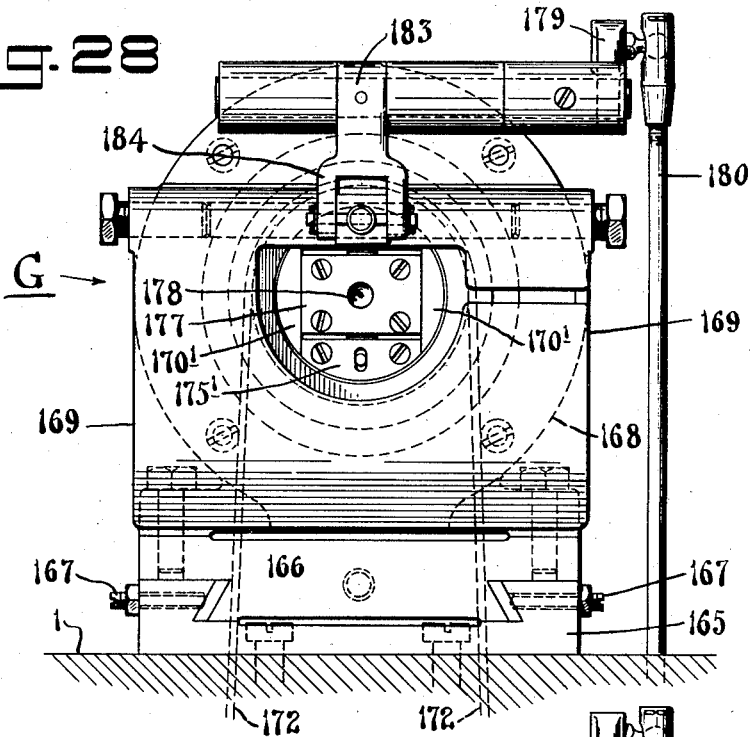
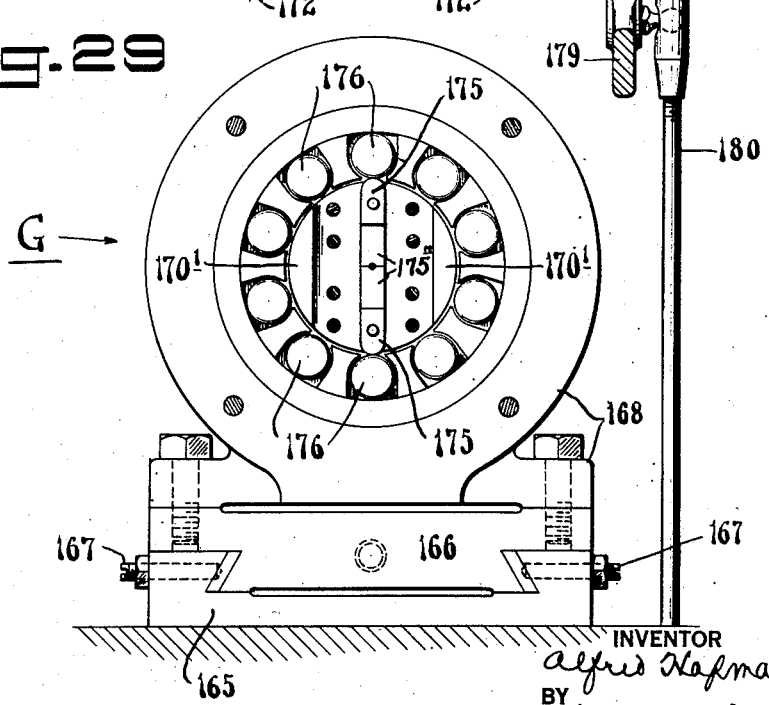

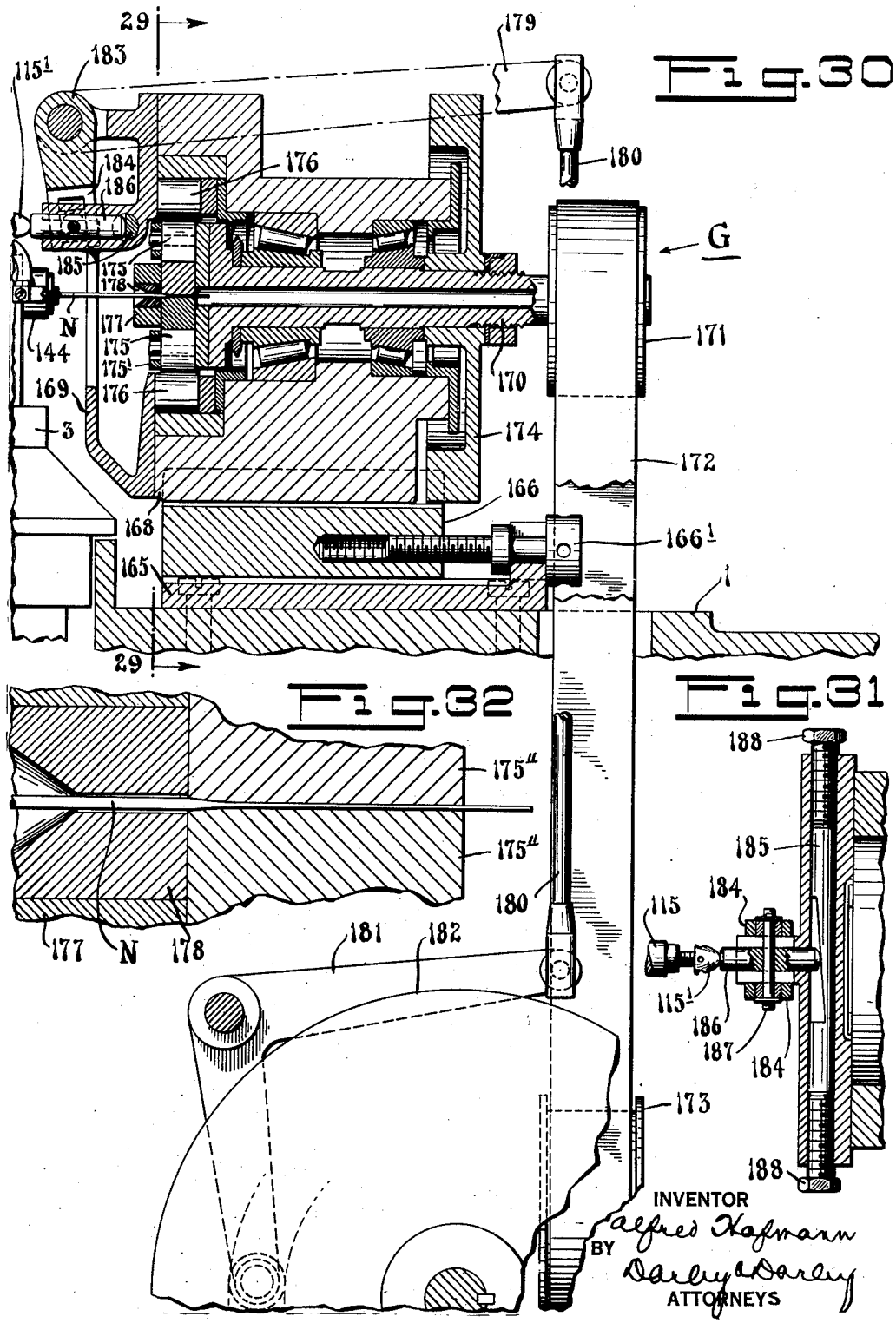

May 19, 1936. A. HOFMANN 2,041,547
METHOD AND MACHINE FOR MAKING KNITTING NEEDLES
Filed June 20, 1934 36 Sheets-Sheet 14
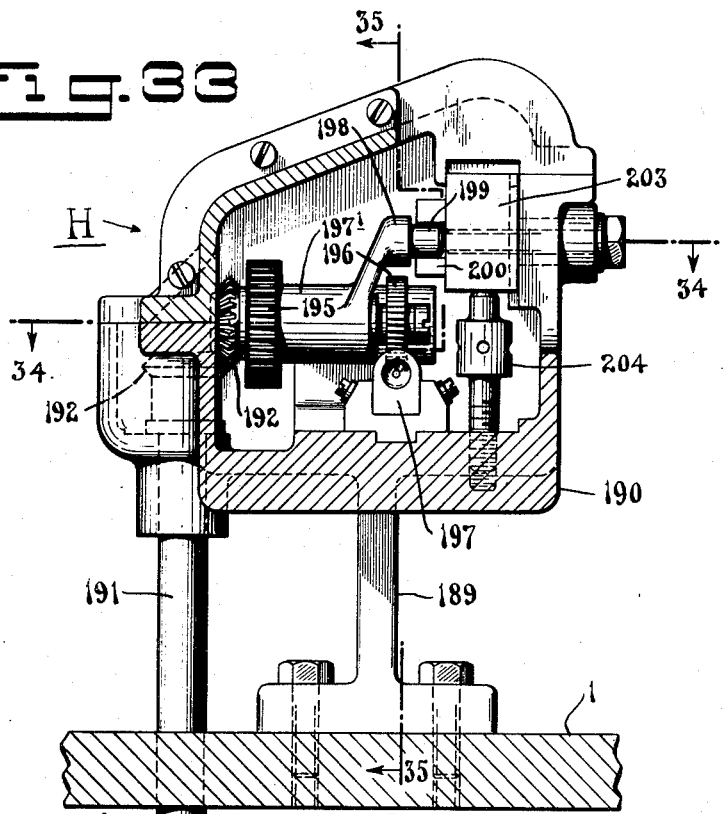
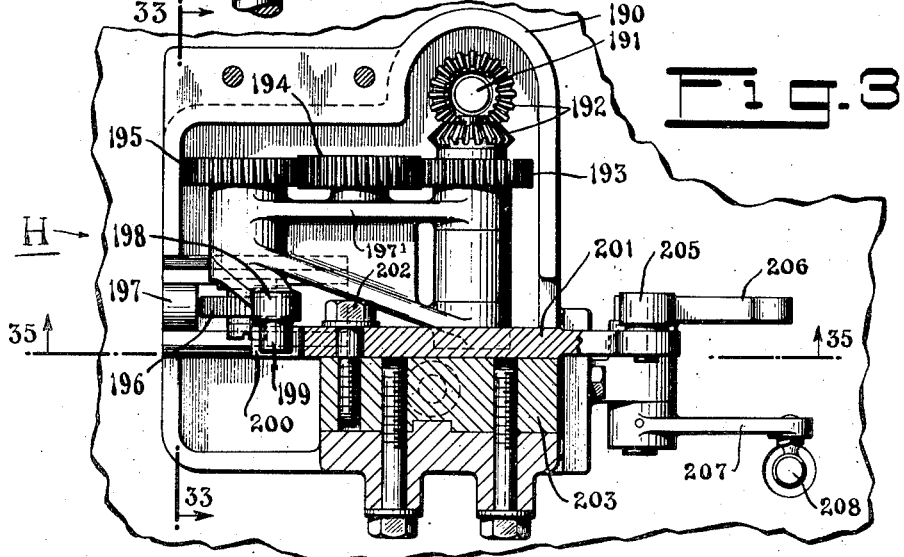
INVENTOR
Alfred Hofmann
BY
Darby & Darby
ATTORNEYS

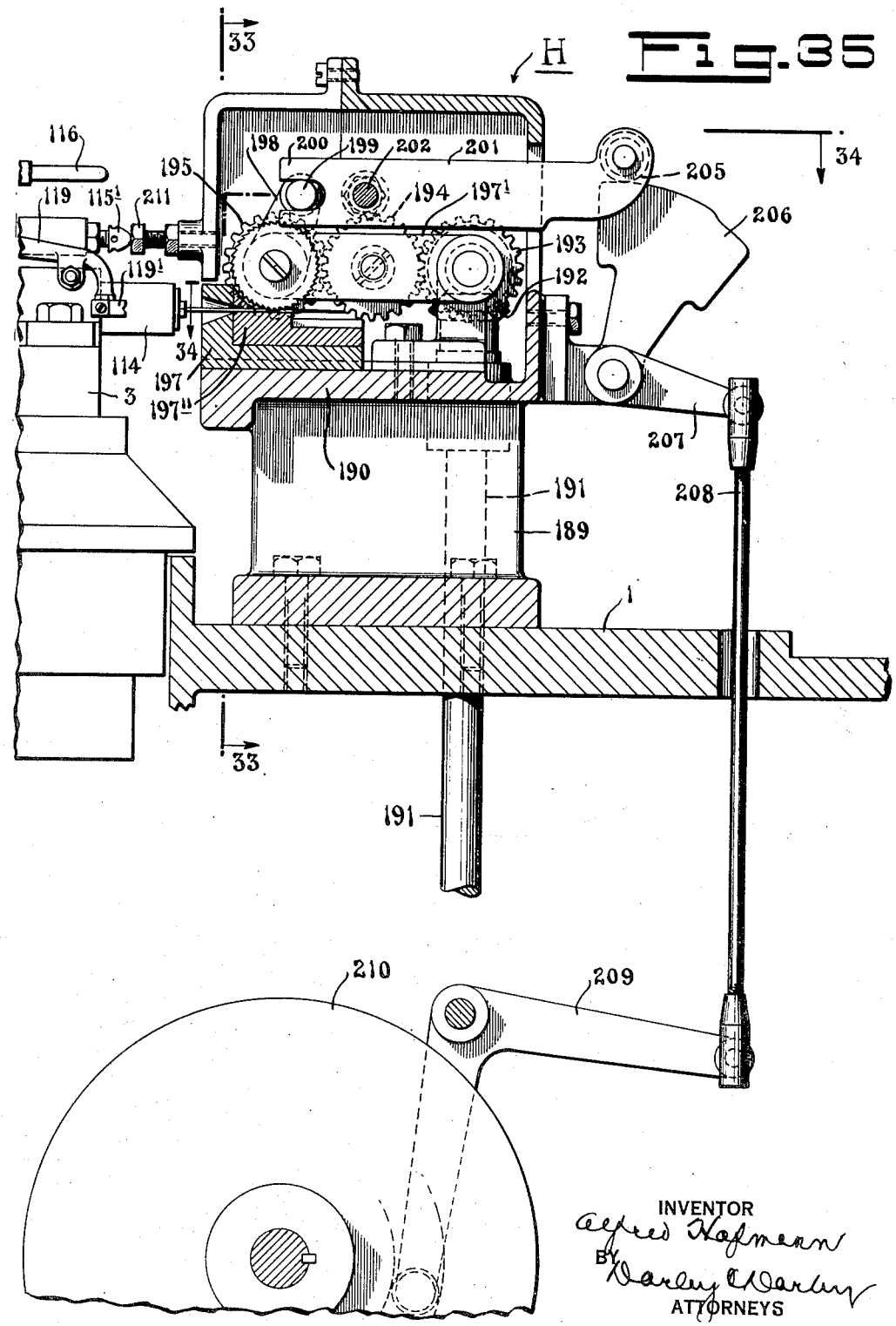

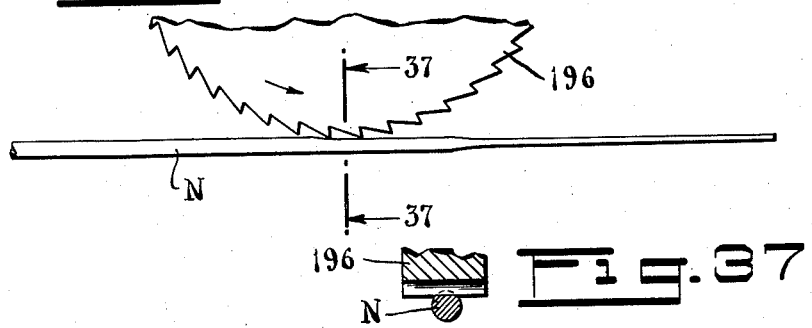
Fig.36
Fig.37
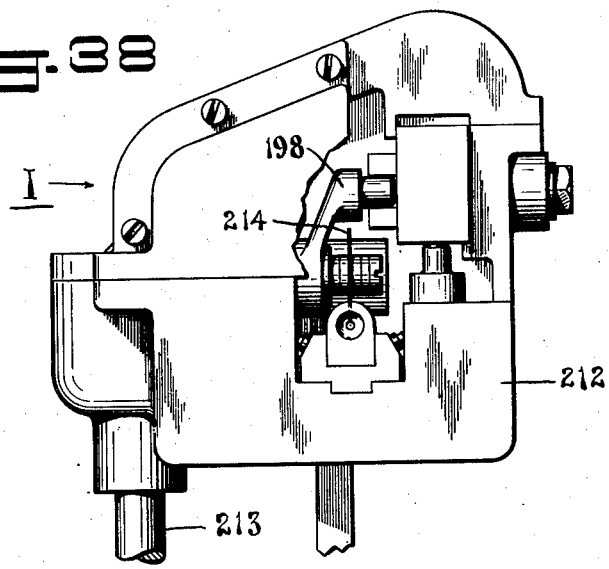
Fig.38
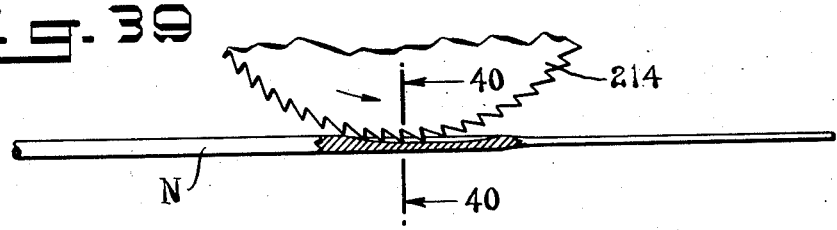
Fig.39
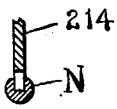
Fig.40
INVENTOR
Alfred Hofmann
BY
Darby & Darby
ATTORNEYS May 19, 1936.  A. HOFMANN  2,041,547
METHOD AND MACHINE FOR MAKING KNITTING NEEDLES
Filed June 20, 1934  36 Sheets-Sheet 17

May 19, 1936.  A. HOFMANN  2,041,547
METHOD AND MACHINE FOR MAKING KNITTING NEEDLES
Filed June 20, 1934   36 Sheets—Sheet 18

INVENTOR
Alfred Hofmann
BY
Darcy & Darcy
ATTORNEYS

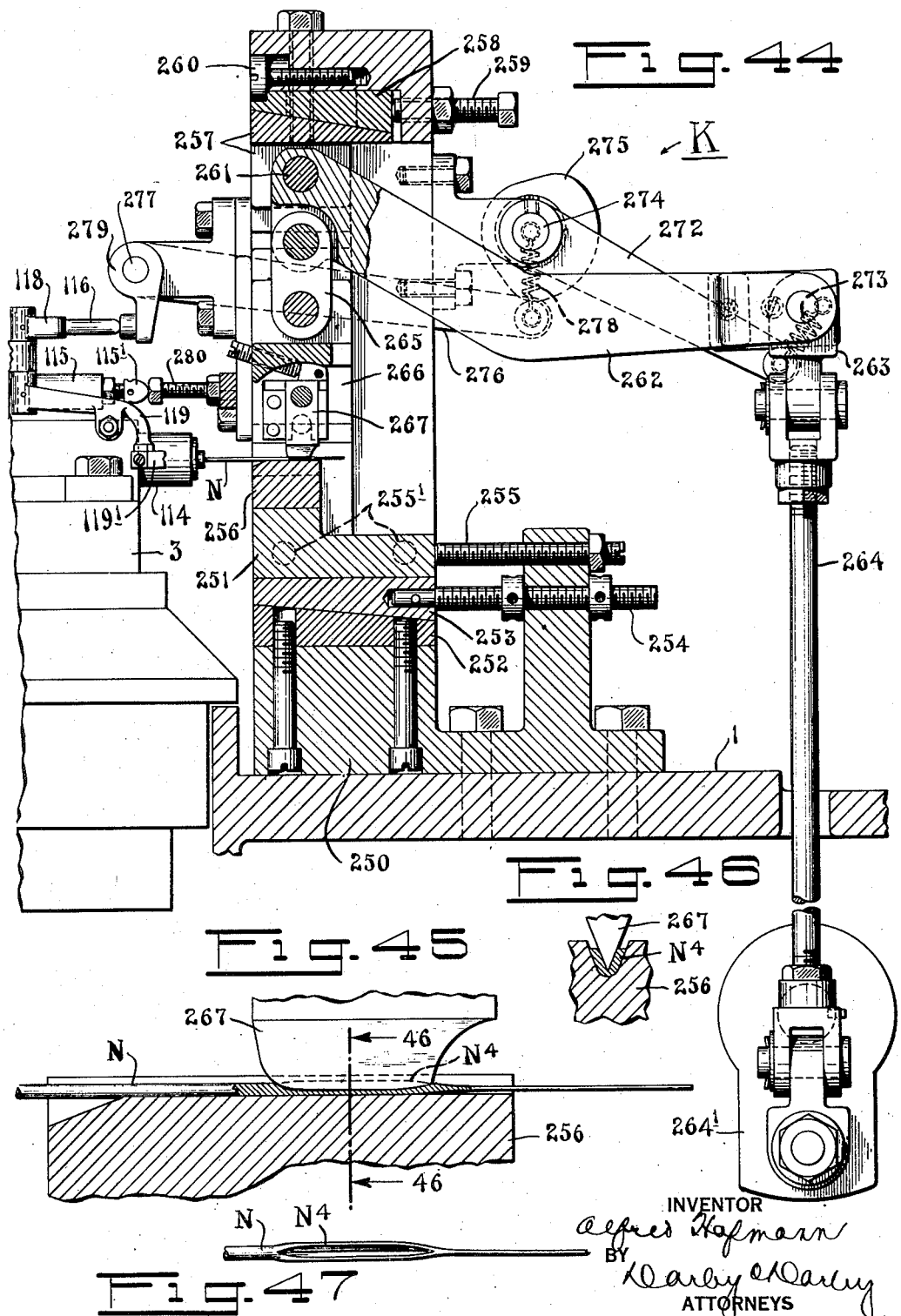

May 19, 1936.  A. HOFMANN  2,041,547
METHOD AND MACHINE FOR MAKING KNITTING NEEDLES
Filed June 20, 1934   36 Sheets-Sheet 20

INVENTOR
Alfred Hofmann
BY
Darby & Darby
ATTORNEYS

May 19, 1936.  A. HOFMANN  2,041,547
METHOD AND MACHINE FOR MAKING KNITTING NEEDLES
Filed June 20, 1934  36 Sheets-Sheet 21
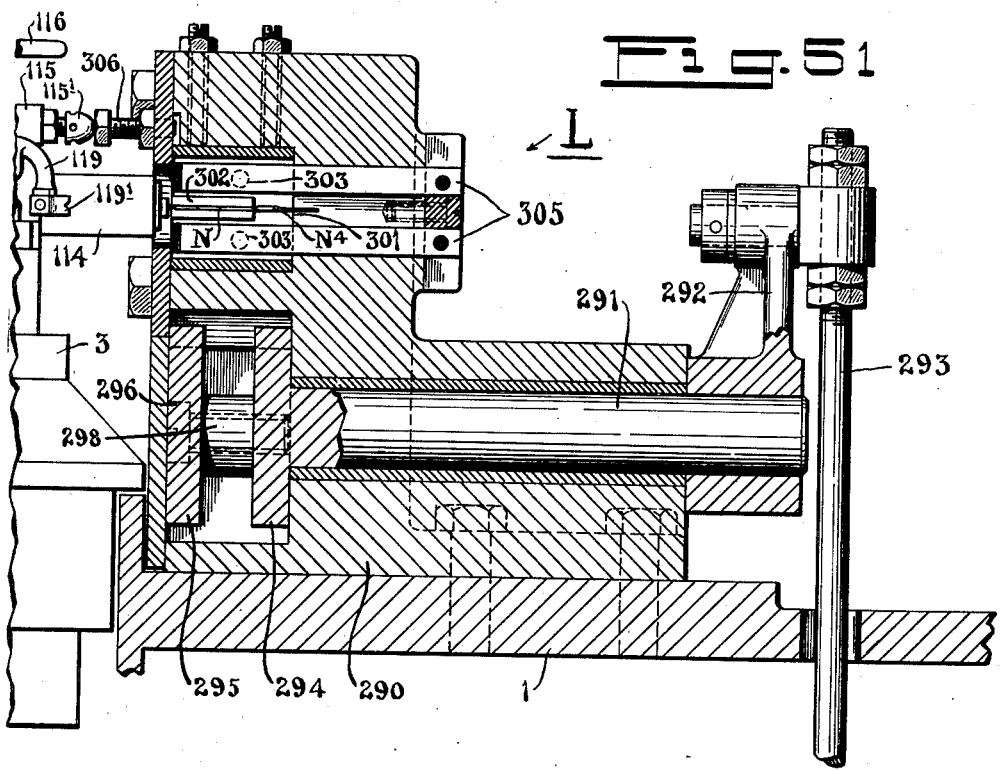
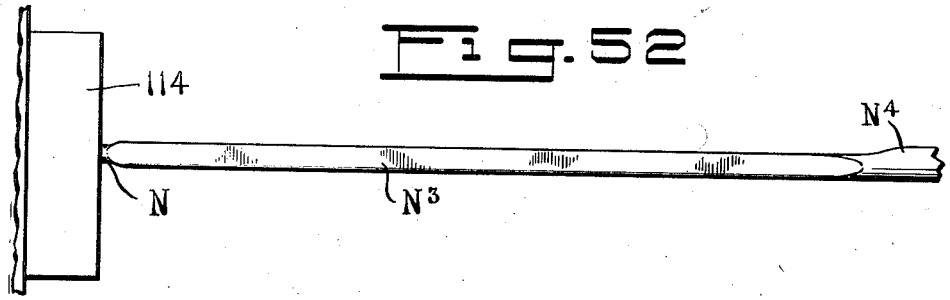
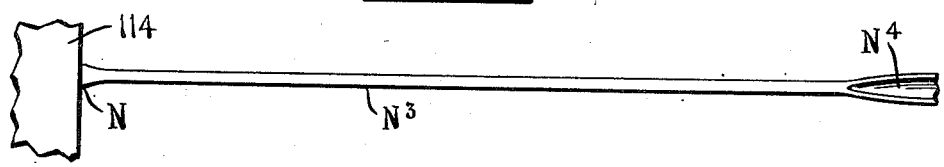
INVENTOR
Alfred Hofmann
BY
Darby & Darby
ATTORNEYS May 19, 1936.　　　A. HOFMANN　　　2,041,547
METHOD AND MACHINE FOR MAKING KNITTING NEEDLES
Filed June 20, 1934　　36 Sheets-Sheet 22
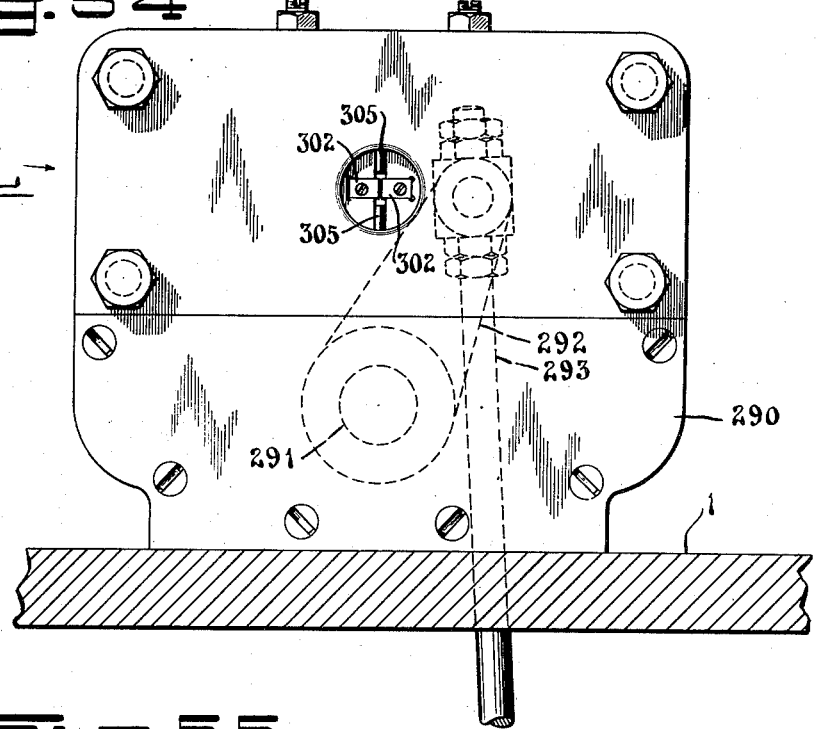
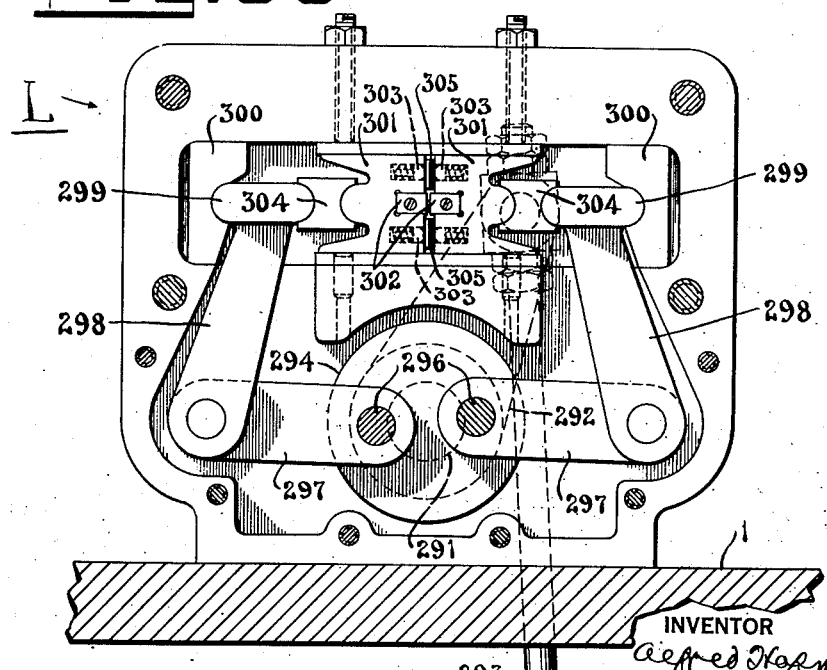

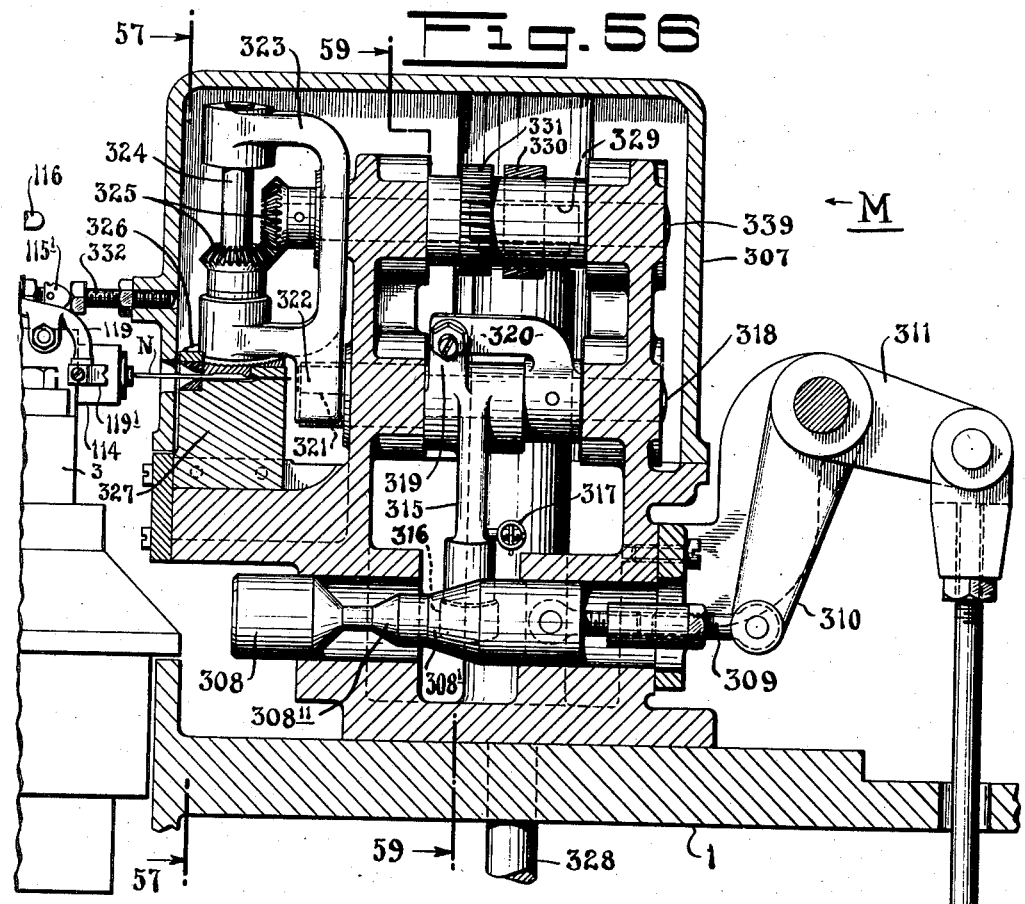
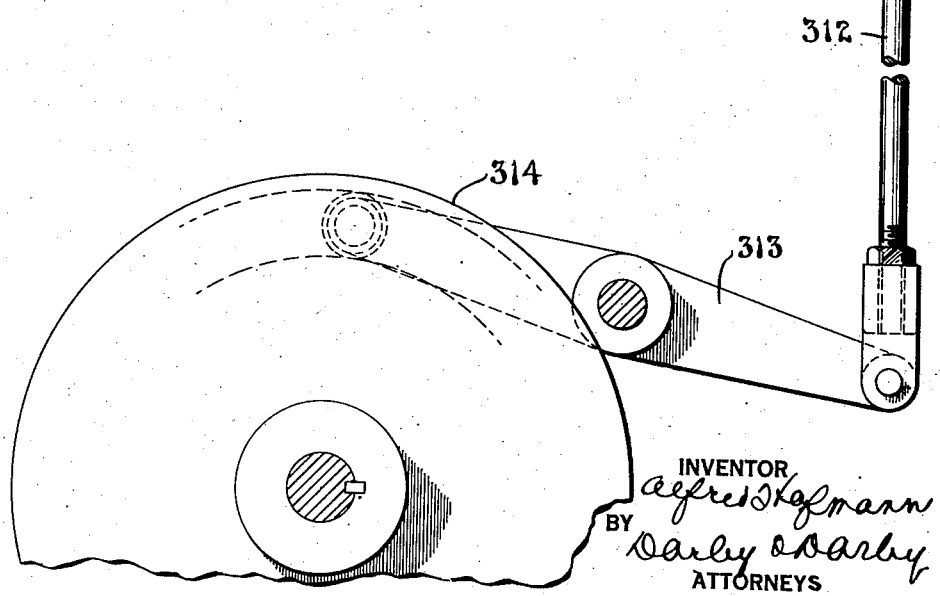

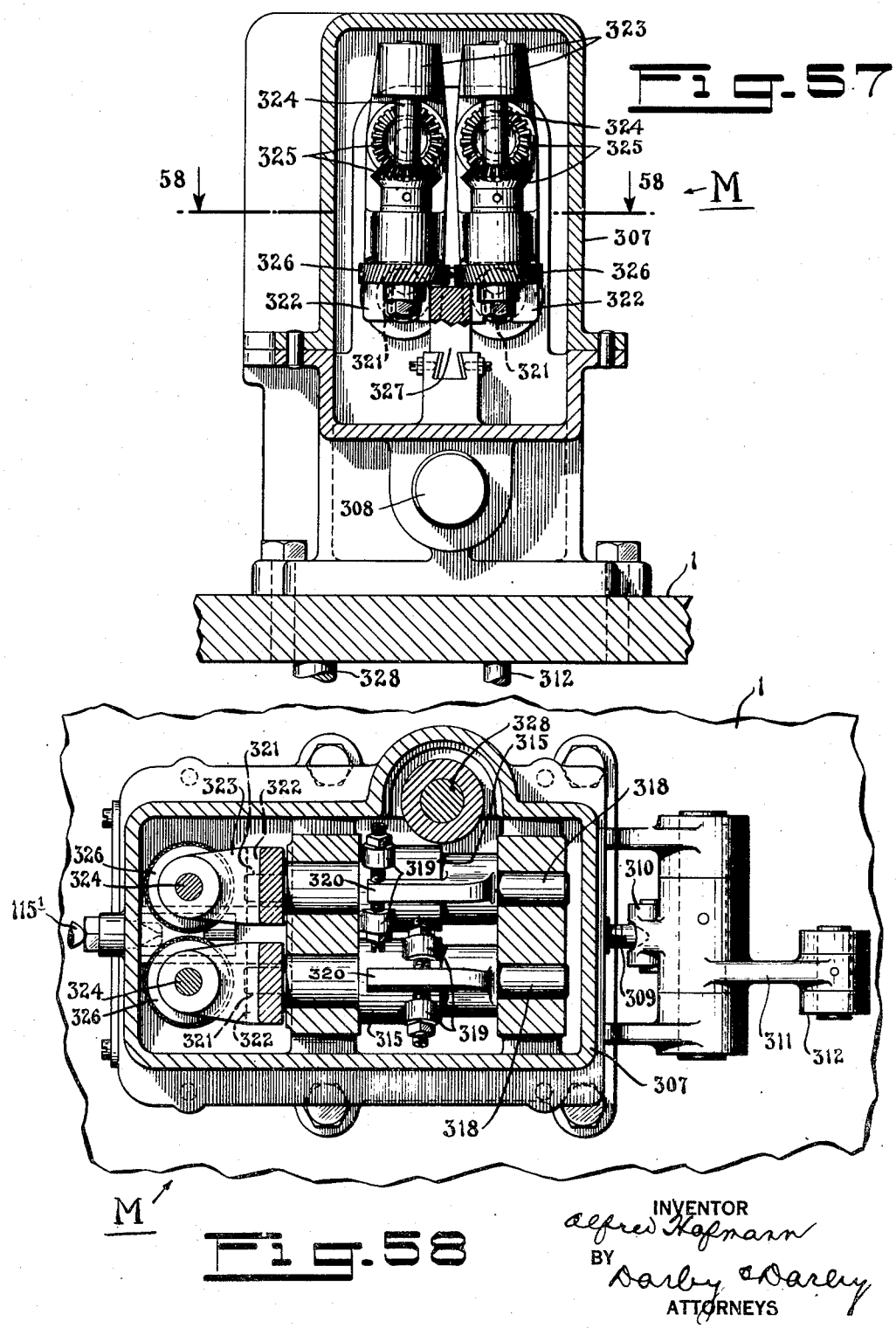

May 19, 1936.  A. HOFMANN  2,041,547

METHOD AND MACHINE FOR MAKING KNITTING NEEDLES

Filed June 20, 1934    36 Sheets-Sheet 26

INVENTOR
Alfred Hofmann
BY
Darley & Darley
ATTORNEYS

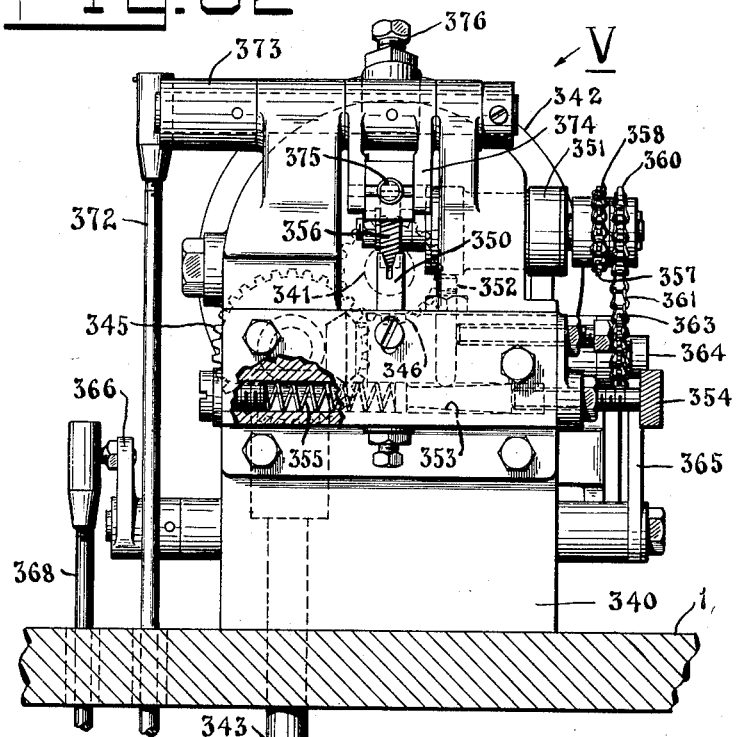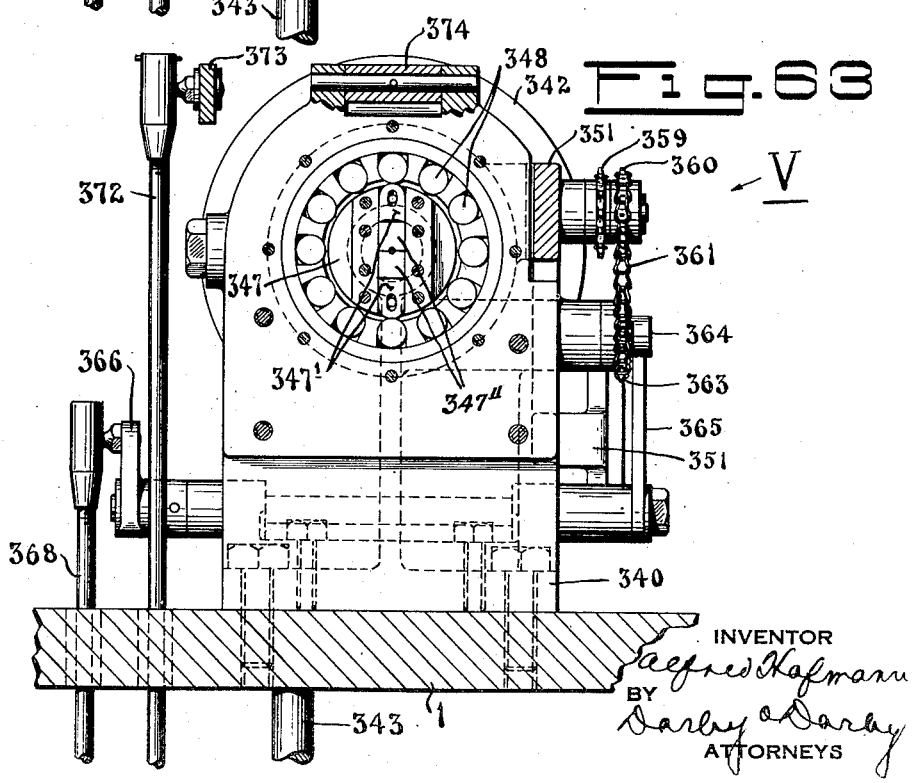

May 19, 1936.  A. HOFMANN  2,041,547
METHOD AND MACHINE FOR MAKING KNITTING NEEDLES
Filed June 20, 1934   36 Sheets—Sheet 28

INVENTOR
Alfred Hofmann
BY
Darby & Darby
ATTORNEYS

May 19, 1936. A. HOFMANN 2,041,547
METHOD AND MACHINE FOR MAKING KNITTING NEEDLES
Filed June 20, 1934 36 Sheets-Sheet 29

INVENTOR
Alfred Hofmann
BY
Darby & Darby
ATTORNEYS

May 19, 1936. A. HOFMANN 2,041,547
METHOD AND MACHINE FOR MAKING KNITTING NEEDLES
Filed June 20, 1934 36 Sheets-Sheet 30
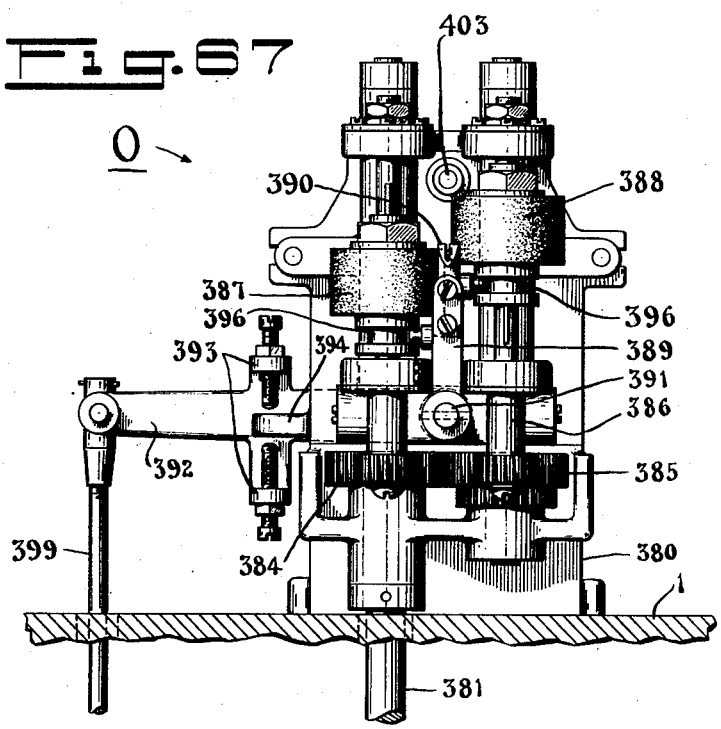
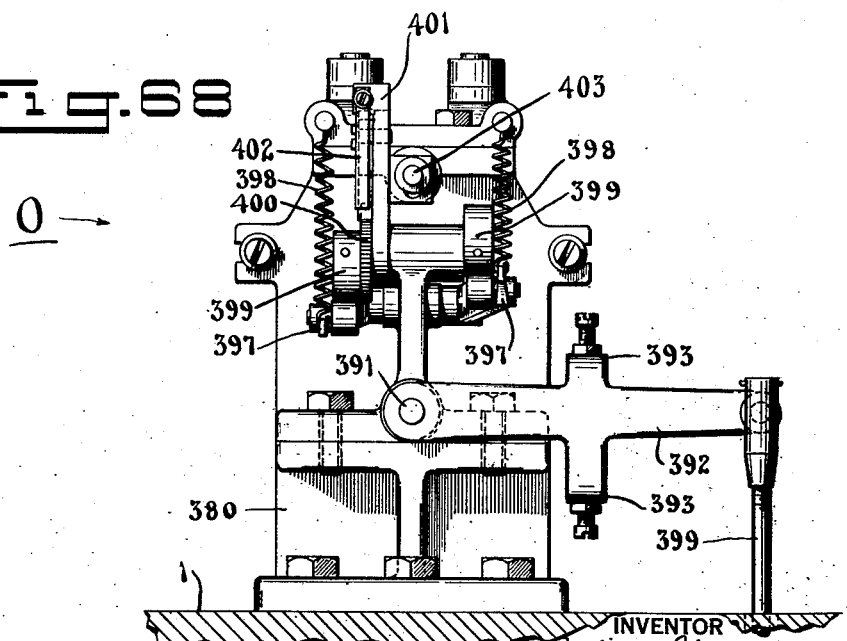
INVENTOR
Alfred Hofmann
BY
Darby & Darby
ATTORNEYS

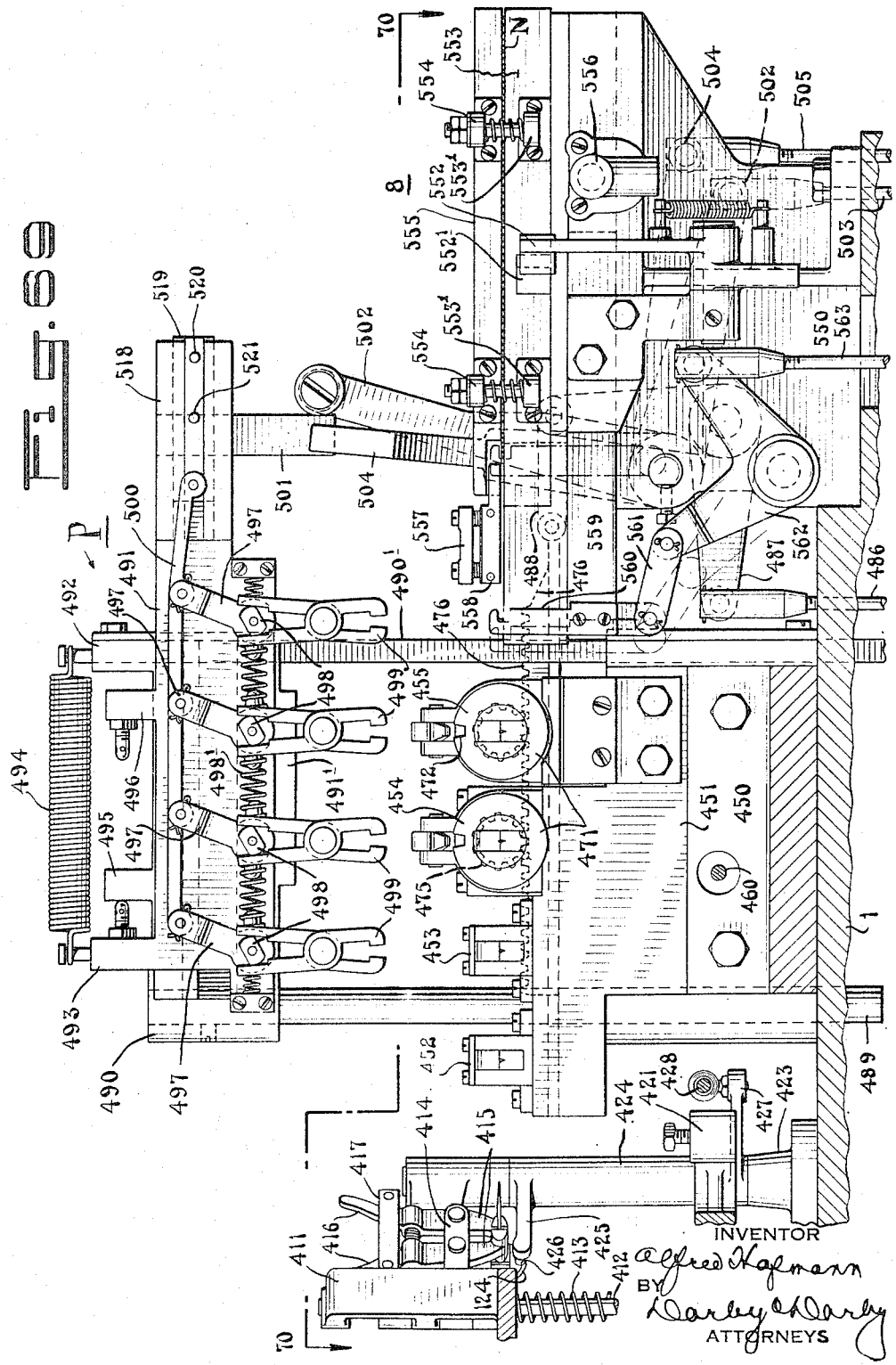

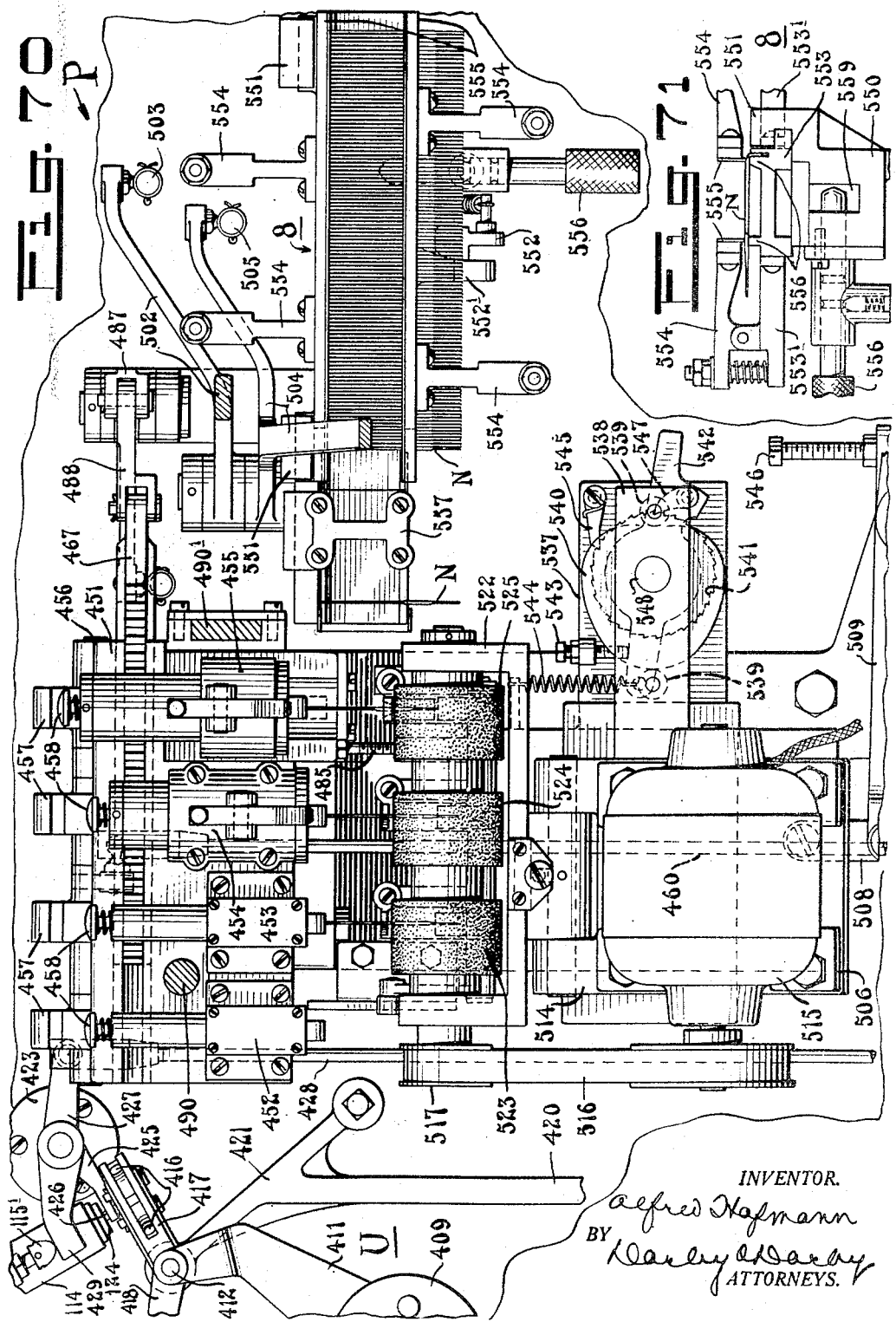

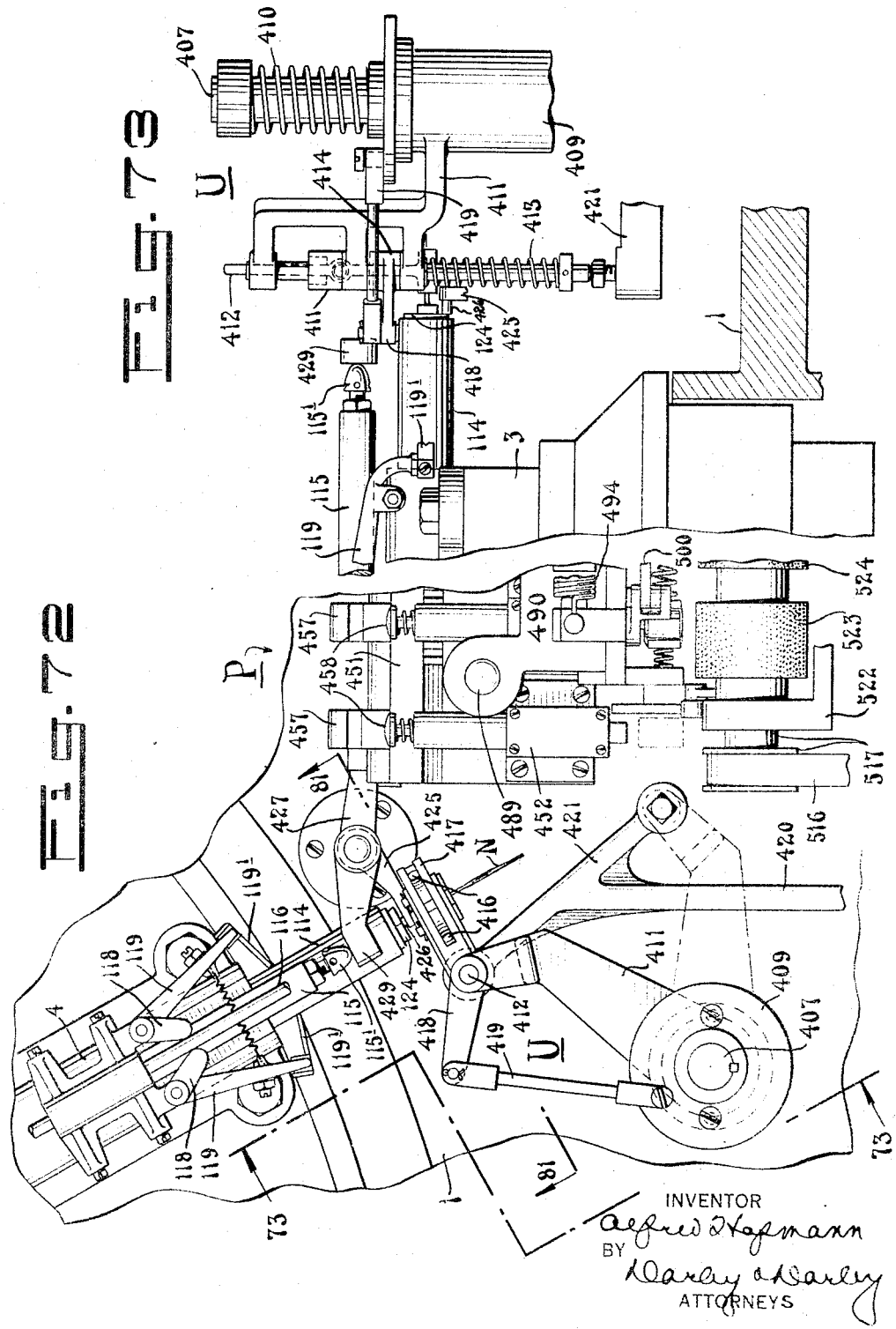

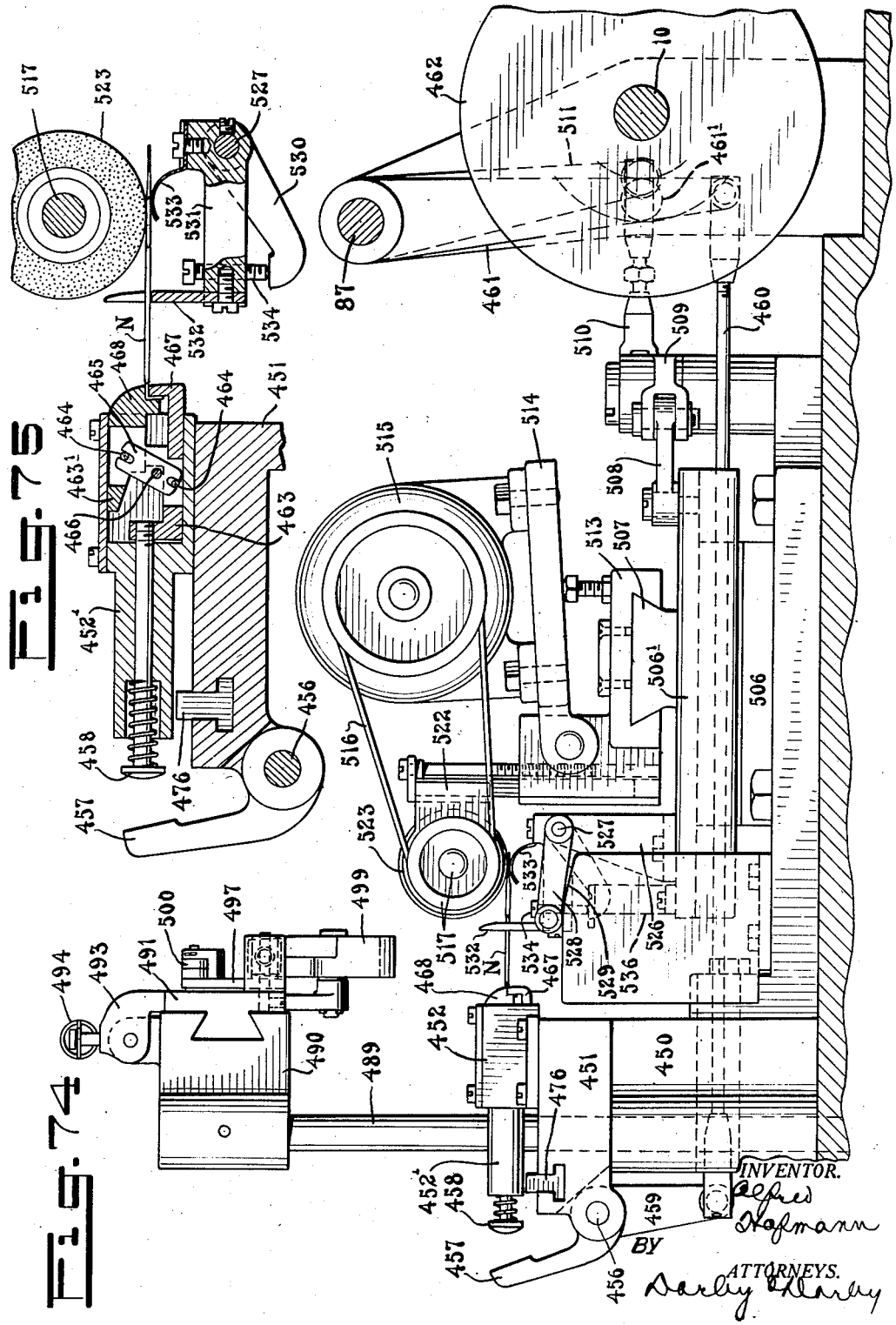

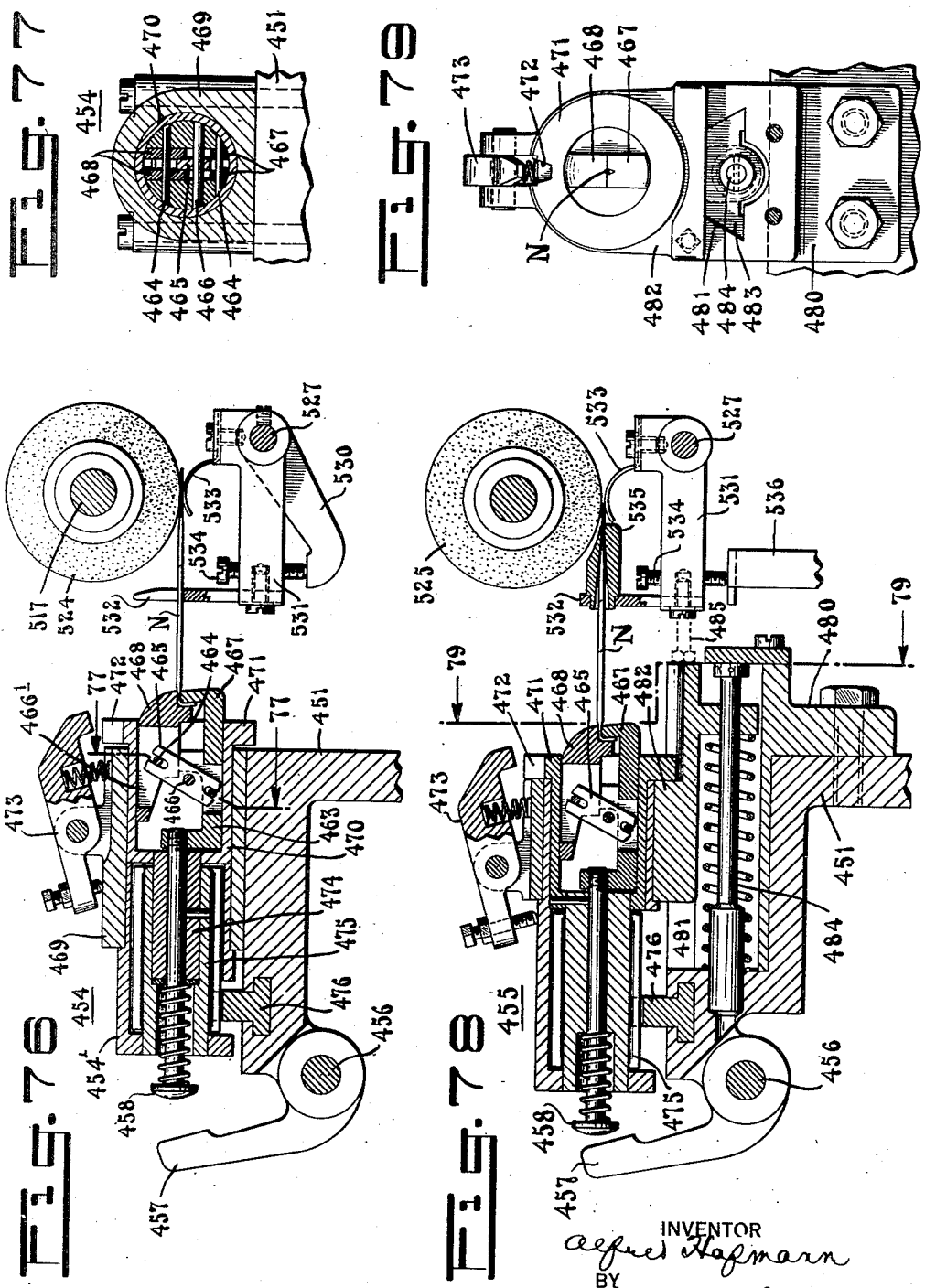

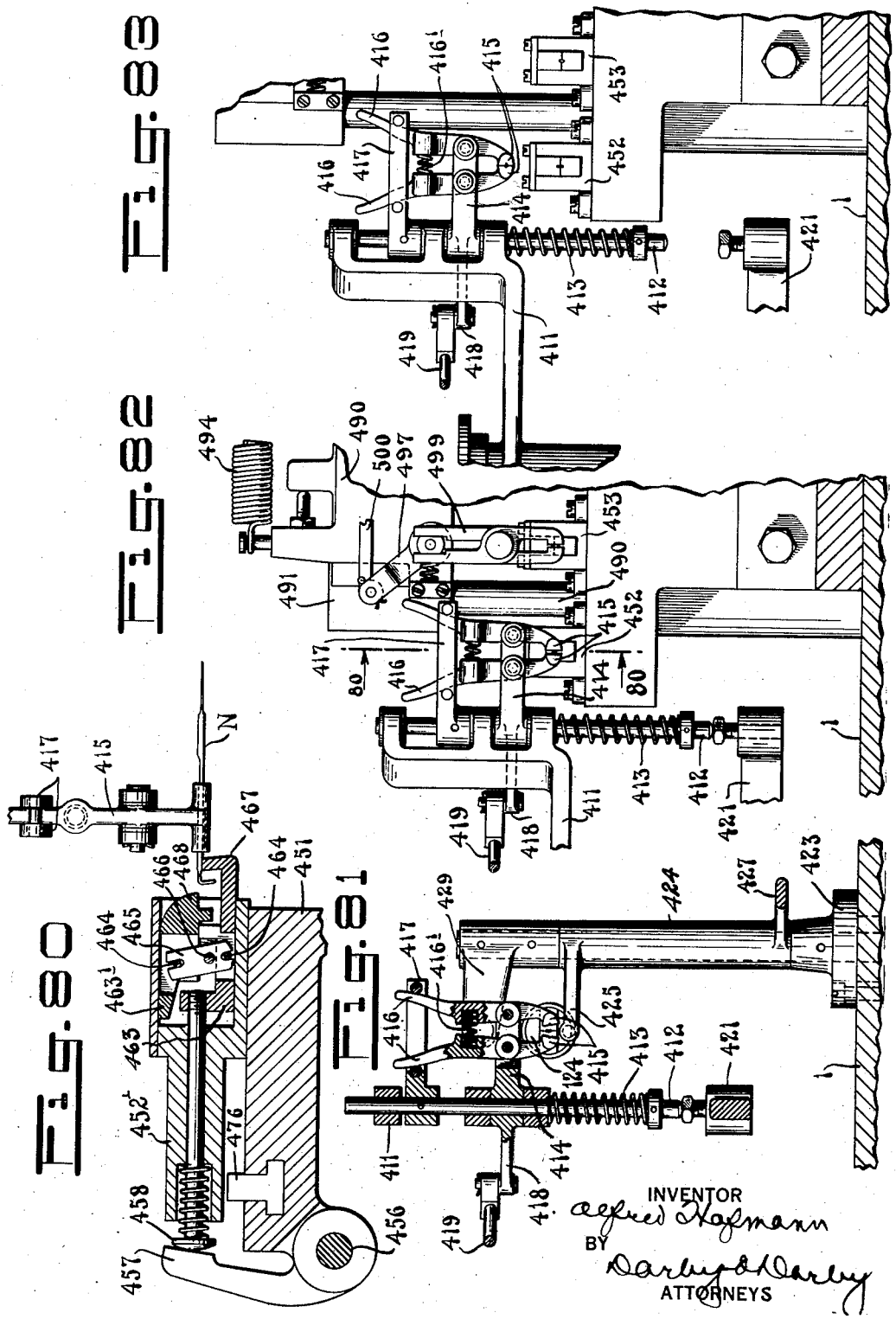

Patented May 19, 1936

2,041,547

UNITED STATES PATENT OFFICE 2,041,547

METHOD AND MACHINE FOR MAKING KNITTING NEEDLES

Alfred Hofmann, Palisade, N. J., assignor to Alfred Hofmann Needle Works, Inc., Union City, N. J., a corporation of New Jersey Application June 20, 1934, Serial No. 731,440

9 Claims. (Cl. 163—4)

An object of this invention is to provide a fully automatic machine for manufacturing complete, in a continuous operation from the raw material, knitting needles such as are employed for example in full fashioned hosiery knitting machines.

Another object of this invention is the provision of a rapid and continuous method of producing bearded knitting needles.

This invention resides substantially in the combination, construction, arrangement, relative location of parts, steps and series of steps, all as will be set forth in full detail in the following specification in connection with the attached drawings, and pointed out in the appended claims.

In the drawings,

Fig. 1 is a top plan view of the complete machine of this invention;

Fig. 2 is an elevational view of a needle produced by the machine of this invention;

Fig. 3 is an elevational view from the front side of the machine of the mechanism which feeds the stock, cuts it to length, the small turret and the attachment which bends the end to form the hook;

Fig. 4 is a top plan view of the small turret and the attachment which rounds the end of the needle before it is bent;

Fig. 5 is an elevational view of the small turret on the side of the cutting device from which the stock is fed, showing the attachment for rounding the end of the needle;

Fig. 6 is a vertical central cross sectional view through the small turret and the attachment for rounding the end of the wire;

Fig. 7 is an enlarged detail view showing the manner of bending the end of the needle to form the hook thereon;

Fig. 8 is a front view of the face of the attachment for rounding the hooked end of the needle;

Fig. 9 is a view on the plane 9—9 of Fig. 6;

Fig. 10 is an enlarged view showing the formation of the rounded end of the needle;

Fig. 11 is a plan view of the mechanism for indexing the small turret;

Fig. 12 is a similar view showing the apparatus in a different position;

Fig. 13 is an enlarged view showing how the indexing rollers on the bottom of the small turret may return past the indexing dog;

Fig. 14 is a cross sectional view taken on the line 14—14 of Fig. 11;

Fig. 15 is a second sectional view taken on the line 15—15 of Fig. 12;

Fig. 16 is an elevational view of the attachment for forming the hook on the rounded end of the stock, the operating mechanism therefor and the transfer mechanism for transferring the needles from the large turret to the grinding and polishing attachments;

Fig. 17 is a central vertical cross sectional view through the large turret showing the operating mechanism therefor;

Fig. 18 is a vertical longitudinal central cross sectional view through one of the chucks on the main turret;

Fig. 19 is a front end elevational view thereof;

Fig. 20 is a cross sectional view taken on the line 20—20 of Fig. 18;

Fig. 21 is a similar view with the chuck in open position;

Fig. 22 is a cross sectional view taken on the line 22—22 of Fig. 18;

Fig. 23 is a front end view of the chuck with a portion broken away;

Fig. 26 is a cross sectional view on the line 26—26 of Fig. 24;

Fig. 27 is a view of the beard end of the needle after the milling operation thereon;

Fig. 28 is a front elevational view of the swedging attachment for swedging the point on the beard end of the needle;

Fig. 29 is a cross sectional view on the line 29—29 of Fig. 30;

Fig. 30 is a vertical central cross sectional view through this attachment;

Fig. 31 is a cross sectional enlarged view of the mechanism for slowly feeding the needle into the swedging dies during the swedging operation;

Fig. 32 is a vertical cross sectional view through the dies showing the needle fully inserted, and showing the shape of the beard end of the needle after the swedging operation;

Fig. 33 is a cross sectional view on the line 33—33 of Fig. 35, showing the mechanism for milling the top of the stock just in back of the swedged point;

Fig. 34 is a cross sectional view taken on the line 34—34 of Figs. 33 and 35;

Fig. 35 is a cross sectional view taken on the line 35—35 of Figs. 33 and 34;

Fig. 36 shows the manner in which the top of the needle is milled in this attachment;

Fig. 37 is a cross sectional view on the line 37—37 of Fig. 36;

Fig. 38 is a front elevational view of the attachment with a portion of the casing broken away for milling a slot in the needle at the milled portion;

Fig. 39 shows the manner of milling this slot;

Fig. 40 is a cross sectional view taken on the line 40—40 of Fig. 39;

Fig. 44 is a vertical transverse central cross sectional view through the attachment for finally forming and enlarging the slot;

Fig. 45 is an enlarged view of the tool for this work;

Fig. 46 is a cross sectional view taken on the line 46—46 of Fig. 45;

Fig. 47 is an enlarged top plan view of the slotted portion of the needle;

Fig. 51 is a vertical central longitudinal cross sectional view through the attachment for forming the central flattened portion of the needle;

Fig. 52 is an enlarged side elevational view of the needle at this point;

Fig. 53 is a top plan view thereof;

Fig. 54 is a front elevational view of the attachment for flattening the needle shank to give it the form illustrated in Figs. 52 and 53;

Fig. 55 is a front elevational view of this attachment with the front cover plate removed;

Fig. 56 is a vertical central longitudinal cross sectional view through the attachment for milling the sides of the slot;

Fig. 57 is a cross sectional view taken on the line 57—57 of Fig. 56;

Fig. 58 is a cross sectional view taken on the line 58—58 of Fig. 57;

Fig. 62 is a front elevational view thereof with a portion of the casing broken away;

Fig. 63 is a cross sectional view taken on the line 63—63 of Fig. 64;

Fig. 67 is a front elevational view thereof;

Fig. 68 is a rear elevational view of this attachment;

Fig. 69 is a front elevational view of the multiple polishing attachment, a portion of the transfer device, and of the tray for receiving the finished needles;

Fig. 70 is a top plan view of the mechanism taken on the plane 70—70 of Fig. 69;

Fig. 71 is an end elevational view of the mechanism for receiving the finished needles;

Fig. 72 is an enlarged top plan view of a portion of the main turret, the multiple polishing attachment, and the transfer mechanism;

Fig. 73 is a side elevational view of the transfer mechanism and a portion of the main turret taken approximately on the plane 73—73 of Fig. 72;

Fig. 74 is an end elevational view of the multiple polishing attachment;

Fig. 75 is a longitudinal cross sectional view of the chucks of the multiple polishing attachment at the first polishing wheel;

Fig. 76 is a similar view of the chuck at the second polishing wheel;

Fig. 77 is a cross sectional view taken on the line 77—77 of Fig. 76;

Fig. 78 is a longitudinal vertical central cross sectional view through the chuck and associated mechanism at the third polishing wheel;

Fig. 79 is a view taken on the line 79—79 of Fig. 78;

Fig. 80 is a view of the chuck of Fig. 75 with the chuck open and taken on the line 80—80 of Fig. 82;

Fig. 81 is an enlarged vertical central cross sectional view of the transferring mechanism for delivering the needles from the main turret to the multiple polishing attachment;

Fig. 82 is a front elevational view of the transferring mechanism at the entering end of the multiple polishing attachment, showing the device for transferring the needles from the main turret in a position to deliver a needle to the first chuck of the multiple polishing attachment;

Fig. 83 is a view similar to that of Fig. 82 either before the needle is delivered to the first chuck of the multiple polishing attachment, or after it has delivered the needle thereto; and Fig. 84 is a top plan view of the tray for receiving the finished needles.

The general object of this invention is to provide an automatic and continuously operating machine for producing bearded knitting needles of the type fully shown in Fig. 2. The machine of this invention produces needles of this type directly from the raw stock, in the form of a mild tool steel wire, automatically with great rapidity and with extreme accuracy. The needles are produced by the machine of this invention having dimensions within a tolerance of plus or minus one one-hundredth of a millimeter.

An additional object of this invention is the provision of a continuous method of producing these needles.

The needle N consists of a hooked or bent end N1, which has the slightly rounded end N2. The portion N1 of the needle lies at an angle of 87 degrees with the longitudinal axis of the needle. The end N2 of the needle fits into a hole in the needle bar of a knitting machine, as is well known in the art for supporting it in the proper position in such a machine. The rounded end N2 of the needle is provided to facilitate the insertion of the needle in the needle bar. The central or shank portion N3 of the needle is flat and is formed by subjecting the stock to pressure at the sides to give it a rectangular cross section. The beard end of the needle comprises a portion N4 running into the sharp bend N5 and terminating in the beard end comprising the portion N6 and the pointed end N7. When the beard is closed the pointed end N7 lies in the slot in the portion N4 for a purpose well known in the knitting art.

The method

Figure 60:
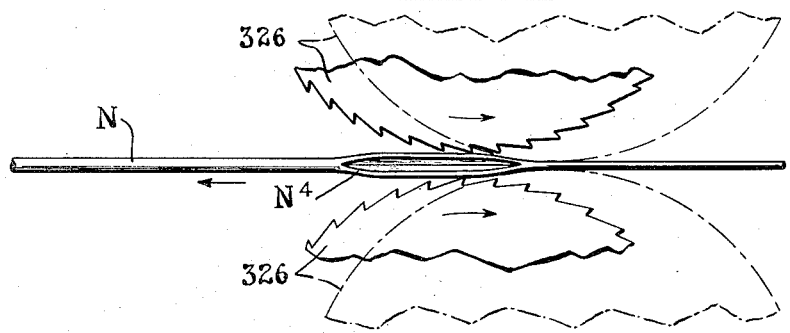
Fig. 60 is an enlarged top plan view showing the milling operation at the sides of the slot.
Figure 61:
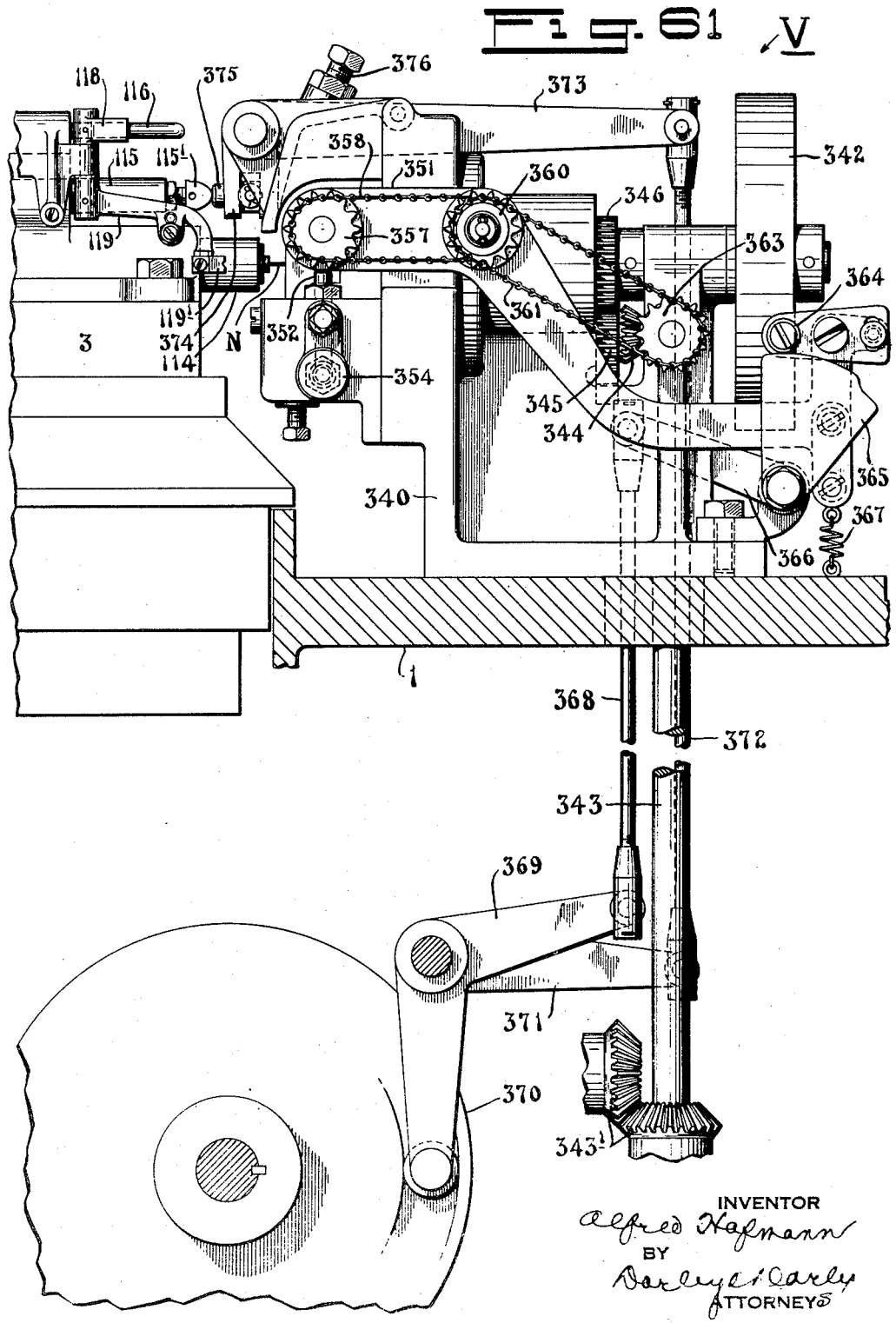
Fig. 61 is a side elevational view of the attachment for swedging the point and milling the top edges of the slot.
Figure 65:
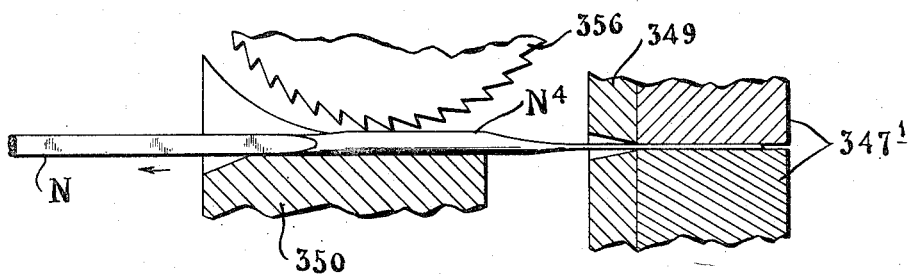
Fig. 65 is an enlarged detail view showing the relationship of the needle, the milling saw and the point swedging hammers.

The method of this invention consists in feeding the wire stock W along a straight line and subjecting it to a rolling action to straighten the wire. The wire is then cut into uniform lengths and rounded on one end. The rounded end is then bent to an angle of 87 degrees with the longitudinal axis of the wire. The other end of the needle is then milled or cut away to remove some of the material therefrom, and to give the needle at that end a circular cross section of reduced diameter, as illustrated in Fig. 27. The milled end of the needle is then hammered out into an elongated portion of circular cross section, as is clear from Fig. 32. During the hammering operation the stock is moved longitudinally of its length. The stock is then milled flat on the top thereof just in back of the hammered point, as indicated in Figs. 36 and 37. A slot is then cut at the milled portion as indicated in Figs. 39 and 40. The stock is then subjected to a brushing and polishing action to thoroughly clean it, and at the same time the hammered end is cut off to the exact length. The slotted portion of the needle is then subjected to pressure in a die to enlarge the slot and properly shape it as indicated in Figs. 45 to 47 inclusive. The flattened portion N3 is then formed intermediate the ends of the needle at the shank by subjecting the stock to pressure at the sides. The needle is then milled at the sides of the slots as indicated in Fig. 60, and is moved longiudinally of its length during the milling operation. The top edges of the slot are then milled and the extreme point is again swedged or hammered to reduce it to proper shape as indicated in Fig. 65.

Figure 66:
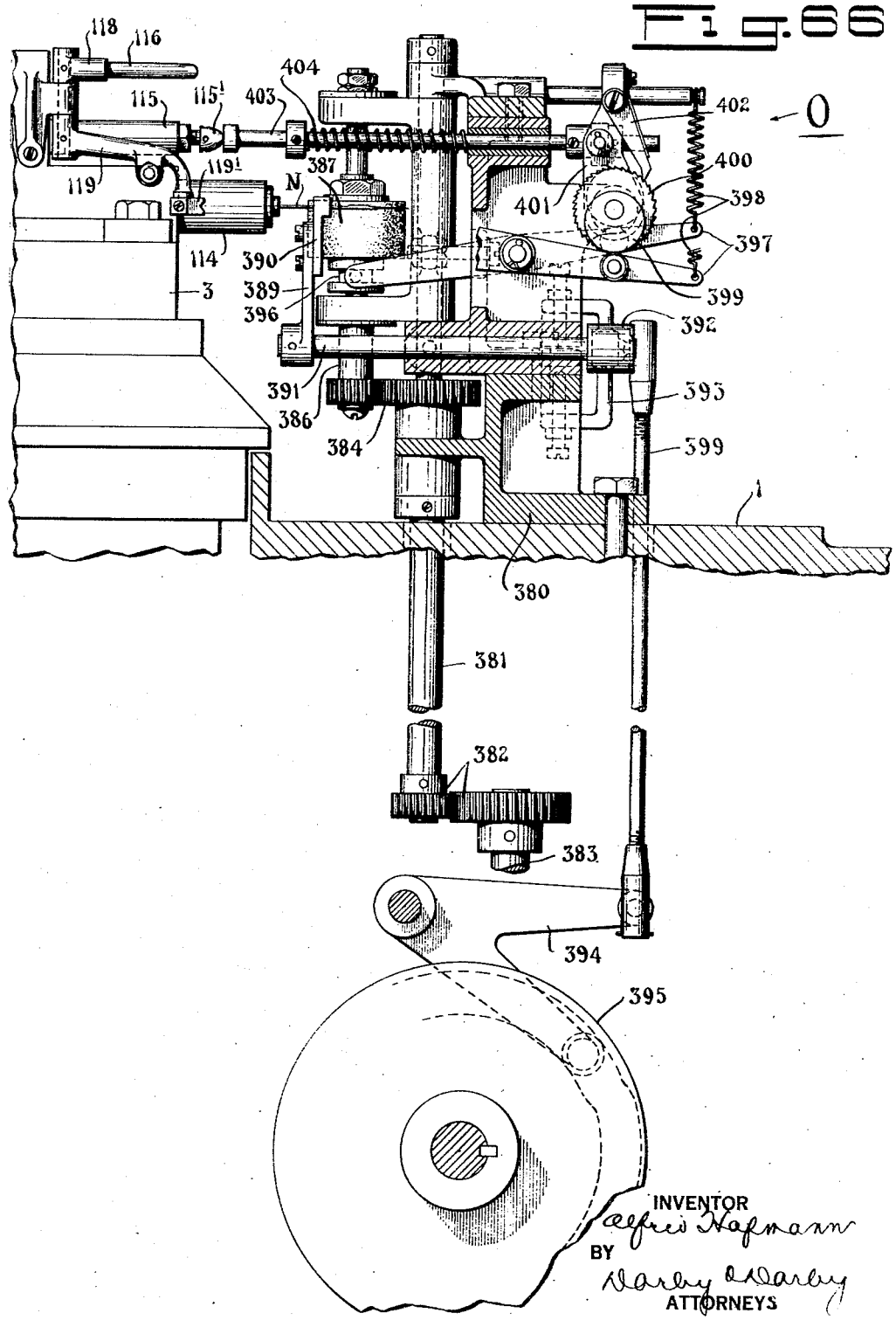
Fig. 66 is a side elevational view with some parts in cross section of the mechanism for polishing the sides of the slot.

During these operations the needle is moved longitudinally of its length. The sides of the slot are then ground and polished as indicated in Figs. 66 and 67. The needle is then polished on the top of the slot as indicated in Fig. 75, while the needle is moved relative to the polishing wheel. The needle is then polished at the slot and just in front of the slot as it is rotated on its longitudinal axis, as indicated in Fig. 76. The needle is then polished at the tip end as it rotates on its longitudinal axis, as indicated in Fig. 78. The needles are then heated adjacent the point where the bend N5 is to be formed and the bend is then made and the portion N7 offset from the portion N6. The needles are then finally tempered and cleaned and are ready for use.

General description of the machine

The general layout of the machine is clear from Fig. 1. The material is fed from the supply reel through the straightening device A to the cut-off device B. Before it is cut off it is delivered into the indexing turret C. This turret then presents the short lengths of wire to the device D which rounds the ends thereof by rolling. The small turret C then presents the needle to the attachment E for bending the hook N1 thereon. From there the needle is delivered by the small turret C to the large turret 3. This turret rotates in a clockwise direction in a step-by-step movement to present the projecting end of the needle for succeeding operations. The first operation is that of milling the end of the needle to the form indicated in Fig. 27, which operation is carried out in the milling attachment F. In the attachment G the milled end is hammered or swedged into an elongated point. In the attachment H the top of the stock in back of the swedged point is milled (see Fig. 36). In the attachment I the slot is milled as indicated in Fig. 39. In the attachment J the slot is cleaned of chips. In the attachment K the slot is enlarged and properly formed as indicated in Fig. 45. In the attachment L the shank is flattened as indicated in Fig. 52. As is apparent the needle is presented from one attachment to the next by the step-by-step movement of the main turret.

In the attachment M the sides of the slot are milled as indicated in Fig. 60. In the attachment V the top of the slot is milled and the point is again swedged as indicated in Fig. 65. In the attachment O the sides of the slot are polished as indicated in Fig. 66. From there the main turret delivers the needles to the transfer device U which transfers the needles to the multiple polishing attachment P, where the three polishing operations illustrated in Figs. 75, 76 and 78 are carried out. From there the needles are delivered to the tray indicated in Fig. 1 at R, and shown in detail in Fig. 84. These trays are then transferred by hand to a mechanism which subjects them to the heating or annealing device S. From this device they are delivered to the beard forming attachment T and from there are delivered in finished form.

Description of the machine

The machine comprises a table 1 suitably supported within a slightly raised central portion 2, within which the main turret 3 revolves. Mounted upon this turret in angularly displaced and radially extending position are the chucks 4 which carry the needles in a step-by-step movement from one operating head to the next. Suitably supported on the table is a supply reel 5 from which the wire stock W is fed. The wire passes through a wiping attachment 7 and around the guide wheel 6 into and through the straightening device A. This device may assume a number of well known forms, and by itself forms no part of this invention. As illustrated, it consists of a revolving cage having a plurality of rollers which travel around the circumference of the wire and straighten it as it passes therethrough. The wire W is advanced along its length by means of a gripping and feeding device illustrated in Figs. 1 and 3. Slidably mounted on the bar 9 is a carrier 19 upon which is mounted the fixed anvil 20. A movable anvil 21 is secured to the middle of the vertically slidable rod 22 which is connected to the supporting bracket 19 by means of springs as shown. The anvils 20 and 21 form gripping jaws which are normally urged together by means of the springs. The carrier 19 is slid back and forth on the bar 9 by means of a lever 14, which is operated by means of the crank 12 in a manner clear to those skilled in the machine arts. Crank 12 is mounted upon a shaft which is driven from the shaft 10 by means of the meshing bevel gears 11. Shaft 10 is journaled on the top of the table 1, and is driven by the meshing bevel gears 9' which in turn are driven through a gear train or other similar driving mechanism mounted under the table 1 and driven from a single source of power such as an electric motor.

At this point it is noted that the various driving gears, cams, shafts and the like, by means of which the operating power is distributed to the various parts of the machine are not shown in detail since those skilled in the art of machine design will readily appreciate that the drive itself may assume many forms suitable to varying conditions, and can readily be devised in an obvious manner to carry on the operation of all the parts in the proper timed relation. Thus shaft 10 is driven through the necessary power transmission mechanism mounted under the table 1 through the meshing bevel gears 9'. Thus as crank 12 slowly revolves the carrier 19 oscillates back and forth on the bar 9. When the carrier is at its extreme left hand position (Fig. 1), the upper anvil 21 moves down to grip the wire between it and the lower anvil 20. The carrier 19 then moves forward, pulling the wire behind it and pushing the forward free end ahead of it. When the carrier 19 reaches the extreme right hand position (Fig. 3), the upper anvil 21 is moved up to release the wire through the action of cam 23 bearing on the lower end of the rod 22. This cam is oscillated by means of a lever 24 pivotally connected to the operating rod 17. This rod, which is below the lever 14 in Fig. 1, is operated by means of a small camming surface 18 on the crank 12. Thus rod 17 is moved to the right, raising the upper anvil 21 and releasing the wire W. The carrier 19 immediately begins its return stroke to the left.

At this time a similar anvil, mounted on the vertically slidable rod 28, is gripping the wire by forcing it against the fixed anvil 27 under the action of the springs connected thereto. The lower end of rod 28 is pivotally connected by a link 26 to the bell crank lever 25 which is pivotally supported on the table 1. The bell crank lever 25 is oscillated by means of the link 16 which is oscillated back and forth by the cam 13. Those skilled in the art will readily understand how to form the cranks 12, 13 and 18 to effect the simple oscillation of these various rods and links. The bell crank lever 25 is also connected through the adjustable link 29 to a lever 30 (see Fig. 4), which is pivotally mounted on the support for the anvil 27. Mounted on the lever 30 is a cutter 31 which cooperates with the fixed cutter 32, and is positioned so that when these cutters are separated the feeding device may pass the wire W between them, as is clear from Fig. 3. Thus, as the wire is gripped in the fixed anvils the end thereof is cut off and the stock is held against movement during the return stroke of the feeding anvils 20 and 21. The end of the wire stock before the cut-off as it is fed forward is delivered into the small turret C. This turret is supported for linear movement in a direction parallel to the table top 1, and transversely of the line of feed of the wire W. This turret is mounted upon a carriage 34 which is slidably mounted on the supporting table 33. The turret comprises a cap 35 upon which the indexing dies 49 are mounted. The construction of these dies is clearly indicated in Fig. 6. The wire stock is fed longitudinally between the cut-off knives 31 and 32 while they are open, so that the free end passes into the indexing dies 49 and is brought to a stop against the bottom of the recesses therein.

The cap 35 is locked upon the rotatable spindle 36 which is journaled in the turret housing 34. A collar 37 is likewise locked to the spindle 36 and is provided with a peripheral flange 38 which projects beyond the cap 35. The lower end of spindle 36 is of enlarged diameter, as indicated at 39, and is provided with a plurality of lugs in the form of rotatable rollers, as indicated at 41. There are eight of these rollers, as is clear from Fig. 11. These rollers cooperate with an indexing lug, as will be described for rotating the small turret in steps of 45 angular degrees. The rollers 41 cooperate with the guides 42 formed on the bar 40, which is secured within a groove in the fixed supporting guide 33 for the turret carriage or housing 34. The rollers 41 cooperate with the indexing lug 43, which is pivotally mounted in the member 33. The carriage 34 is provided with a projecting arm 44, which is pivotally connected to the rod 45, which is connected to a pivotally mounted lever 45' (see Fig. 1). The lever 45' is pivotally mounted on the support 1, and is operated through a shaft by the cam 45'' (Fig. 1), which is mounted on a vertical shaft for rotation, and is driven through suitable drive connections from the power source, as will be clear to those skilled in the art. Thus, through the agency of lever 45' the turret carriage moves in a linear path towards and away from the main turret 3, in the proper timed relation.

Mounted on the peripheral flange 38 are eight fixed anvils 46, each of which is positioned in front of one of the indexing dies 49. A movable anvil or gripping jaw 47 is secured to the pivotally mounted U-shaped members 48 (see Fig. 3). Springs are provided as shown for normally holding the anvils 46 and 47 in gripping relation. The movable anvil 47 is raised away from the fixed anvil 46 by means of a finger 51 adjustably mounted upon the lever 50. This lever 50 (see Fig. 4) is pivotally mounted on the table 1, and is operated by means of a cam 52 (Fig. 5), mounted upon the shaft 10. The finger 51 opens the gripping chuck 46—47 on the small turret at the time that the wire stock W is being fed forward so that it may pass between them. As soon as the wire is fed so that its end seats in the adjacent indexing die 49, lever 50 is timed to move downwardly, disengaging finger 51 from the member 48. The spring may then cause the gripping anvils 46 and 47 to securely hold the wire in position, which in the meantime has been cut off from the supply from the main stock by the knives 31, 32. Rod 45 then moves to the left (Figs. 4 and 6), carrying the small turret with it, and presenting a preceding length of wire to the main turret as will be described later. Upon the return movement of the turret one of the rollers 41, as indicated in Fig. 11, engages the inclined face 43' of the indexing lug 43. Continued movement of the turret to the right will cause a counter-clockwise rotation (Fig. 5) of the turret through an angle of 45 degrees, so that one of the short lengths of wire in the turret will be moved into longitudinal alignment with the head D. Continued movement of the turret to the right will cause the end of the wire to be inserted within this head for operations thereon. When the turret moves to the left, (Figs. 4 and 15) the roller 41, in alignment with the dog 43, will move the locking dog 43 out of its path, as indicated in Fig. 13. The dog will then drop back to the position shown in Fig. 14, for engagement with the next roller 41, as the turret returns to the right. When the small turret presents one of the needles to the main turret the clamping anvil 47 is again moved away from the fixed anvil 46 through the agency of lever 53, which is pivotally mounted on the table, and is engaged at one end by means of the cam 54 likewise mounted on shaft 10. The free end of lever 53 engages a roller on the end of lever 55 which is secured to the shaft 56 journaled on the forward end of the carriage 34. Mounted on the shaft 56 is a short lever 57 positioned to engage the lower arm of the yoke 48 which supports the movable anvil 47. When the small turret moves to the left it inserts the free end of the needle stock into one of the chucks on the main turret, as is clear in a general way from Fig. 6, and as will be described in fuller detail below.

At 58 (Fig. 6) is a standard secured to the table 1 and supporting the members 59 and 63 in which the shaft 60 is rotatably mounted. The right hand end of the shaft is provided with a small pulley 61 which is driven by the belt 62 from the power source below the table.

Within the member 63, which is in the form of a hollow head, are the rollers 66 which are journaled on an enlarged head formed on the shaft 60, so that they rotate on their own axes which in turn revolve about the center of rotation of the axis of shaft 60. The hollow head is provided with a cover plate 64, which has a guide piece 65 for guiding the end of the needle between the rollers 66 when the turret moves to the right. Thus, as shown in Fig. 5, when the turret is at the extreme right it will have projected the end of the needle between the revolving rollers 66. As these rollers roll the end of the wire they are given a slight movement to the left, or towards the wire, so as to subject the end of the wire to a rolling action under sufficient pressure to give it the shape indicated in Fig. 10. The rollers 66 are moved towards the end of the wire by means of a grooved collar 67 secured to the shaft 60 and engaged by pins on the yoke 68 (Fig. 6). This yoke is mounted upon the end of lever 70, (Fig. 4) which is pivotally mounted at 69. The lever 70 is operated to have a slight oscillation by means of a cam 71 mounted on the shaft 10, (see Fig. 1). Thus the shaft 60 is oscillated back and forth in the proper timed relation to apply the necessary pressure through the roller 66 to slightly round the end of the needle. After this operation the turret is moved back to the left in time to present a new needle to a chuck of the main turret. On its return stroke it is again indexed through an angle of 45 degress to present a needle which has previously been rounded to the attachment E. It is at the time that the needles are being operated upon by the attachments D and E that a new length of wire is being fed into the aligned gripping anvils 46 and 47.

At the time that turret C is in the position indicated in Fig. 1, while a fresh length of wire is being fed in at one side and the end of another length is being rounded in the attachment D, the hook portion N1 is being formed on another length of wire in the attachment E. The construction of this attachment is clear from Figs. 3 and 16. It comprises a support 72 mounted on the table 1, having a slidable carriage 73 mounted on the slide members 72" therein, and adjustable transversely of the support by the adjusting screws 72' and longitudinally of the support by the adjusting screw 74. Mounted in the carriage 73 is another support 75 which may be longitudinally adjusted in the carriage by means of the adjusting screw 76 and vertically through the inclined engaging faces of carriage 73 and support 75 by means of the adjusting screw 76. A standard 77 is secured on the support 75 and may be longitudinally adjusted by screw 78 and vertically by screw 77'. Mounted on the standard for vertical oscillation is a carrier 79 which has a notch on the front face thereof, in which the anvil or gripping member 82 lies at its upper end. This notch is enclosed by a cover plate, as shown in Fig. 3, and there is provided a spring which resiliently resists upward movement of the member 82. By this construction the gripping member 82 is movable relatively to the carrier 79, and is positioned above a fixed anvil or gripping member 81 formed on the support 75. Mounted on arms projecting below the carrier 79 is a bending roller 80 which cooperates with the inner face of the member 81 to provide the forming surfaces between which the portion N1 of the needle is gripped.

The inner face of the anvil 81 is inclined at such an angle that the roller 80 in forcing the end of the needle thereagainst positions the portion or hook N1 of the needle at an angle of 87 degrees with the longitudinal axis of the needle. To effect these operations the carrier 79 is oscillated up and down. In Fig. 3 the carrier is shown in its downward position at the end of the hook forming operation. When the carrier moves upwardly the roller 80 moves above the end surface of the anvil 81, so that the needle may be withdrawn and a fresh needle inserted. The turret C moves the bent end of the needle out of the range of the attachment E by sliding movement to the left (Figure 4). Just before the roller 80 begins its bending operation the movable anvil 82 moves down to grip the wire against fixed anvil 81. The carrier is oscillated by the mechanism shown in Fig. 16. Journaled on a bracket is a bell crank lever 84 which is connected by the link 85 to an arm 86, pivotally mounted on the shaft 87 which is suitably supported in brackets above the shaft 10. The lower end of arm 86 is provided with a pin or roller which rides in a groove in the face of cam 89 (see Fig. 4) to cause the oscillation of the bell crank lever 84 with proper timing. A stud on the top of carrier 79 is pivotally connected by the links 83 to the free end of the bell crank lever 84. As will be apparent to those skilled in the art, by means of this mechanism the carriage 79 is oscillated in a vertical plane so that the roller 80, which is preferably peripherally grooved, as shown in Fig. 16, will form the hook on the end of the needle.

The needles after being acted upon in the hook forming attachment E are then delivered to one of the heads 4 of the main turret 3. This is accomplished by the shifting of the small turret to the position shown in Fig. 6, at which time the bent end of the needle is projected into a chuck in the aligned head 4 of the main turret. The construction and operation of the main turret and the heads 4 will now be described in connection with Figs. 17 to 23 inclusive. As shown, the table 1 is provided with a central depression which has a central opening. At the opening is a bearing member 90 upon which the star wheel 91 is mounted for rotation. This star wheel is of the usual construction and in the case of the machine shown, is provided with twelve radial slots 92, one for each of the twelve heads, and hence the twelve positions which the main turret travels through. Secured to the table 1 by means of bolts, as shown so as to hold it against movement, is a circular housing 93 provided with a cover plate 94 which has, in the case of the machine shown, twelve radial grooves 95 in which the members 96 slide back and forth in a radial direction. The springs 96' are connected so as to urge the members 96 back into the slots or grooves 95. Near the inner ends of the members 96 are the cam followers 97 in the form of rollers which engage the periphery of the suitably shaped cams 98. There are twelve of these cams mounted on vertical axes for rotation by means of the gears 99. Six of these cams are in one vertical plane and six are in another vertical plane as exemplified by the two particular cams shown. As soon as the parts are close together these cams are arranged alternately in different planes so that they may pass each other.

The driving gears 99 mesh with a main central driving gear 100, which is secured to a shaft 101 journaled on a vertical axis in the housing 93 as shown. The lower end of shaft 101 is provided with a drive gear 102 which is driven from the gear 104 through an intermediate gear 103. The gear 104 is secured to the main drive shaft 105 which may be driven from any suitable power source, such as for example an electric motor. An elliptical gear 106 is likewise mounted upon shaft 105 and meshes with another elliptical gear 107 which is secured to the shaft 108. The shaft 108 is provided with an indexing arm 109 having a roller 110 which cooperates with the slots 92 in the indexing or Geneva wheel 91. The purpose of the elliptical gears is to secure a variable speed output from a constant speed power source as is the usual purpose of elliptical gears. These gears are so positioned on their respective shafts that at the time the arm 109 is rotating the star wheel 91, shaft 108, will be moving rapidly. However, as the roller 110 leaves the cooperating slot 92, shaft 108 gradually slows down so that the star wheel 91 will remain at rest long enough for the operations on the wires in the main turret to take place.

The main turret 3 is connected to the star wheel 91, as is clear from Fig. 17. The inner ends 111 of the members 96 are of arcuate formation, and are provided with a groove on their top surface extending entirely across so that when all of the members are in the position shown in Fig. 17 they form a complete circle and the grooves on the top thereof match up end to end to provide a continuous circular groove concentric with the axis of rotation of the main shaft 101.

Secured in uniform angular spacing on the top of the turret are the guide blocks 112 in which the chuck housings 114, the stop members 115, and the finger operating rods 116 slide. The members 114, 115 are secured together by means of plates 113 which likewise serve to support the inner ends of the rods 116. Journaled on the lower ends of the plates 113 are rollers which are positioned to engage the members 96 in the groove as shown. The ends of rods 116 are slidably guided in sleeves 117 mounted on the guide blocks 112. A pair of short levers 118 are pivotally mounted in front of the sleeves 117 so as to be in line of movement of the rods 116 (see Figs. 1 and 17). These levers 118 are mounted on the same shafts for rotation with the longer arms 119 which project down into alignment with the ends of the chuck carriers 114. These arms are provided with fingers 119' (see Fig. 26) which in closed position, as shown in Fig. 17, merely serve to support the free ends of the needles without interfering with the sliding movement of the needles therethrough. When the rod 116 passes between the levers 118 the supporting fingers 119' are kicked out against the action of a spring between them (see Fig. 1) so that the ends of the needles are free to be inserted into the various attachments. The sole purpose of this mechanism is to support the free ends of the needles at all times when they are not being operated upon in view of the fact that they are only gripped at one end in the chucks. As will be apparent from Fig. 17, the members 96 do not revolve with the turret so that at the time the turret is revolving the cams 98 have moved the members 96 to the position shown in Fig. 17 when their ends 111 form a complete circle having a continuous groove in the top thereof so that the turret may revolve and the rollers on the plates 113 may revolve with it. As soon as the turret has come to a stop in the new position the cams 98 have a shape so that the springs 96' may move the members 96 radially outwardly, carrying with them the chucks 114, the stop rods 115, and the supporting finger operating rods 116.

The main turret chucks are shown in detail in Figs. 18 to 23 inclusive. They comprise the rods 120 which are pinned to the housings 114 by means of the pins 121. The rods 120 are forked at one end and have mounted therein the chuck jaws 124 which are pivotally mounted on the pins 123, and each pair of which has a compression spring 125 mounted between them. The outer faces of the chuck members 124 are inclined outwardly and engage the end of a sleeve 122 which is slidably mounted in the housing 114, and which in turn surrounds the rod 120. The spring 128 normally urges the sleeve 122 outwardly, causing the chuck jaws 124 to be in the position illustrated in Figs. 19 and 20. The jaws are shown in open position in Fig. 21. One of these jaws has a pin 126 which may move into aligned recess in the other jaw. The jaws are provided with gripping anvils 127 as shown. As will be apparent from these figures, when pressure is applied to the end of the sleeve 122 to move it inwardly against the reaction of spring 128, spring 125 will cause the jaws 124 to spread. The hooked end N2 of the needle may then be passed between the jaws and against the stop pin 126. As pressure on the sleeve 122 is relieved the spring 128 moves the sleeve outwardly which brings the chuck jaws together by reason of their inclined faces bearing on the end of the sleeve. Thus the end of the needle is gripped between the gripping anvils 127.

The device for moving the sleeves 122 against the action of springs 128 will now be described. Pivotally mounted on a bracket 130, supported on the table is a lever 131 which has thereon a lug or button 132 positioned as is indicated in Fig. 6, so that it may contact the end of the jaws 124 (see also Figs. 18, 19 and 23). After the turret casing 114 has been fully projected through the action of cam 98 to the position shown in Fig. 6, arm 131 is moved towards the turret so that its lug 132 forces sleeve 122 inwardly, permitting the jaws 124 to open. The proper positioning of the chuck member 114 is controlled by an adjustable set screw 133, likewise mounted on the bracket 130. This set screw is positioned to be engaged by the adjustable head 115' mounted on the positioning rod 115. By this arrangement the position of the chuck assembly 114 may be accurately predetermined so that the small turret will project the bent end of the needle between the jaws and against stop 126, without crowding or binding the needle. Arm 131 is operated by means of a rod 134 which is pivotally connected to a lever 135, pivotally mounted on shaft 87. This lever is operated at the proper time by cam 136 (see Figs. 4 and 5). Thus through this mechanism the chuck is opened at the proper time as described. The opening of this chuck is accomplished so that as turret C moves up to the main turret the bent end of the needle may pass in between the jaws 124 and against the stop pin 126. Arm 131 then withdraws the lug 132, so that spring 128 may push the sleeve 122 outwardly clamping the gripping anvils 127 around the hook portion of the wire.

As the cam 98 moves member 96 back towards the center of the machine, rod 116 is withdrawn from between the short levers 118, permitting the fingers 119' to grip the free end of the wire, which is now released by the small turret and support it. The main turret is then indexed by the star wheel so that the chuck just described is moved into alignment with the milling head F. Cams 98 then retreat permitting the spring 96' to move member 96 out and away from the center of the turret, and carry with it the chuck casing 114, the stop and positioning device 115, and the finger operating rod 116.

Figure 24:
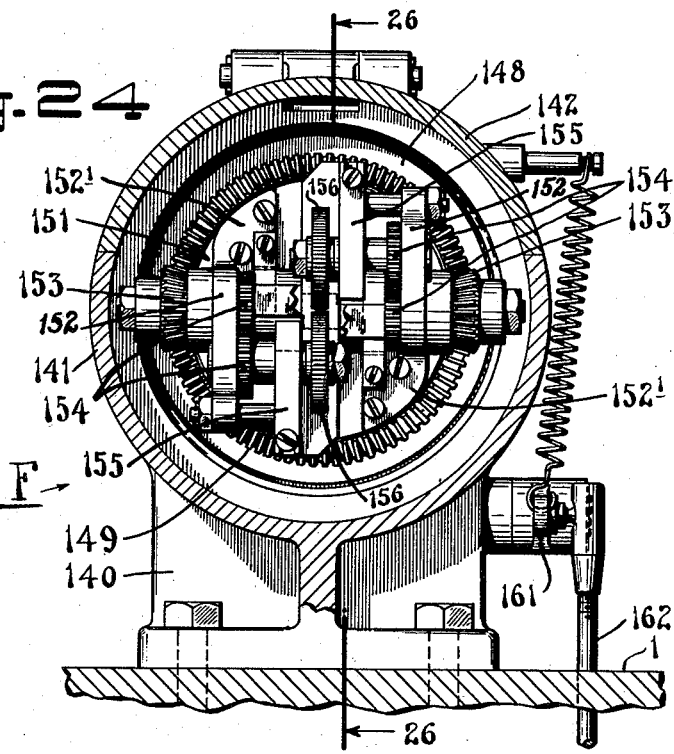
Fig. 24 is a cross sectional view on the line 24—24 of Fig. 26 showing the mechanism for milling the beard end of the needle.
Figure 25:
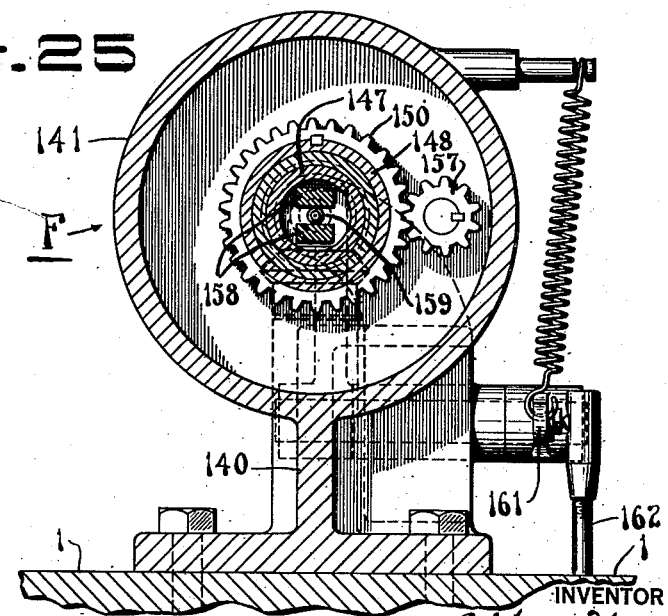
Fig. 25 is a cross sectional view of this mechanism on the line 25—25 of Fig. 26.

The milling attachment F, which reduces the diameter at the end of the needle in preparation for swedging is illustrated in Figs. 24 to 26 inclusive, and the form of the needle after the milling operation is shown in Fig. 27. This attachment comprises a support 140 mounted on the table 1, and formed into a housing 141 having a pivotally mounted cover 142 upon which another set screw 143 is mounted for engagement with the adjustable stop button 115' on the positioning rod 115. Thus by this mechanism the chuck assembly is properly positioned at this attachment. A pair of beveled gears 144, driven from the power source, operate the shaft 145, and the upper meshing beveled gears 146. One of these beveled gears is keyed to an enlarged shaft 147 journaled in the housing 141.

Mounted around the large sleeve for the shaft 147 is a circular plate 148 which has keyed thereto a gear 150 which locks with a fixed gear 157 (see Fig. 25) mounted on the housing 141. These gears and plate are locked in the housing through the flange 151 of shaft 147. The plate 148 supports a fixed bevel gear 149. Mounted on the enlarged end 151 of shaft 147 are the brackets 152' in which are journaled the bevel gears 153 which mesh with the bevel gear 149. These bevel gears drive the pairs of gears 154, one of each of which is secured to the same shaft to which one of the bevel gears 153 is attached and the other of which is secured to a short shaft upon which the milling cutters 156 are mounted. The milling cutter shafts are journaled in the pivotally held brackets 155 and 152. Thus the milling cutters 156 are caused to revolve on their axes through the gear trains which in turn are driven by reason of the fact that the supporting mechanism therefor revolves with shaft 147. Thus the milling cutters as they cut rotate around the periphery of the wire, maintaining a circular cross section while reducing its diameter.

Pivotally mounted on the same pair of shafts which carry the bevel gears 153 are the brackets 155 and 152.

Pivotally mounted on brackets 155, as shown in Fig. 26, is a pair of bell crank levers which have the arms 158 projecting into a recess in the shaft 147 and provided with springs for urging them towards each other. The other arm of these bell crank levers carries a set screw to adjust the bell crank levers into proper relationship with the pivotally mounted brackets 155.

The purpose of journaling the milling cutters in the pivotally mounted brackets 152 and 155 in connection with the pivotally supported bell crank levers is so that they may be opened at the time the end of the wire is inserted between them, and may be closed for the milling operation when the wire is slowly removed from between them. The movement of the milling cutters from and towards the end of the wire is effected by means of the slidably mounted shaft 159 which has an inner conical end which passes between the arms 158 and the bell crank levers. Rod 159 is shown in Fig. 26 at the left hand position, at which time it has forced the arms 158 apart against the action of the springs resting between them and the inner wall of the recess in shaft 147, thereby moving the milling cutters together. The action of moving the milling cutters towards each other does not occur instantaneously, but is a progressive action determined by the slope of the conical end of the rod 159. In other words, as the milling action goes on, these cutters gradually move together until the end of the wire is reduced to the desired minimum diameter. The sliding movement of rod 159 is effected through the pivotally mounted lever 160, which is operated by lever 161 through the link connection 162 and the bell crank lever 163, which in turn is given the proper movement by the cam 164. Thus, at the beginning of the operation the milling cutters 156 are wide open and the chuck assembly 114 projects the end of the wire between them. Cam 164 then begins to slowly move rod 159 to the left (Fig. 26), gradually moving the milling cutters towards each other, until the rod 159 has moved in the full distance. In the meantime, of course, the cutters are rotated about the surface of the wire, giving it a circular cross section, while the chuck 114 slowly withdraws the wire.

The end of the wire is supported as shown in Fig. 26 in a guide mounted on 152'. The chuck assembly 114 is then gradually withdrawn with the result that the wire is milled down at the end to its predetermined diameter. After the wire is fully withdrawn the main turret moves on and cam 164 continues its operation to withdraw arm 160, permitting the spring around the rod 159 to follow it as it moves to the right.

*Swedging attachment G*

After the milling of the point in attachment F, the turret is again indexed so that the needle is presented to the swedging attachment G illustrated in Figs. 28, 29, 30 and 31. This attachment comprises a supporting guide 165 secured to the table 1, in which is mounted for longitudinal adjustment a carriage 166, which may also be transversely adjusted by means of the screws 167. The longitudinal adjustment is effected by means of the screw 166' (Fig. 30). Mounted on the carriage 166 is a housing 168 provided with a removable front plate 169. Journaled in the housing on roller bearings is a shaft 170 which is driven by means of the pulley 171, the belt 172 and the driving pulley 173 mounted below the table and driven from the power source in any suitable and apparent manner.

The shaft 170 is provided with a fly wheel 174 to steady the operation thereof. The inner end of the shaft is provided with an enlarged head 170' upon which are mounted for radial sliding movement the hammers 175 which are held to the head by means of the plates 175', and are permitted sliding movement by means of the pin and slot connection as is clear from the drawings. The hammers 175 operate upon the forming dies 175". Secured between the plates 175' is a central plate 177 having a guiding die 178 with a conical end to guide the point of the needle therethrough into position to be engaged by the hammers. Mounted within a retaining ring, surrounding the head 170', as is clear from Fig. 29, are a plurality of weights 176 which may be in the form of balls, rollers, or the like, and positioned so as to catch the outer ends of the hammers 175 as they revolve past the weights. It will be apparent without further description that as the head revolves and the outer ends of the hammers 175 strike the weights they are driven inwardly, causing the dies 175'' to hammer and swedge the pointed end of the needle as they revolve about it on the axis thereof. Pivotally mounted on the cover plate 169 is a lever 179 which is connected at the rod 180 to a pivotally mounted bell crank lever 181, which is in turn oscillated by a cam 182 mounted below the table and likewise driven in any suitable manner from the power source. The lever 179 is connected to a shorter lever 183 which has a forked end 184 engaging a pin 187 (Fig. 31) which passes through a small plunger 186, slidably mounted in a sleeve formed on the cover plate.

The movement of the pin 186 towards the head is adjustably limited by means of a transversely slidable pin 185 having a cut in the surface thereof inclined to the axis of the pin 185. The transverse position of the pin 185 with respect to the pin 186 may be adjusted by means of the screws 188. The pin 186 is positioned to engage the adjustable button 115' on the rod 115 previously described.

The chuck assembly 114 is fed towards the attachment as previously described until the contact head 115' engages the end of the slidable pin 186, which is at its extreme left hand position, and at which time the point of the needle is just passing between the forming dies 175''. Further movement of the chuck assembly 114 towards the head is then controlled by the pin 186, and is no longer controlled by the corresponding cam 98 (Fig. 17). Lever 179 then rises slowly under the action of cam 182, and the interconnecting mechanism, so that the pin 186 gradually retreats to the right (Fig. 30) until it engages the base of the slide on pin 185 which has been previously adjusted. The chuck assembly 114 follows the retreating movement of the pin 186 under the action of spring 96' (Fig. 17). Thus the point is swedged or hammered as it is slowly inserted to the full depth between the dies 175''. Any further movement of the needle into the hammering dies is prevented when pin 186 is stopped by the pin 185. The exact position of all of the elements can obviously be effected by the many adjustments provided both for the carriage for the attachment and for the main chuck assembly.

There is of course some hammering on the point as the needle is withdrawn, but the operation is of short duration since the needle moves out from between the hammers quite rapidly. The relationship of the guiding die 178, the needle and the hammering dies is clearly shown in Fig. 32.

*Attachment H for milling a flat on the top of the needle*

The construction of the milling attachment H is clearly shown in Figs. 33, 34 and 35. The part of the needle which is milled is clearly shown in Figs. 36 and 37. This attachment comprises a fixed base 189 secured to the table 1 and provided with a housing 190. At 191 is a shaft driven from below the table from the power source, which in turn drives through the meshing bevel gears 192, the gear train 193, 194 and 195. Gear 193 is mounted on a fixed axis while the idler gear 194 and the gear 195 are rotatably mounted on the arm 197' which is pivotally mounted on the axis of gear 193. Gear 195 is attached to a short shaft to which the milling cutter 196 is secured. This milling cutter is positioned over an anvil 197'' (Fig. 35), which is mounted in back of the guide piece 197, which has a conical opening for guiding the needle on to the anvil. The main turret after withdrawing the needle from the attachment G rotates as previously described to present the needle to the attachment H and to insert it therein into the position shown in Fig. 35. This position is accurately determined by the adjustable stop button 115' and the adjustable stop screw 211 mounted on the housing 190.

The lever 197' pivotally movable supports the cutter so that the cutter is raised during the insertion of the needle and is then moved down so as to engage the top of the needle and to be gradually fed thereinto to get the proper depth of cut. As soon as the milling cutter has cut to the proper depth the corresponding cam 98 begins to cause the retreat of the chuck assembly 114, gradually pulling the needle out as the top thereof is milled to the end or to the point where the swedged end begins (Fig. 36). The movement of the milling cutter into contact with the needle is accomplished by means of a cam operated lever. The end of lever 197' is provided with an arm 198 which terminates in a pin 199 riding in the forked end 200 of the lever 201. This lever is pivotally supported on a screw 202 which is mounted in a block 203 vertically adjustable by means of the screw 204 (Fig. 33), so as to determine the range of movement of the milling cutter. Lever 201 is provided on its outer end with a roller 205 which engages an oscillatable cam 206 which is pivotally mounted on the housing and secured to a shaft to which the lever 207 is secured. Lever 207 is connected by a rod 208 to a pivotally supported bell crank lever 209 oscillated by a cam 210 driven from the power source below the table. Thus after the needle is fully in and resting on the anvil 197'' the cutter is fed into it as cam 206 moves upwardly, causing the forked end 200 of lever 201 to move downwardly (Fig. 35). This movement of lever 201 causes lever 197' to move downwardly to the proper depth. The needle is then slowly withdrawn, milling a complete flat on the top thereof.

*Slot cutting attachment I*

The attachment for cutting the slot at the milled flat is shown in Fig. 38. The details of this structure are not given since they are exactly the same as the details of the structure for milling the flat, and shown in Figs. 33 to 35 inclusive. The only difference between these two structures is in the thickness of the milling cutter. Thus in the arrangement of Fig. 38 the milling cutter or saw 214 is thin enough to mill a slot in the needle at the flat as is clearly illustrated in Figs. 39 and 40. The structure involves the casing 212 and the power driven shaft 213, similar to the casing 190 and the driving shaft 191 of the attachment shown in Figs. 33 to 35 inclusive. In the slot milling attachment the saw is mounted on the end of a pivotally supported lever so that the saw is raised until the needle rests on the anvil below it after which the saw is fed to the proper depth and the needle slowly withdrawn as the slot is lengthened to the desired amount.

Since the two structures are the same with the exception of the thickness of the saw, no further detail is believed necessary to describe the attachment I.

*Attachment J for brushing the slot clean and cutting off the end of the needle*

Figure 41:
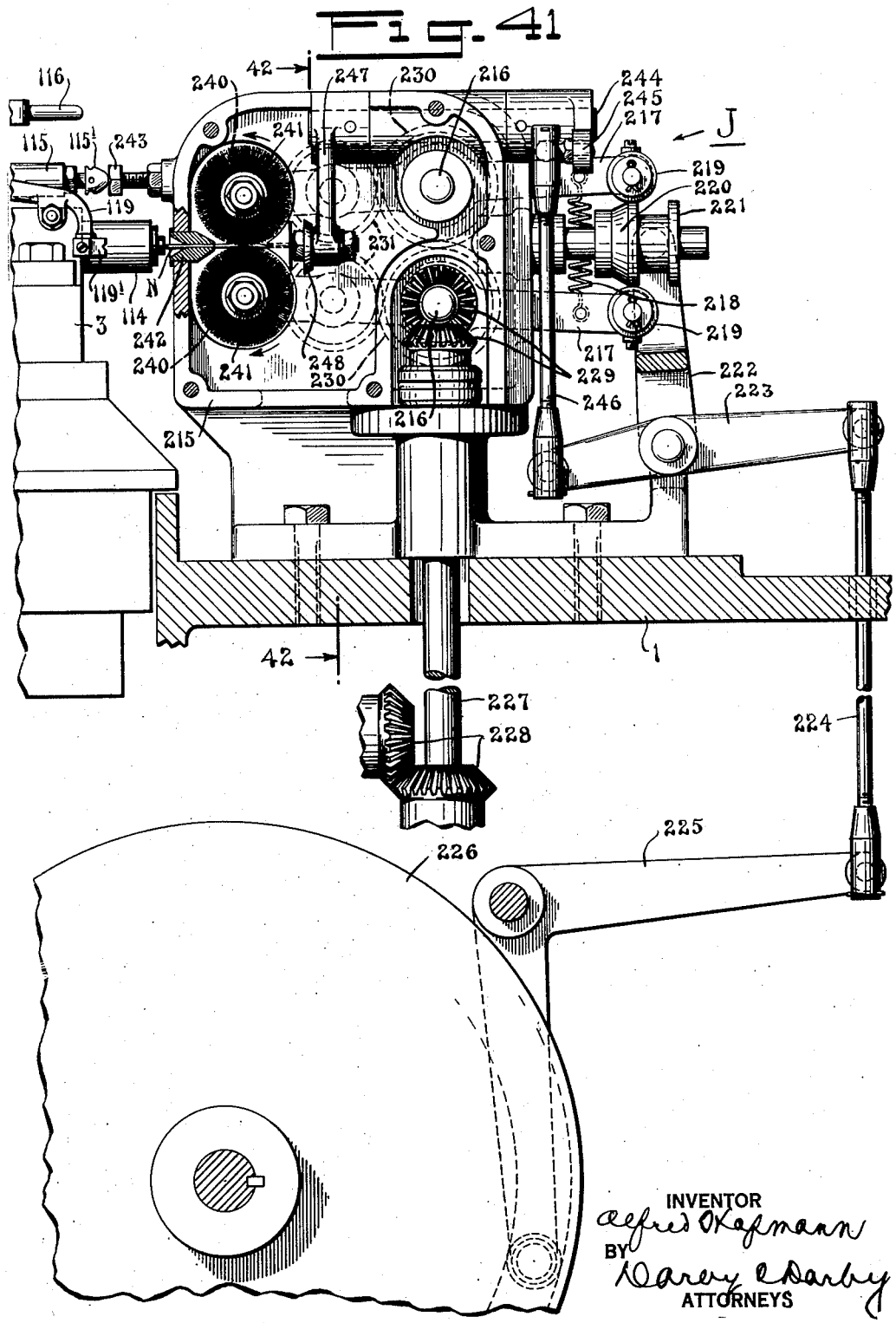
Fig. 41 is a side elevational view with the cover removed of the mechanism for polishing the stock at the slot and removing the metal chips therefrom.
Figure 42:
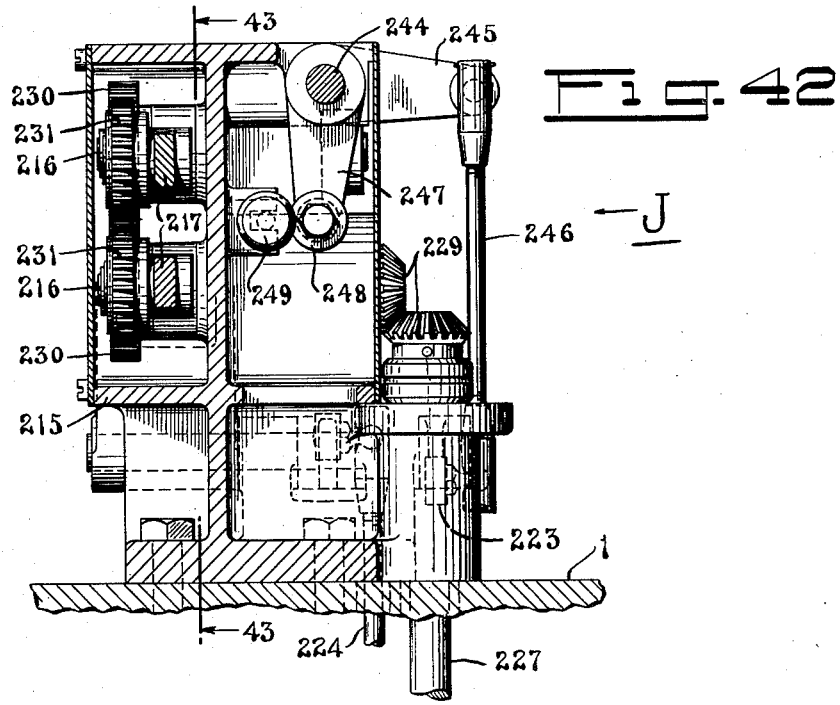
Fig. 42 is a cross sectional view taken on the line 42—42 of Fig. 41.
Figure 43:
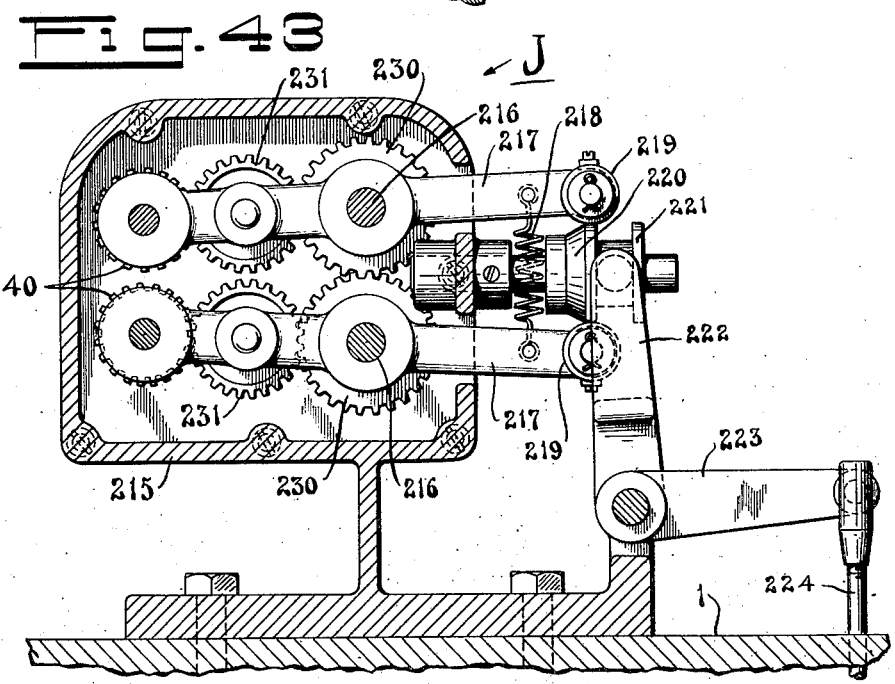
Fig. 43 is a cross sectional view taken on the line 43—43 of Fig. 42.

The attachment by means of which the slot is thoroughly cleaned and the end of the needle cut off to give it exact length is shown in detail in Figs. 41 to 43 inclusive. It consists of a housing 215 secured to the table 1 and enclosing the operating parts. Pivoted within the housing on the shafts 216 are levers 217 which project into the housing and extend exteriorly and to the rear thereof. The ends of these levers are provided with rollers which cooperate with the mechanical surface 220 on the grooved collar 221 which is slidably mounted on a stud projecting from the housing as shown. The groove of the collar 221 is notched or bent on the end of the forked lever 222 which is pivotally supported for oscillation with the lever 223. This lever is moved through the mechanical connections comprising the link rod 224, the bell crank lever 225, and the cam 226. Cam 226 is mounted below the table and as will be apparent to those skilled in the art, driven from the power source in any suitable manner. A shaft 227 driven likewise from the power source through the bevel gears 228 in turn operates the meshing bevel gears 229 within the housing. One of these gears is mounted upon shaft 216 upon which the lower lever 217 is pivotally mounted.

Also secured to this shaft is a gear wheel 230 which meshes with a similar gear wheel 230 journaled on the upper shaft 216. The gears 230 mesh with the idler gears 231 rotatably supported on levers 217 within the casing. The idler gears 231 in turn mesh with the driven gears 240 which are on the same shafts as the polishing brushes 241. The details of construction of this arrangement are clear from Fig. 43. The outer ends of levers 217 are urged towards each other by means of a spring 218 which holds the rollers 219 in contact with the cooperating portion of the collar 221. The front of the casing is provided with a guide piece 242 having an aperture therethrough terminating at the outer end in a conical depression by means of which the needle is guided into position between the brushes as the chuck assembly 114 is moved towards the housing. At this time the brushes are separated by reason of the fact that the collar 221 is to the right at the position shown in Fig. 41, at which time the spring 218 has drawn the levers 217 together. Since all of the driving gears are mounted on the levers 217 they are always in mesh. Hence the brushes 241 revolve continuously. The front of the housing 215 is provided with an adjustable stop screw 243 which cooperates with the stop button 115' on the positioning rod 115 of the head on the main turret.

Journaled in the top of the housing is a short shaft 244 upon the outer end of which is secured a lever 245 connected by the rod link 246 with one end of the lever 223.

Thus the same mechanism which operates the brushes causes the oscillation of shaft 244. The inner end of this shaft is provided with an arm 247 on which is mounted a cutter knife 248 which cooperates with a fixed cutter knife 249 (see Fig. 42). Thus, as the brushes are moved towards each other into contact with the needle at the slot the cutter knife 248 is moved to cut off the end of the needle which projects between them. In this arrangement, therefore, the slot is thoroughly cleaned and the needle polished at the slot at the same time that the tip end is cut off to give it the correct length. This length may be determined by the setting of the stop screw 243.

*Attachment K for enlarging and forming the slot*

The attachment for enlarging and forming the slot is shown in full detail in Figs. 44 to 50 inclusive. It may be pointed out here again that between each operation the main turret is indexed to present the chuck assembly holding the needle, which has been followed in detail through the operations, to the various attachments in succession. It is hardly necessary to point out that since the chuck assembly 114 is fed towards each head under the action of spring 96' (see Fig. 17) by reason of the fact that the corresponding cam 98 is receding from the roller 97, the chuck assembly may be brought to a stop at any desired radial distance from the center of rotation of the main turret 3. Hence, the position of the needle within each attachment may be very accurately determined.

The slot shaping and enlarging attachment K comprises a standard 250 secured to the table 1 and provided with a pair of inclined blocks 252 and 253 upon which the carriage 251 for the anvil 256 is adjustably mounted. The block 252 is bolted to the standard and block 253 may be positioned longitudinally of the standard (Fig. 44) by means of the adjusting screw 254. By thus longitudinally adjusting the block 253 the anvil carriage 251 may be raised or lowered. The position of the carriage 251 longitudinally of the housing may be determined by the adjusting screw 255. Likewise the transverse position of the anvil carriage 251 may be determined by the adjusting screws 255'. In turn the anvil 256 itself may be adjusted in the carriage by means of set screws and locked in place as is clear from Figs. 48 and 49. In a similar way a pair of inclined blocks 257 and 258 are mounted in the top of the housing and are adjustably secured therein by means of the set screws 259 and 260. The block 257 forms part of a support for the pivot pin 261, upon which the lever 262 is pivotally mounted. The outer end of this lever is forked and is pivotally connected to a link 263 which in turn is pivotally connected to the operating rod 264. This rod may be moved up and down from the power source by means of the crank 264' which may be driven from the power source in any suitable and obvious manner.

Figures 48, 49:
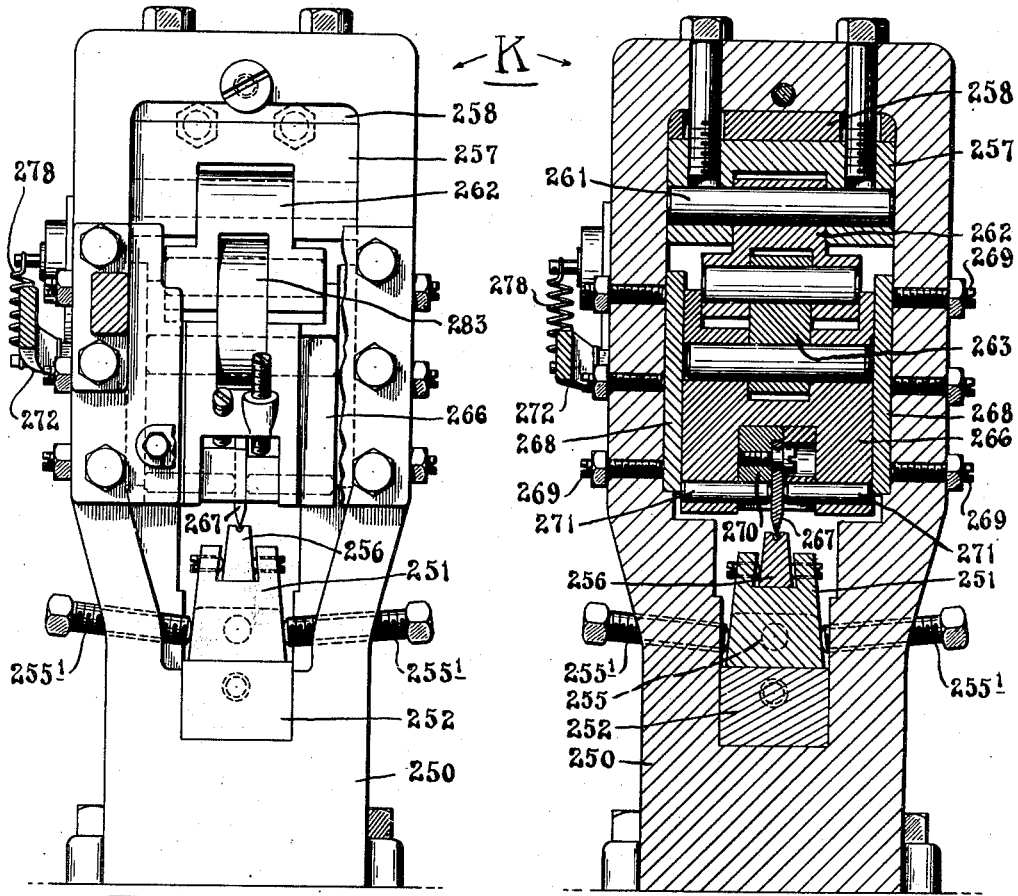
Fig. 48 is a front elevational view of the slot enlarging attachment with some parts broken away.
Fig. 49 is a vertical central cross sectional view through this mechanism.
Figure 50:
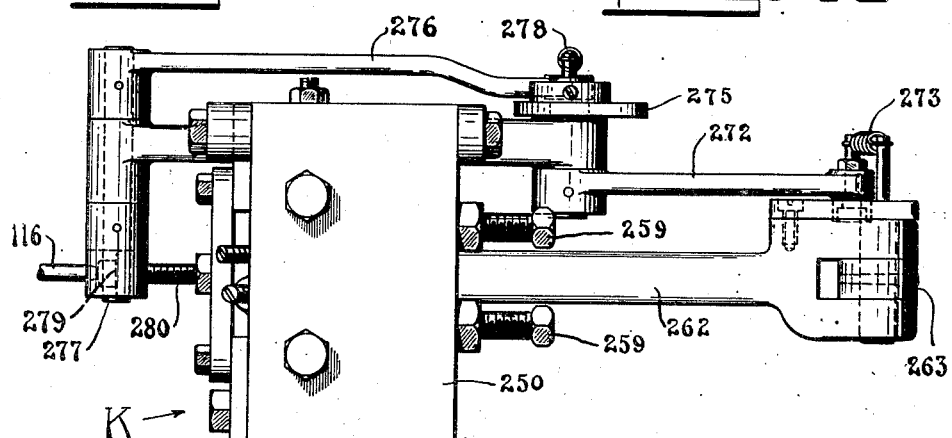
Fig. 50 is a top plan view thereof.
Figure 59:
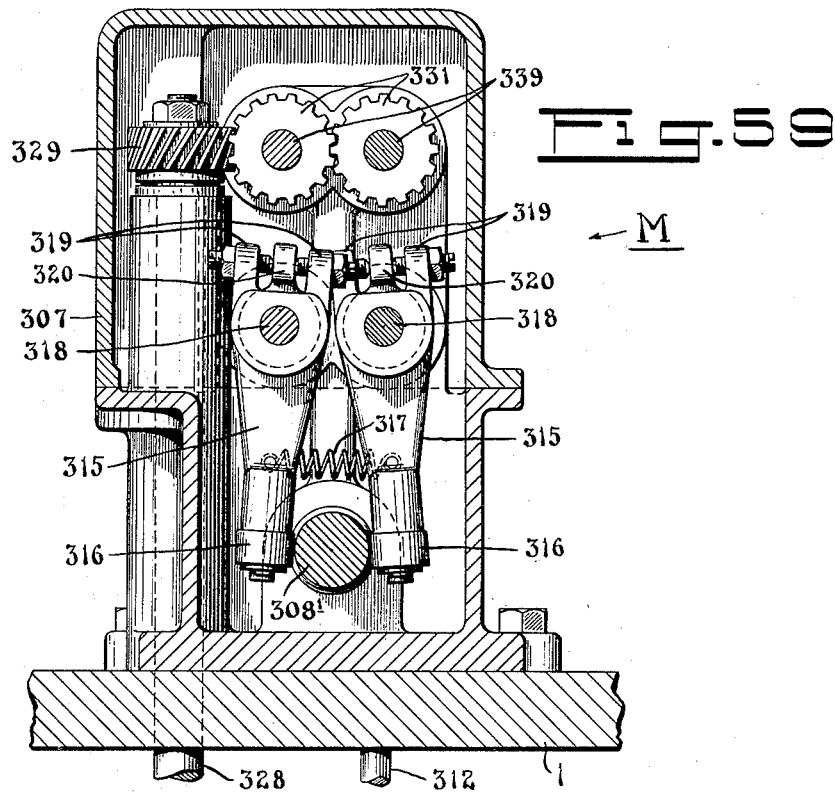
Fig. 59 is a cross sectional view taken on the line 59—59 of Fig. 56.

The end of the lever 262 within the housing is pivotally connected by a link 265 to a vertically movable carriage 266 upon which the forming tool 267 is adjustably mounted. As indicated in Fig. 49, this carriage may be transversely adjusted by means of the screws 269 acting on guide ways 268. The forming tool 267 is mounted upon a holder 270 which may be adjusted within the carriage 266 by means of the adjusting screws shown. The tool itself is transversely braced by means of pins 271 (Fig. 49). With this arrangement, after the needle is moved over the anvil and rests on the top thereof, rod 264 moves the outer end of lever 262 downwardly forcing the tool carriage downwardly through toggle action, so that the tool moves into the slot and properly enlarges and shapes it in accordance with the die portion of the anvil, as is clear from Figs. 45 and 46.

The action of the tool tends to lengthen the needle, and mechanism is provided to withdraw the chuck assembly 114 slightly so that the needle does not tend to buckle. This mechanism is operated by means of a lever 272 pivotally mounted on a shaft 274 supported in a bracket attached to the housing. The lever 272 is caused to move with lever 262 by reason of the engagement between them caused by the spring 273. One end of this spring is attached to lever 262, and the other end to lever 272. Likewise secured to the shaft 274 is a cam 275 against the surface of which rests a lever secured to the end of lever 276.

This lever is pivotally mounted on a bracket on the front of the standard (see Fig. 50), and operates a lever 279 mounted so as to be engaged by the rod 116 and the chuck of the turret mechanism for the corresponding chuck assembly. The lower end of lever 276 is held firmly against the edge of cam 275 by means of a spring 278, as is clear from the figures. Cam 275 is so shaped that during the pressing operation at which time lever 262 is descending, (Fig. 44) lever 272 likewise descending causes the cam to move so that lever 279 is oscillated to the left as the lower end of lever 276 descends, thereby causing the chuck assembly 114 to move away from the anvil a slight amount to absorb any increase in length of the needle due to the pressing operation.

Shank flattening attachment L

The attachment to which the turret next presents the needle operates to apply pressure to the sides of the shank N3 of the needle to flatten it and give it a rectangular cross section as indicated in Figs. 52 and 53. The attachment for accomplishing this operation is clearly shown in Figs. 51, 54 and 55. It comprises a support 290 attached to the table and in which is journaled for oscillation, a shaft 291. This shaft is provided at its outer end with a lever 292 which is pivotally connected to the operating rod 293 operated from below the table through a crank from the power source in any suitable manner.

The other end of shaft 291 is provided with a head 294 which together with the plate 295 and the pivot pins 296 provides a pivotal support for the links 297 (Fig. 55). These links are in turn pivotally connected to the levers 298 having the enlarged rounded heads 299, each of which rests at one end upon the fixed fulcrum block 300. Transversely slidable upon adjustable guide ways in the casing are the compression heads 301 to which power is transmitted from the levers 298 through the fulcrum blocks 304. The heads 301 are provided with the dies 302 which are positioned so that the chuck assembly 114 may project the needles between them when they are in open position. Positioned between the heads 301 are the fixed bars 305 against which the spring pressed plungers 303, mounted in the heads 301 bear. These bars act as a gauge and determine the thickness of the desired flat N3. As before, this attachment is provided with an adjustable stop screw 306 positioned to engage the positioning head 115' on the chuck assembly so that the needle is correctly positioned between the dies 302. When so positioned shaft 291 is oscillated so as to tend to bring the pivot screws 296 (Fig. 55) in alignment, thereby causing the heads 301 to approach each other, causing the dies 302 to squeeze the needle shank to the proper formation. When shaft 291 is oscillated in the opposite direction the pressure on the heads is reduced and the spring pressed fingers acting on the bars 305 move the heads apart, thereby separating the dies so that the needle may be withdrawn by the turret assembly.

Attachment M for milling the sides of the slot

This attachment mills the sides of the slot as indicated in Fig. 60, as the needle is withdrawn from between the milling cutters 326 against direction of rotation.

The needle is inserted between the milling cutters when they are separated and when positioned the milling cutters move together to the full line position up to the extreme left hand end of the sides of the slot so that the straight portions of the side may be milled as the needle is withdrawn. When the needle is withdrawn to the point where the straight sides converge in to the needle point the milling cutters are given a further movement towards each other in the proper timed relation to the movement of the needle, so as to mill the converging sides of the slot. At the end of the operation the milling cutters have been moved to the position indicated by the dotted line circles in Fig. 60.

This attachment comprises a housing 307 secured to the table 1, so that the main turret may present a needle thereto. Slidably mounted in the base of the housing is the operating number 308 for giving the milling cutters the proper movement towards and away from the needle. This member comprises a plurality of cylindrical sections connected by the conical portions 308' and 308''. The member 308 is given sliding movement by means of the link 309 pivotally connected to the lever 310 which is secured to the same shaft to which the lever 311 is secured. Lever 311 is pivotally connected by means of the link rod 312 to a pivotally supported lever 313 which is oscillated by the cam 314 supported below the table and operated from the power source in the proper timed relation, as will be clear to those skilled in the art.

Pivotally supported upon the shafts 318 and not connected thereto, are a pair of levers 315 provided at their lower ends with rollers 316 positioned so that the inclined portions 308' and 308'' of the member 308 may bear thereagainst. The levers 315 are urged towards each other and into contact with the member 308 by means of the spring 317. The collars upon which the levers 315 are mounted are each provided with a pair of ears 319 having adjustable screws mounted therein and engaging the opposite sides of a lever 320 secured to, for rotation with, the shaft 318. The inner ends of the shafts 318 are provided with small eccentric pins 321 which operate between the forked lower ends 322 of the U-shaped oscillatable arbors 323.

The arbors 323 are pivotally mounted upon the shafts 339 and in turn rotatably support the cutter shafts 324. These shafts are driven from the shafts 339 by means of the pairs of beveled gears 325. The lower ends of the shafts 324 have secured thereto the milling cutters 326 which, as clearly shown in Fig. 57, are positioned above the needle anvil 327 on opposite sides of the needle when inserted. The anvil 327 is adjustably mounted upon a support shown in Fig. 57, so as to properly support the needle. A shaft 328, driven in any suitable manner from the power source below the table is provided at its upper end with a spiral driving gear 329 which meshes with a driven spiral gear 330 mounted upon one of the shafts 339 for effecting rotation thereof. This same shaft is provided with a gear 331 which meshes with a similar gear 331 on the other shaft 339. Thus the milling cutters will be caused to revolve from the driven shaft 328. The front of the housing is provided with an adjustable stop screw 332 to be engaged by the positioning head 115' on the positioning rod of the heads of the main turret.

In the operation of this device, when the member 308 is positioned as shown in Fig. 56, the lower ends of the levers 315 are separated a maximum distance, at which time the milling cutters are closed. When member 308 is at the right arms 315 are closest together and the cutters are separated. The needle is then fed onto the anvil and between the separated cutters. Cam 314 is so shaped that in its first movements the member 308 is moved to the left (Fig. 56), so that the inclined portion 308' gradually passes between the rollers on the lower ends of arms 315, permitting them to be gradually separated. The result is that the cutters are moved towards each other and into contact with the straight sides of the slot portion of the needle. The needle is being slowly withdrawn at the same time that the member 308 is continuing to move to the left, and traversing the cylindrical portion thereof intermediate the two inclined portions. At the time the saws reach the end of the straight sides of the slot the inclined portion 308' of member 308 has begun to pass between the rollers on the arms 315. The result is that they begin to slowly move together, gradually bringing the cutters closer together and permitting them to follow the converging edges of the slot down to the dotted position shown in Fig. 60. Thus, with the parts properly timed the slot may be properly milled as described. At the end of the milling operation cam 314 causes a quick return of the member 308, swinging the cutters apart, and holding them there until a new needle is inserted between them.

*Attachment V for swedging the point of the needle and milling the top of the slot*

The operations indicated in Fig. 65, of milling the top of the slot and again swedging the point of the needle as it is moved to the left are carried out in the attachment in Figs. 61 to 64 inclusive. This attachment comprises a support 340 secured to the table 1, and having journaled therein a shaft 341 upon which is mounted a flywheel 342. This shaft is driven from shaft 343, which in turn is driven from the power source in any suitable manner from below the table. The power is transmitted from shaft 343 through the meshing bevel gears 344, one of which is secured to the same shaft to which the gear 345 is attached. This gear meshes with a gear 346 pinned to the shaft 341. The inner end of this shaft is provided with a head 347 upon which the oscillatable hammers 347' are slidably mounted by means of a construction similar to that disclosed in Figs. 28, 29, and 30. These hammers are driven towards the work by striking the ball or rollers 348 mounted in a ring surrounding their path of rotation, and in turn operate the forming dies 347''. As is clear, these hammers fly apart under centrifugal action when positioned between the balls or rollers. A conical guide piece 349 is secured to this head for guiding the needle between the forming dies. Mounted upon a bracket on the support is the vertically adjustable anvil or support 350 which supports the needle at a point below the milling cutter. A lever 351 is pivotally supported on the standard 340 and rotatably supports at its left hand end (Fig. 61), the milling cutter 356, which is on the same shaft with a sprocket wheel 357 driven by the chain 358. The limit of downward movement of the left hand end of the lever 351 may be determined by a set screw 352 which in turn may be accurately positioned by means of the conical member 353, which is transversely adjustable within a bore in the bracket attached to the housing under the action of the set screw 354 and the spring 355.

Sprocket chain 358 is driven from a sprocket wheel on the shaft upon which lever 351 is pivotally mounted, and upon which the sprocket wheels 359 and 360 are mounted. Sprocket wheel 360 is driven by the sprocket chain 361 from the sprocket wheel 363, which is also driven through a gear on the same shaft therewith from the power shaft 343. The right hand end (Fig. 61) of lever 351, is provided with a vertical extension having a transverse piece attached thereto, upon which a cam roller 364 is mounted. This lever engages the edge of a cam 365 pivotally mounted on the support and oscillated by means of a lever 366, a link rod 368, a pivotally supported bell crank lever 369, and a cam 370 mounted below the table and likewise driven from the power source in any suitable manner to give the proper timing. Roller 364 is held in engagement with the cam by means of the spring 367. Another bell crank lever 371 is operated from the other side of cam 370, or from another cam if desired, and is connected by the link rod 372 to a lever 373, pivotally mounted on the top of the support 340. This lever causes the oscillation of a shorter forked lever 374, which engages, by means of a pin, a slidable stop button 375 positioned to be engaged by the adjustable head 115' on the turret heads.

The final or stopping position of the member 375 may be determined by the adjustable screws 376 having a conical end engaging the member 375.

Figure 64:
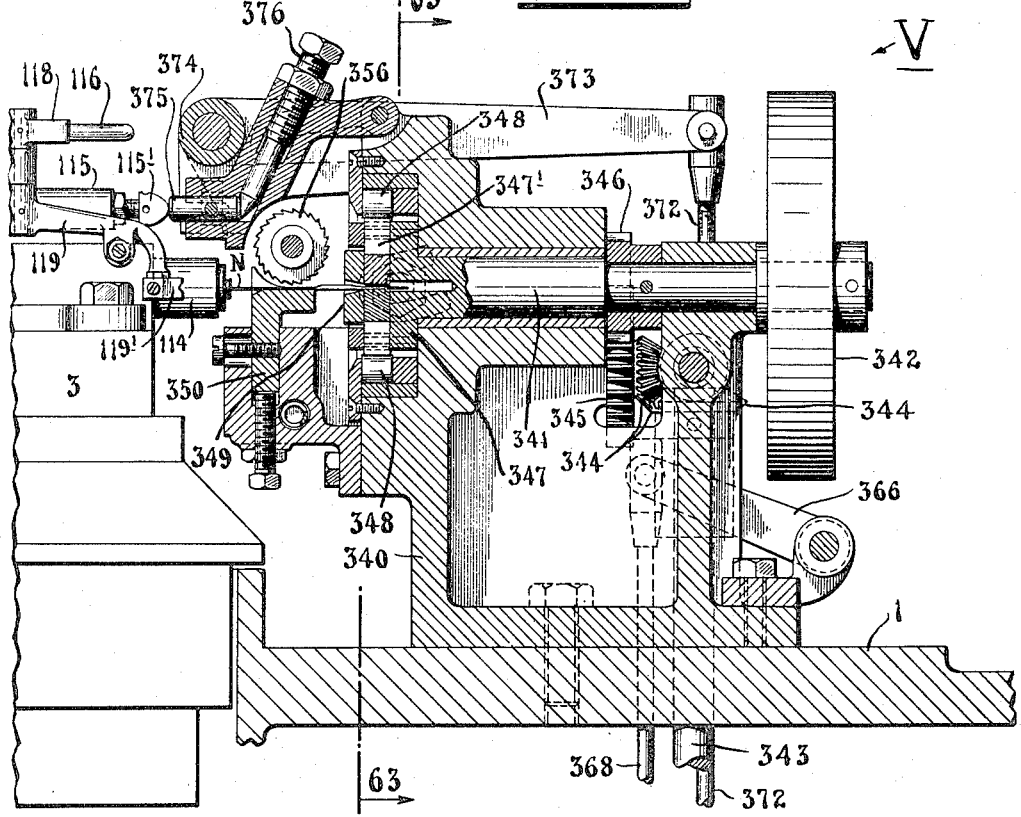
Fig. 64 is a vertical central longitudinal cross sectional view through this attachment.

In the operation of this attachment the turret assembly inserts the needle so that it rests upon the anvil 350, at the time cutter 356 is raised. At this time member 375 is retracted so that the needle is slowly inserted the full distance as indicated in Fig. 64 between the forming dies 347''. Member 375 then moves slowly to the left through the operation of lever 373, with the result that the needle is slowly withdrawn as the point continues to be hammered or swedged. In the meantime the milling cutter 356 is descending towards the needle through the operation of cam 365, so that when the slotted portion of the needle reaches the cutter it is in position to be engaged thereby. The needle continues in its outward movement against the direction of rotation of the cutter, so that the top of the slot is milled to the proper dimensions. When the cutter reaches the end of the slot the corresponding cam 98 quickly withdraws the needle by its action on the chuck assembly 114, and the attachment itself is operating to raise the cutter and to return the positioning button 375 back to its initial or starting position. The main turret then presents the needle to the next attachment for further operation thereon.

*Attachment O for polishing the sides of the slot*

The attachment for polishing the sides of the slots is shown in full detail in Figs. 66, 67 and 68. It comprises a support 380 mounted on the table 1 upon which the parts are mounted. A vertical shaft 381 extending below the table 1 is driven at its lower end through a pair of meshing gears 382 and a shaft 383 which is driven from the power source in any suitable manner. The upper end of the shaft 381 is provided with a gear 384 which meshes with a gear 385 journaled on the support 380. Journaled on a pair of U-shaped yokes mounted on the support 380, are the shafts 386 which are provided at their lower ends with gears meshing with the gears 384 and 385. Keyed to these shafts 386, so as to rotate therewith, but so as to be slidably mounted thereon, are a pair of polishing wheels 387 and 388. Keyed to a shaft 391, for movement therewith, is a lever 389 upon which an anvil or guide piece 390 is mounted to receive a needle and support it when inserted between the polishing wheels. The opposite end of shaft 391 is provided with a lever 392 having a pair of transversely extending arms 393 upon which are mounted a pair of sets screws to limit the oscillation of the lever and shaft by engagement with a suitable fixed stop member. The lever 392 is caused to oscillate by reason of the link connection 399, the bell crank lever 394, and the cam 395 supported below the table and operated from the power source in any suitable manner.

Attached to the polishing wheel sleeves, and forming part thereof, are the grooved collars 396 in which pins on the ends of the pivotally mounted levers 397 lie. These levers are urged at their outer ends (see Fig. 66) in an upward direction by means of the springs 398 which are anchored on the support as is clear from Fig. 68. Secured to a short shaft journaled on the back of the standard are the cams 399 which are positioned to engage rollers mounted on the levers 397. Secured to the same shaft as the cams 399 is a ratchet wheel 400 which is engaged by a pawl 402 pivotally mounted upon the support 401, which is freely and pivotally mounted on the shaft with the cams 399 at its lower end, and secured by means of a transverse extension, as shown in Fig. 68 to the slidably mounted shaft 403. This shaft is positioned so as to be engaged successively by the adjustable center stop screws 115' on the various chuck assemblies.

In the operation of this device the needle is passed between the polishing wheels as the chuck assembly 114 moves to the right (Fig. 66) and is guided to the proper position by the anvil member 390 which at this time is held so as to guide the needle between the polishing wheels without touching them. Lever 389 then moves to the left to bring the side and the slot of the needle against the polishing wheel 387. The chuck assembly 114 then slowly withdraws the needle against the polishing action of the polishing wheel 387. Lever 389 then moves back to a vertical position and the chuck assembly again inserts the needle between the wheels after which the lever 389 moves to the right to engage the other side of the slot with the polishing wheel 388. The needle is then slowly withdrawn against the polishing action of the wheel 388 and entirely out of the anvil 390. Lever 389 then returns to vertical position for treatment of the next needle. For each movement of the chuck assembly towards this polishing attachment the set screw 115' engages the end of rod 403, causing it to slide to the right against the resistance of spring 404. This movement causes clockwise rotation of the lever 401 and likewise clockwise rotation of ratchet 404 through the engagement of pawl 402 therewith. As the chuck assembly moves back to the left spring 404 moves rod 403 to the left and the pawl 402 moves back over the teeth of the ratchet wheel without moving it. The clockwise movement of the ratchet wheel 400 imparts clockwise rotation to the cams 399 in successive increments of movement. The result is, as will be obvious to one skilled in the art, that the polishing wheels 387 and 388 are caused to slide back and forth upon the shafts 386 in small interrupted increments which are cumulative so that as the machine operates these polishing wheels are caused to gradually present their entire working surfaces to the needles, so that they are uniformly worn and are not grooved and thereby rendered inoperative for their intended purposes.

*Transfer device U for delivering the needle from the main turret to the multiple polishing attachment*

The needle transfer device by means of which the needles are carried over from the main turret to the multiple polishing attachment is illustrated particularly in Figs. 1, 3, 4, 16, 69, 70, 72, 73, 81, 82 and 83. The relative location with respect to the main turret and the multiple polishing atachment is clearly illustrated in Fig. 1. The attachment U is interposed between the attachment O and the small turret C. The transfer attachment U is operated by means of a lever 404 which is pivotally mounted in the support 72 of the attachment E (see Fig. 3). This lever, as is clear from Fig. 4, is operated by a cam 405 mounted upon a shaft 10. The other end of the lever is formed into a semi-circular yoke as indicated at 406 in Fig. 4. This yoke is provided with a pair of pins which engage shoes fitted in the groove in the vertically slidable collar 409 (Fig. 16). This collar is mounted for sliding on a rod like standard 407 supported from the base 408 secured to the table 1. A spring 410 is interposed between the collar 409 and an abutment on the top of shaft 407 so that this spring resists upward movement thereof caused by the lever 404. The collar or sleeve 409 is provided with an arm 411 which terminates in a vertical extension having three spaced horizontal extensions as is clear from Fig. 82.

Slidably mounted in the horizontal extensions is a rod 412 which is surrounded by a compression spring 413 which resists upward movement of the rod. Pivotally mounted upon the rod 412, but not connected thereto is an arm 414 which has another arm 418 extending therefrom and at an angle thereto. This arm 418 is pivotally connected by a link rod 419 to the top of sleeve 409. Pinned to shaft 412 for rotation therewith is an arm 417 which has a rectangular opening therein, as is clear in Figs. 70, 72 and 81. Lying within the rectangular opening of arm 417 are the ears 416 of a pair of fingers 415 pivotally supported on the arm 414. A spring 416' is interposed between these fingers above the pivot points so as to cause the ends of the fingers to normally move towards each other when not forced apart by the arm 417 which will be described.

Referring again to Fig. 3 there will be seen an arm 420 likewise pivotally mounted upon the support 72. This arm 420 is likewise operated by a cam 422 mounted upon the shaft 10 (see Fig. 16). The other end of lever 420, as is clear from Fig. 70 extends, as indicated at 421 in opposite directions therefrom and on a line extending at an angle thereto. The ends of the extension 421 are provided with adjustable screws as shown in the various figures. As set forth in Fig. 72 these screws are positioned to engage the lower end of rod 412 for either of the positions of arm 411.

The arm 411 is swung between the two positions by means of another arm connected to sleeve 409, as shown at 440 in Fig. 1. This lever 440 is connected by the rod link 441 to another lever 442 on a vertical shaft which passes down through the table top and is operated from the power source below the table by means of any suitable and well known form of mechanism. Positioned adjacent the transfer unit U for cooperation with the heads on the main turret, is a mechanism which is clearly shown in Figs. 69, 70, 72, 73 and 81. This mechanism comprises a base 423 supported on the table 1 and in turn supporting a vertical rod upon which a sleeve 424 is mounted for rotation. This sleeve is provided with an arm 425 having a finger 426 thereon positioned to engage the sleeve 122 in the chuck assembly, for the purpose of releasing the needle, as will be clear from a consideration of these figures and Figs. 18 to 23 inclusive. This sleeve and its arm are given oscillation by means of another integral arm 427 which is pivotally connected to an operating rod 428 to which movement is imparted by means of the cam 428' (see Fig. 1) mounted upon shaft 10. Secured on the same support with sleeve 424 is an arm 429 positioned to engage the adjustable positioning screw 115' on each turret head, so that the turret in presenting the needle to the fingers 415 will be stopped at the proper point, and the needles will be properly gripped by these fingers. As soon as these fingers grip the needles the chuck is opened by the movement of arm 425.

Extension 421 of arm 420 is moved from the position shown in Fig. 81, in which position it holds the fingers 415 open downwardly, to a position where these fingers may grip the needle as will be clear from Fig. 82. As soon as the needle is gripped the arm 425 opens the chuck of the main turret, and sleeve 409 is moved upwardly by means of yoke arm 404 lifting the needle out from between the chuck jaws 124 (Fig. 21). Arm 411 then swings to the dotted position shown in Fig. 72, or to the position shown in full lines in Fig. 82, at which time the arm 420 and its extension 421 again move it to engage the rod 412, thereby opening the fingers 415. Sleeve 409 is then moved upwardly again by means of the yoke arm 404 so that the fingers 415 move first in a vertical plane out of the range of the needle which has been taken by the chuck 452 which will be described shortly. Arm 411 is then swung back to the position shown in Fig. 81, for example, and they are opened by the reaction between the set screw on the other extension 421 of arm 420 and rod 412. The link connection 418 and 419 with the sleeve 409 is for the purpose of swinging the plane of the spring fingers about a vertical axis so that they will lie parallel to the needle at the time it is removed from the chuck assembly to the longitudinal axis of chuck 452 at the time they deliver the needle thereto.

*The multiple polishing attachment P*

The mechanism by means of which the needle is polished at different points adjacent the beard end is clearly disclosed in Figs. 69, 70, 72, and 74 to 80 inclusive. Referring to Fig. 69, this attachment consists of a support 450 secured to the table 1 and in turn supporting a table member 451 upon which the chuck assemblies 452, 453, 454 and 455 are secured in longitudinal spaced arrangement. Journaled on the member 451 to the rear of these chuck assemblies is a shaft 456 which has secured thereto a finger 457 for each of these chuck assemblies and positioned to engage the knob or button 458 on the operating rods for these chucks. Secured to shaft 456 is a depending lever 459 which is connected by the link rod 460 to a lever 461 which is freely and pivotally supported on the rod 87. The lever 461 is provided intermediate its ends (see Fig. 74) with a cam follower 461' which cooperates with the cam 462 on the shaft 10 to effect operation of these connected parts in an obvious manner. The purpose of the fingers 457 is to open and close these chuck assemblies at the proper time to receive and discharge the needles.

The chuck assemblies 452 and 453 are the same and the nature of their construction is clear from Fig. 75. The casing 452' of the chuck is shaped to form a chamber in which the relatively movable members 463 and 463' are mounted. The forward ends of these members 468 and 467 provide gripping jaws which are relatively movable, as is clear in Fig. 80.

The relatively movable members are provided with pins 464 which engage in open end slots in the link 465 which is pivotally supported on a fixed pivot pin 466. It will be apparent then that when fingers 457 move in to engage the buttons 458 of either chuck assembly 452 or 453 the members 463 and 463', having the gripping jaws at the end, will be moved away from each other to the position shown in Fig. 80, at which time the fingers 415 may place a needle in a position to be gripped and held in the chuck assembly. At this point it is to be noted that the final movement of the spring fingers 415 as a unit is in a vertical plane, so as to bring the needle down and rest it on the gripping member 467. Fingers 457 then recede so that the spring pressed rod upon which button 458 moves to the left (Fig. 80) bringing the gripping jaws 467 and 468 into gripping relation with the needle as is clear in Fig. 75. Fingers 415 then open as previously described, and move upwardly in a vertical plane before swinging away and returning to the main turret to secure a new needle.

The other two chuck assemblies 454 and 455 are of somewhat different construction since they must be rotated upon the longitudinal axis of the needle to effect oscillatory spinning movement thereof during the polishing operation for reasons to be described.

In this case the chuck assembly comprises a fixed bearing casing 469 (see Fig. 77) in which a circular sleeve 470 is rotatably mounted. The outer end of this sleeve is provided with a flange 471 having a notch 472 to be engaged by a finger 473 pivotally mounted at the top of the bearing member 469 and normally held in the position shown in Fig. 76 by a spring. The sleeve 470 is provided with a tubular extension 474 to which is secured a gear 475. This gear meshes with a linearly movable rack 476 mounted in a track in the table 451. The rack is clearly seen in Figs. 69, 70 and 72. When the rack moves back and forth it will be apparent that the sleeve 470 and the members attached thereto including the gripping jaws 467 and 468 will be oscillated on the axis of the needle. The gripping jaws are opened and closed by the fingers 457 for these two chuck assemblies in the same way that they are opened and closed for the chuck assemblies 452 and 453.

The chuck assembly 455 differs from the chuck assembly 454 only in that it is mounted upon a carriage which moves transversely of the support 451 (see Figs. 78 and 79). In this case a guide way bed 480 is secured to the support 451 having guide tracks 481 therein, in which a tongue 483, formed on the bottom of the housing 482 moves. A rod 484 is supported between the support 451 and the bed 480 and is encircled by a spring as shown in Fig. 78, which engages a lug depending from the housing 482, so as to normally urge the housing to the right. The chuck assembly itself is supported in the housing 482 and may be oscillated by the rack 476 as before and the jaws may be opened and closed by the finger 457. The housing and the chucks mounted thereon normally lie at the extreme right position under the pressure of the spring and is moved back after it receives a needle by means of an adjustable set screw 485 which will be described later.

The rack 474 is oscillated by means of a connecting rod 486 which is operated in the proper timed relation with suitable and well known mechanism from the power source so that it will reciprocate up and down at a desired rate. This rod 486 is pivotally connected to a bell crank lever 487 which in turn is connected by the link 488 to the rack 476 (see Figs. 69 and 70).

At 489 is a rod which is operated from below the table from the power source so as to reciprocate up and down in the proper timed relation. Secured to the upper end of this rod is a plate 490 which is guided at its other end for vertical movement by the bar 490' (see Fig. 70). The plate 490 is provided with a dovetail groove as is clear from Fig. 74, in which the tongue of a reciprocal bar 491 rides. The plate 490 is provided with a lug 492 and the bar 491 is provided with a lug 493 between which a heavy coil spring 494 is connected to hold the bar 491 in the position shown in Fig. 69. Plate 490 also has a fixed ear 495 positioned to be engaged by an adjustable stop on the lug 493. The bar 491 likewise has an ear 496 with an adjustable stop screw positioned to engage the other side of the ear 495. Pivotally mounted on the bar 491 are the four levers 497 which have secured thereto, for movement therewith, the small cams 498 which lie between the arm and the fingers 499 which are pivotally connected intermediate their ends so that the lower ends may be operated towards and away from each other in an apparent manner. The fingers are pivotally supported from downward extensions on the bar 491 and have compression springs 498' between them to permit their operation. The short levers 497 are all pivotally connected to a single link 500 which in turn is pivotally connected to a small bar 519, which is slidably supported in a grooved extension 518 of the bar 491.

The small bar 519 is provided with a pair of spaced pins 521 and 520 which are to be engaged by one arm 504 of a bell crank lever which is pivotally supported, as is clear from Figs. 69 and 70, and which is operated from the other end by means of a rod 505 which extends below the table and is likewise operated from the power source by means of any suitable mechanism such as a cam. The bar 491 is likewise provided with a depending arm 501 positioned to be engaged by the roller on the arm 502 of a bell crank lever pivoted on the same shaft with the bell crank lever 504. The other arm of the bell crank lever 502 is pivotally connected to the rod 503 which extends below the table and is likewise operated by a cam or the like from the power source.

The supporting and operating mechanism for the polishing wheels will now be described. Referring to Fig. 74 this will be seen to comprise a base plate 506 secured to the table 1 having guide ways thereon for guiding the table 506' which is pivotally connected by the link 508 to a lever 509 pivotally supported from the base plate 506. The other end of lever 509 is pivotally connected by a link 510 to a lever 511 pivotally supported on the overhead rod 87. The lever 511 has operative engagement with a cam 512 mounted on the shaft 10, as is clear from Fig. 1.

Supported from the carriage 506' is a transverse guideway 507 upon which a plate 513 may slide transversely of the carriage 506'. Pivotally supported on the plate 513 is a motor support 514 to which the small electric motor 515 is secured. This motor is operatively connected by belt 516 to a shaft and pulley 517 journaled on the yoke 522 and adjustably supported from the plate 513. Secured to the shaft 517 in spaced relation so as to be in front of the chuck assemblies 453, 454 and 455, are the polishing wheels 523, 524 and 525 respectively. As shown in Fig. 74, a pair of standards 526 are secured to the table 506 and support at rotatable shaft 527 to which is secured a lever 528 having a roller on the end positioned to engage the cam surface 529 of a fixed member which is supported from the base plate 506. Thus, when the table 506' is oscillated back and forth on the base plate 506 by means of the lever 509, arm 528 will be raised as its rollered end moves up the cam surface 529 of the fixed member.

Mounted upon the shaft 527 and secured thereto by means of set screws are the arms 530 adjacent the polishing wheels 523 and 524. Loosely mounted on the shaft 527 are the arms 531 which support the notched guide plates 532 upon which the needle rests intermediate its length during the polishing operations by these two wheels.

A spring finger 533 is also secured to the arm 531 directly under the polishing wheels to urge the needle against the polishing wheels. Arm 531 is provided with an adjusting screw 534 which contacts with the arms 530 so that the position of arm 531 with respect to shaft 527, and hence the movement that it undergoes with respect to the polishing wheels and the final position thereof may be accurately determined. The arm 531 adjacent the polishing wheel 525 (see Fig. 78) is positioned by means of the set screw 534 which coacts with a fixed stop 536 attached to the movable table 506' (see Figs. 74 and 78). In this case the plate 532 is provided with a guiding member 535 having a tapered bore therethrough so as to guide the needle to the operating position between the wheel and the spring finger 533. As is clear from Fig. 70, the adjustable screw 485 is mounted above the front of the table 506', so that as the table moves in this screw will engage the housing 482 (see Fig. 78) to move it back as the table moves in, so that the polishing wheel 525 will operate at the very point of the needle only. This operation of the housing 482 is desirable so that when the movable table 506' moves back the housing and the chuck assembly parts mounted thereon may move out to a position so as to be in alignment with the other chuck assemblies 452, 453 and 454, and to likewise be in proper alignment with the fingers 499 so that they may insert and remove needles from all of these chuck assemblies simultaneously. However, since the polishing wheel 525 only operates on the point of the needle, it is necessary that the chuck assembly which supports it move back since all of the polishing wheels are on the same axis of rotation.

Referring again to Fig. 70, it will be seen that the movable table 506' is provided with a transverse extension 537 and the plate 513 is provided with an extension 538 which overlies the extension 537. Rotatably mounted between these extensions is a short shaft 548 to which is secured the heart shaped cam 540 and the ratchet wheel 541. Pivotally mounted on the short shaft 548 is a lever 542 which is connected at one end by a spring 544 to the yoke 522. The other end of lever 542 has pivotally supported thereon a small pawl 547 which engages with the teeth of the ratchet wheel. A spring pressed pawl 545 is pivotally supported on the extension 537 in a position so as to engage the teeth of the ratchet wheel. Secured to the under surface of extension 538 are a pair of rollers 539 which engage the periphery of the heart shaped cam 540. Extension 537 is provided with a lug in which is mounted an adjustable stop screw 543 positioned to engage the lever 542. At 546 is an adjustable stop screw mounted on any suitable fixed support so that it is positioned to engage the right hand end of lever 542. When the table 506' is moved back by lever 509 a predetermined distance the fixed screw 546 engages the lever 542. Further movement of the table and of course the extensions will cause lever 542 to rotate in a counterclockwise direction on the shaft 548. This relative movement of the lever will cause rotation of shaft 548 through the action of pawl 547 on the ratchet 541 attached to shaft 548. Simultaneously with the movement of ratchet wheel 541 the cam 540 moves shifting the plate 513 with the motor, yoke and polishing wheels thereon, a slight distance to the right or left, depending upon the shape of the cam and its coaction with the cam rollers 539.

As soon as table 506' moves back, lever 542 moves in a clockwise direction under the action of spring 544 until that lever engages the fixed stop screw 543. Reverse rotation of ratchet 541 and cam 540 is prevented by the fixed pawl 545. Thus, as the motor and polishing wheels are moved back and forth for successive engagement with the needles the motor and polishing wheel support will be given a succession of small transverse movements which will continue back and forth between limits as determined by the shape of cam 540. Thus the polishing wheels are continually presenting fresh surfaces to the needles so that they will not become grooved or uneven thereby insuring accurate polishing of the needles.

It might be noted, as is clear from Fig. 75, that the first polishing wheel 523 merely polishes the top of the grooved portion N4 of the needle. The second polishing wheel 524, as is clear from Fig. 76, polishes the needle at the point between the very tip and the slotted portion, or in other words, the parts N5 and N6 of the needle. During this operation the needle is spun on its longitudinal axis since this chuck assembly is given a spinning movement through the oscillation of the rack 476. The final polishing operation accomplished by the wheel 525, as illustrated in Fig. 78, takes place at the very tip or point N7 of the needle, at which time the needle is again spun on its longitudinal axis. The spinning during these two operations insures a smooth cylindrical surface for the needle at these points.

The manner in which the needles are transferred from chuck to chuck will now be described in connection with Fig. 69. It will be assumed that the chuck assemblies 452 to 455 inclusive each hold a needle. Bell crank lever 502 will be given a counterclockwise movement to cause the bar 491 to slide to the left on the plate 490. This will bring the fingers 499 from the position shown in Fig. 69 over to the left so that each pair of fingers is directly over one of the chuck assemblies. The accurate positioning of the fingers is determined by the adjustment of the set screws on the lugs 493 and 496, and their cooperation with ear 495. Rod 489 then descends carrying with it the plate 490 and all the parts mounted thereon. This brings the fingers 499 down so that each pair lies on opposite sides of a needle. With this position of the parts pin 520 will be to the left of arm 504 and in the range of action thereof. This arm then moves over, causing all of the short levers 497 to swing to the left through the link 500 so that the cams 498 move to a position permitting springs 498' to close the fingers 499. Fingers 457 (Fig. 74) then move in to open the chuck assembly, releasing the needles. Rod 489 then moves up carrying plate 490 and all attached parts including the fingers 499 with it. It may be noted here that the fingers will always remain closed under the action of the springs in view of the shape of the cams 498 and even though pin 520 moves out of contact with lever 504.

At the end of the upward movement of these parts, lever 502 recedes so that spring 494 may move the bar 491 and all its attached parts back to the right hand position which is shown in Fig. 69. Rod 489 again descends so that the needles in the three pairs of fingers at the left are placed in position to be gripped by the chucks 453, 454 and 455. Fingers 457 then recede and the chucks close on the needles. Lever 504 is then in position to engage pin 521 and moves to the right causing cams 498 to open the fingers 499. Thus the needles have been shifted one position to the right and rod 489 again moves upwardly to the position shown in Fig. 69. In the meantime the transfer mechanism U is bringing a fresh needle from the main turret and delivering it into chuck assembly 452. The fingers 499 at the extreme right have at the time the other fingers delivered needles to the chucks delivered a needle into the range of action of the mechanism in which the needles are cleaned, and which will now be described.

Mechanism for receiving the needles from the last pair of fingers 499 comprises a support 550 which has a pair of grooved lugs 551 on one side thereof as is clear from Figs. 70 and 71. These lugs are engaged by ears on the base plate 553 as shown in these figures. When these ears are slipped in place in the grooved lugs the base plate is held in place on the support by means of a spring pressed lever 552 which engages with a lug 552' on the base plate.

The base plate is provided with a pair of transversely extending arms 553' on each side thereof, upon which are pivotally mounted spring pressed arms 554 having the bars 555 positioned over the ways 556 on the base plate. One of the ways is provided with a groove as shown to receive the hook end of the needles, as is clear from the figures. The needles are grouped against the rolls by means of the spring pressed arms 554 which permit of the needles being forced thereunder. By the arrangement of the grooved lugs and the spring pressed arm 552 and the lug 552' the base plate may be detachably secured to the supporting table. At 559 is a longitudinally slidable bar which moves in a groove in the support 550 and is limited in its movement by means of a detent controlled plunger 556 positioned to be engaged by the end of the bar 559. This bar supports a pair of fingers 560 having notches at their upper ends adjacent the portion of the support upon which the needles are deposited by the right hand set of fingers 499. The fingers 560 and the bar 559 are caused to slide back and forth by means of the link connection 561, the bell crank lever 562 and the rod 563 which is operated in any suitable manner from the power source below the table. Thus, as the rod 563 moves up and down the fingers 560 and bar 559 move back and forth. In their forward movement these fingers engage the needles deposited in front thereof and force them under the spring pressed gripping plate 558 which is supported from above the needle slide by means of the plate 557. This gripping plate holds the needles down against the needle guides and the fingers 560 move over to the dotted position shown in Fig. 60 at the extreme right to deliver the needles under the plates 555 which are resiliently supported as described.

Each succeeding needle is moved up to engage the preceding needle so that they are gradually fed forward in a neatly arranged row, and held firmly on the ways, as will be apparent. When a tray is full of needles it is removed by hand and an empty tray inserted in its place by moving back the spring urged arm 552.

These trays are then placed in the machine to the right of the main turret, as illustrated in Fig. 1, and are fed from the tray by feeding mechanism which feeds them slowly through the heating device S which anneals them at the pointed end. They are then automatically transferred to the beard forming attachment T which bends the needles at the annealed portion N5 into a hook comprising the portion N6 and the offset portion N7. The needles are then delivered to a discharge chute Y. The annealing and beard forming mechanism by themselves form no part of this invention, and need no further detail description here to understand the process.

The various operating mechanisms mounted below the main table and through which power is delivered to the various arrangements and related parts has not been shown in detail since the construction and arrangement thereof is obvious and would be well known to those skilled in the art of machine design.

The detailed description of the various attachments sets forth the manner in which the connecting member interposed between the power source and the attachments moves. With this description and from analysis of the entire machine, those skilled in the art would understand the various forms of operating mechanism which can be used to effect the necessary timed relationship between movements of the various parts.

From the above description it will be apparent that this invention resides in certain principles of construction and operation which may be carried out by those skilled in the art in other ways without departure from the scope of this invention. I do not, therefore desire to be strictly limited to the disclosure as set forth in the above description and the attached drawings, but rather to the scope of the invention as defined in the appended claims.

What I seek to secure by United States Letters Patent is:

1. In a continuous method of making bearded knitting needles the steps of cutting a wire stock to length, bending one end of each length to approximately a right angle, cutting and swedging the other end of each length to form a point thereon, milling a flat at the base of each point, cutting a slot in the milled portion of each length, subjecting the slot to pressure to size and shape it, milling and polishing the top and sides of the slot and bending the pointed end to form a beard.

2. In a continuous method of making bearded knitting needles comprising the steps of bending one end of each length of stock to approximately a right angle, milling the opposite end to reduce the diameter thereof, swedging the milled end to form a point, milling the stock at the base of the point to form a flat, cutting a slot in the milled portion, subjecting the slot to pressure to size and shape it, swedging and polishing the pointed end to the final shape and form, and bending the pointed end to form a beard.

3. A machine of the type described for making bearded knitting needles comprising in combination a small turret, a large turret, means for imparting step-by-step rotary movement to each turret, means for causing linear reciprocation of the small turret, rotary movement of the small turret occurring at the end of its linear movement in one direction, means for cutting and delivering lengths of stock to the small turret, means for rolling the end surface of one end of each length positioned for operation on the length when presented thereto by the small turret, means for bending the rolled end of the stock when presented thereto by the small turret, the small turret being positionable to deliver the length of stock to the large turret, a plurality of attachments adjacent the large turret to which the large turret successively presents the lengths of stock for operation thereon, and driving mechanism for imparting timed movement to all of said parts.

4. A machine of the type described for making bearded knitting needles comprising a small turret, means for imparting step-by-step rotary movement to the turret and intermittent linear movement thereto, means for cutting and delivering lengths of stock to the small turret, means to which the small turret presents the wire lengths for rolling the end edge of one end thereof to round it, means to which the small turret next presents the wire lengths for bending the rolled end, a large turret having a plurality of chuck assemblies thereon positioned to receive the wire lengths from the small turret at the end of each linear movement of the small turret towards the large turret, means for imparting step-by-step rotary movement to the large turret, a plurality of attachments distributed around the large turret to which the wire lengths are successively presented for individual operations on one end thereof, and means for imparting movement to all of said parts in timed relation.

5. A machine of the type described for making bearded knitting needles comprising a small turret, means for imparting step-by-step rotary movement to the turret and intermittent linear movement thereto, means for cutting and delivering lengths of stock to the small turret, means to which the small turret presents the wire lengths for rolling one end thereof, means to which the small turret next presents the wire lengths for bending the rolled end, a large turret having a plurality of chuck assemblies thereon positioned to receive the wire lengths from the small turret at the end of each linear movement of the small turret towards the large turret, means for imparting a step-by-step rotary movement to the large turret, a plurality of attachments distributed around the large turret to which the wire lengths are successively presented for individual operations on one end thereof, a multiple polishing attachment, means for transferring the needles from the large turret to the multiple polishing attachment, and means for driving all of said parts in timed relation.

6. A machine of the type described comprising a rotary turret, a plurality of chuck assemblies slidably mounted on the turret for radial movement, means for effecting radial movement of the chuck assemblies including movable members having arcuate grooves, fingers on the chuck assemblies lying in the grooves of said members, and said grooves forming a complete circular groove at the time the turret revolves, and means for revolving the turret in step-by-step movement and actuating said movable members.

7. A combination comprising a rotatable turret, a plurality of radially movable chuck assemblies mounted on the turret, means for imparting step-by-step movement to the turret, means for simultaneously effecting radial movement of the chuck assemblies, a plurality of work attachments supported adjacent the periphery of the turret, and means on the chuck assemblies cooperating with the attachments whereby the length of the path of radial movement of the chuck assemblies towards the attachments is accurately determined, the means for effecting radial movement of the chuck assemblies respectively disengaging from them as the chuck assemblies engage their respective stops.

8. In a machine of the type described the combination comprising a rotatable turret, a plurality of chuck assemblies slidably mounted on the turret for radial movement thereon, a plurality of slides mounted on a fixed support, each of said slides having an arcuate groove which in one position of the slides forms a circular groove, a finger on each chuck assembly engageable with said grooves, a rotatable cam for operating each slide, and means for simultaneously effecting step-by-step rotary movement of the turret and rotation of said cams, said slides being positioned by said cams so that the grooves thereof form a continuous circular groove when the turret moves.

9. An apparatus as described comprising a turret adapted to step-by-step rotary movement, a plurality of chuck assemblies slidably mounted on the turret for movement radially thereof, means for simultaneously imparting radial movement to the chuck assemblies in either direction at different speeds, means for imparting step-by-step movement to the turret, a fixed support adjacent each chuck assembly, work gripping fingers pivotally supported on each fixed support, and means operated by the movement of the chuck assemblies for operating said fingers.

ALFRED HOFMANN.